US007272646B2

(12) United States Patent
Cooper et al.

(10) Patent No.: US 7,272,646 B2
(45) Date of Patent: Sep. 18, 2007

(54) NETWORK MONITOR INTERNALS DESCRIPTION

(75) Inventors: Geoffrey Cooper, Palo Alto, CA (US); Robert Allen Shaw, Los Altos, CA (US); Luis Filipe Pereira Valente, Palo Alto, CA (US); Kieran Gerard Sherlock, Palo Alto, CA (US)

(73) Assignee: Securify, Inc., Mountain View, CA (US)

( * ) Notice: Subject to any disclaimer, the term of this patent is extended or adjusted under 35 U.S.C. 154(b) by 635 days.

(21) Appl. No.: 10/311,109

(22) PCT Filed: Jun. 14, 2001

(86) PCT No.: PCT/US01/19063

§ 371 (c)(1),
(2), (4) Date: Jun. 10, 2003

(87) PCT Pub. No.: WO01/99343

PCT Pub. Date: Dec. 27, 2001

(65) Prior Publication Data

US 2004/0030796 A1 Feb. 12, 2004

(30) Foreign Application Priority Data

Jun. 16, 2000 (US) .................. 60/212,126
Apr. 5, 2001 (US) .................. 09/826,602

(51) Int. Cl.
*G06F 15/173* (2006.01)
*G06F 11/00* (2006.01)
*G06F 17/00* (2006.01)
*H03M 13/00* (2006.01)

(52) U.S. Cl. .................. 709/223; 726/13; 726/22; 714/39; 714/51; 714/815

(58) Field of Classification Search ............... 709/223, 709/224; 714/39, 51, 815; 726/13, 22
See application file for complete search history.

(56) References Cited

U.S. PATENT DOCUMENTS

| 6,499,107 | B1 * | 12/2002 | Gleichauf et al. | 726/23 |
|---|---|---|---|---|
| 6,502,131 | B1 * | 12/2002 | Vaid et al. | 709/224 |
| 6,651,099 | B1 * | 11/2003 | Dietz et al. | 709/224 |
| 6,665,725 | B1 * | 12/2003 | Dietz et al. | 709/230 |
| 6,771,646 | B1 * | 8/2004 | Sarkissian et al. | 370/392 |
| 6,789,116 | B1 * | 9/2004 | Sarkissian et al. | 709/224 |
| 6,816,973 | B1 * | 11/2004 | Gleichauf et al. | 726/13 |
| 6,839,751 | B1 * | 1/2005 | Dietz et al. | 709/224 |
| 6,954,789 | B2 * | 10/2005 | Dietz et al. | 709/224 |
| 7,143,439 | B2 * | 11/2006 | Cooper et al. | 726/11 |

OTHER PUBLICATIONS

Deri, Luca and S. Suin; Effective Traffic Measurement Using nTop; 2000; IEEE.

* cited by examiner

*Primary Examiner*—Saleh Najjar
*Assistant Examiner*—Vitali Korobov
(74) *Attorney, Agent, or Firm*—Michael A. Glenn; Glenn Patent Group

(57) ABSTRACT

A method and apparatus for a network monitor internals mechanism that serves to translate packet data into multiple concurrent streams of network event data is provided. The data translation is accomplished by interpreting both sides of each protocol transaction.

24 Claims, 30 Drawing Sheets

| K Rule View | ☒ |
|---|---|
| Execution Run: | 1999-10-01 14:30:20.0  C:\.bmp ▷ |
| Final Rule Name: | <Any Rule> ▷ |
| Disposition Name: | <Any Disposition> ▷ |

Disposition Codes: ☐Access Denied ☐Auth Violation ☐Security Attack ☐Security QOS ☐Policy Error ☐OK
Disposition Severity: ☐Critical ☐High ☐Medium ☐Monitor ☐Warning ☐Information ☐<none>

[Query]

Rows

[Done] [Edit SQL] [Copy Row] [Copy Deep]

FIG. 8

K Rule View

Execution Run: 1999-10-01 14:30:20.0 C:\.bmp

Final Rule Name: <Any Rule>

Disposition Name: <Any Disposition>

Disposition Codes: ☐ Access Denied ☐ Auth Violation ☐ Security Attack ☐ Security QOS ☐ Policy Error ☐ OK Disposition Severity: ☐ Critical ☐ High ☐ Medium ☐ Monitor ☐ Warning ☐ Information ☐ <none>

Query

| Rule Name | Disposition Name | Initiator IP | Init Name | Target IP | Targ Name | Targ Service |
|---|---|---|---|---|---|---|
| Udp_Deny | Udp_Access_Denied | 10.5.63.143 | vg-143.securify.com | 10.5.63.6 | dude.securify.com | domain |
| Http_Deny | Http_Access_Denied | 10.5.63.143 | vg-143.securify.com | 208.178.27.198 | | http |
| Http_Deny | Http_Access_Denied | 10.5.63.143 | vg-143.securify.com | 208.178.27.201 | | http |
| Http_Deny | Http_Access_Denied | 10.5.63.143 | vg-143.securify.com | 208.178.27.198 | | http |
| Udp_Deny | Udp_Access_Denied | 10.5.63.143 | vg-143.securify.com | 10.5.63.6 | dude.securify.com | domain |
| Http_Deny | Http_Access_Denied | 10.5.63.143 | vg-143.securify.com | 10.5.63.6 | dude.securify.com | domain |
| Http_Deny | Http_Access_Denied | 10.5.63.143 | vg-143.securify.com | 204.71.200.68 | www3.yahoo.com | http |
| Udp_Deny | Udp_Access_Denied | 10.5.63.143 | vg-143.securify.com | 10.5.63.6 | dude.securify.com | domain |
| Http_Deny | Http_Access_Denied | 10.5.63.143 | vg-143.securify.com | 10.5.63.97 | kabale.securify.com | http |
| Top_Missed_Connections | Warn_Missed_Top_Connect | 10.5.63.143 | vg-143.securify.com | 10.5.63.24 | fred.securify.com | netbios-ssn |

Rows 10    Done    Edit SQL    Copy Row    Copy Deep

*FIG. 9*

SECURIFY
Security Chain Verification Service

Dashboard • Summary • Detail profile  log out  help server time: 12.21.00 17:24 PST Conformance Event Detail Http_Servers_Response/Unauthorized_Access_To_URL
ACCESS_VIOLATION/CRITICAL today ▼

VIOLATORS srcIP 12/19/2000-12/21/2000
Viewing: 1 - 5 of 5

| Detail | ▼ SrcIP | SrcPort | DstIn | DstPort | PretId | DateTime | AppData | Status | Monitor |
|---|---|---|---|---|---|---|---|---|---|
| View | 212.210.11.4 | 2135 | 209.143.242.119 | 80 | 6 | 09:06:35AM 12/21/2000 | 209.143.242.119.80/ | 200 | PSS MONITOR |
| View | 208.50.51.100 | 1060 | 209.143.242.118 | 80 | 6 | 08:28:55PM 12/20/2000 | www2.security.com.pkfform.phtml | 200 | PSS MONITOR |
| View | 208-50-51-100.nas2.fhu.gblx.net | 1064 | 209.143.242.118 | 80 | 6 | 08:29:49PM 12/20/2000 | www2.security.com.pkfform.phtml | 200 | PSS MONITOR |
| View | 208.50.51.100 | 1064 | 209.143.242.118 | 80 | 6 | 08:30:15PM 12/20/2000 | www2.security.com.pkfform.phtml | 200 | PSS MONITOR |
| View | 208.50.51.100 | 1066 | 209.143.242.118 | 80 | 6 | 08:30:38PM 12/20/2000 | www2.security.com.pkfform.phtml | 200 | PSS MONITOR |

NETWORK MONITOR INTERNALS DESCRIPTION

BACKGROUND OF THE INVENTION

1. Technical Field

The invention relates to computer network monitor internals. More particularly, the invention relates to a method and apparatus for translating network packet data into multiple concurrent streams of encoded network event data.

2. Description of the Prior Art

Networked information systems are an essential part of many organizations. Critical systems, services, and information resources all require protection that depends on effective orchestration of a variety of factors: network architecture, security products, site security, administrative procedures, end user responsibility, and more. A network security policy is an explicit plan of how to accomplish this multi-faceted protection, what objectives the plans should meet, and what assets are being protected.

To manage a network, an end user needs to know and understand what is happening on the network. Most security holes come from unexpected, misconfigured, or unauthorized services, for example, from a high-port telnet, a new service added in, a rogue server, and/or a misconfigured workstation. The end user does not know what is the unauthorized network traffic.

Security administrators need tools to help them formulate site security policy and to translate the policy into monitoring and enforcement mechanisms. They need to be sure that the computer enforced policy—often cobbled together from a plethora of disjoint access control mechanisms—matches their enterprise policy, all too often specified in a loose natural language or a set of unwritten principles. This leads to confusion as to why access is being granted or denied to particular resources and may lead to unintentional breaches of security.

In addition to monitoring network system traffic, it is important for network analysts to assess their network's configuration. A discussion on current techniques for network assessment follows below.

A conventional network assessment visit determines the customer network using the following information:

1) Network security scanning technology, e.g. port or vulnerability scans;
2) Customer interviews;
3) Inspection of customer log files, perhaps using machine aggregation and filtering; and
4) Occasionally, inspection of customer log files and network traffic.

As a matter of practicality, the information is typically derived from the first three of these items. Customer log files and network traffic is of a volume so great that it is impractical to examine it in a short assessment visit.

The weaknesses such conventional methods are as follows:

Vulnerability Scans

Network vulnerability scanners only detect certain types of known vulnerabilities. Such vulnerabilities are generally not detected directly, but are inferred based on host responses to a series of network packets sent to hosts by the scanner. This process does not directly ensure that data traffic on the subject network matches expectations, either explicit or implicit.

Network vulnerability scanners cannot see a host if it does not respond to packets. A host that is only a source of network packets, such as, for example, a rogue router, is not visible to a scanner. Hosts which are turned off or otherwise temporarily disconnected, such as, for example, workstations and laptops, are often missed by vulnerability scanners. This problem is compounded by the fact that scans are often scheduled for non-work hours in order to alleviate customer fears that the scans will somehow impact production systems and organizational mission.

Network scanners typically return a large volume of vulnerability information, based on all possible configured elements in a network. The scanner tools cannot currently interpret those vulnerabilities in light of business requirements which the subject systems are intended to support, or even for the specific network architecture of which those systems are a part. The scan results must be reviewed manually by a security analyst, who applies a knowledge of the business requirements and network architecture to an interpretation of those results. Such manual process is error-prone because the volume is so great that problems may be overlooked.

Another problem is that the scan derives only vulnerabilities, not network usage patterns. Therefore, the scan cannot detect security problems that are attributable to human behavior, but only those scans that result from misconfigured systems and/or systems which have documented design problems.

Network scanners cannot diagnose incorrect client usage of software. For example, network scanners cannot detect whether web servers are being used with invalid cipher-suites, whether 40-bit browsers are in use, and whether a given telnet port is accessed only by a management station.

Network scanners must be targeted to particular subnets. If a customer has forgotten to mention a subnet, the scanner does not notice it.

Customer Interviews

Customers may not provide the network analyst complete or accurate information, either because the customer forgot details, because the information is not known to the customer, or because the customer does not understand the importance of giving the information to the analyst.

Customer interviews at best can provide descriptions of overt usage of subject systems, and generally not covert usage. Often, formal policies of the organization are not even documented, much less promulgated, audited and enforced.

Hidden agendas, office politics, and other factors also can affect the success of the interview process.

Host Inspection

Inspecting host configuration files is a time consuming, manual process that is subject to human error. In the assessment of any large network, it is impractical to include an inspection of the configurations for more than a few critical systems.

Once again, inspection of host configurations does not reveal completely intended usage of the subject systems. The configurations must be analyzed within the context of the business requirements and overall security environment of the organization. This manual process is very human dependent and prone to error.

Log File Inspection

Log file inspection can provide great insight into the workings of network components. Machine-based aggregation and filtering systems can speed this process. However, logs provide only a components' own view of its status. If a component is misconfigured, the log data from the component cannot be trusted. Log data may also be subject to modification by an attacker who has penetrated the machine and is seeking to mask his presence.

In addition, because log aggregation systems work in cooperation with the components that generate the information, they require configuration changes to every component that they examine. Also, they are unable to detect when a component is added to the system.

Such techniques of performing network assessments generally are limited in their ability to determine actual security threats to information systems. Generally, they represent the state of the art and are indicative of best practices within the security community today.

A way to reduce or eliminate the confusion described above is by providing a user-friendly and, yet, rigorous way of specifying security policy, as well as providing tools for monitoring and enforcing the security policy.

It would be advantageous for a network policy to provide the definition of normal traffic on the network.

It would be advantageous to provide a monitoring mechanism that lets an end user determine and understand traffic and/or activity on a network.

It would be advantageous to provide methods and system that, when given known network characteristics, thereby spots intruder access, and track changes to a network.

It would be advantageous to provide a policy generator tool that assists an end user in generating security policy for a network.

It would be advantageous to provide a tool that automatically converts a network security policy into English language representation.

It would be advantageous to provide a tool that allows an end user to query network traffic data.

It would be advantageous to provide a technique for transmitting an event description of network traffic from a source file or data stream to a target destination, such as a network policy engine.

SUMMARY OF THE INVENTION

A method and apparatus for a network monitor internals mechanism that serves to translate packet data into multiple concurrent streams of encoded network event data is provided. The data translation is accomplished by interpreting both sides of each protocol transaction.

The invention is a component of a network security policy monitoring system and method that comprises supportive features, algorithms, and tools. The monitoring system is ideally suited for network and security assessments or long-term monitoring where real network traffic is analyzed to identify abnormal traffic patterns, system vulnerabilities, and incorrect configuration of computer systems on the network. The monitoring system listens on a network, logs events, and takes action, all in accordance with a rule based system-wide policy. The monitoring system provides a technique that is able to incorporate external sources of event information, such as are generated in log files of other network components. The inventive technique of the monitoring system gets protocol information, which can make it more meaningful to a network administrator. It sends data upstream to an event log and interprets the data. It listens to secure protocols and can identify encryption quality of service parameters. It extracts basic security parameters, such as, for example, network events, and passes them to a policy manager component.

The policy manager component implements system-wide policies, based on monitored system or enterprise traffic. The policy manager component provides a trust manager that takes as its input a security policy defined as a set of policy rules and a set of credentials, and that is capable of processing requests for trust decisions, i.e. evaluating compliance with the policy. Unlike other trust management systems, the monitoring system is designed to be a passive monitor of network traffic. As such, it need not be installed on target hosts or integrated into existing applications.

Two key aspects of the policy manager component are provided. One aspect is a unified view of the interaction between two principals across a stack of protocol areas, each area covered by discrete policy rules. The final trust decision applied is based on policy rules that better fit the entire interaction. The second aspect comprises the policy manager's policy definition language that supports the monitoring and auditing of a network's activity in addition to traditional access/denial authorization decisions.

The policy definition language is described in A Declarative Language for Specifying A Security U.S. patent application Ser. No. 09/479,781, (Jan. 7, 2000). The policy definition language is discussed herein to the extent necessary to explain such language to those skilled in the art in connection with the invention and the monitoring system disclosed herein. The declarative language system comprises a language as a tool for expressing network security policy in a formalized way. It allows the specification of security policy across a wide variety of networking layers and protocols. Using the language, a security administrator assigns a disposition to each and every network event that can occur in a data communications network. The event's disposition determines whether the event is allowed, i.e. conforms to the specified policy or disallowed and what action, if any, should be taken by a system monitor in response to that event. Possible actions include, for example, logging the information into a database, notifying a human operator, and disrupting the offending network traffic. Further details of the policy definition language can be found in the patent application cited herein above.

Unlike Intrusion Detection Systems (IDS) systems, which look for the signatures of known attacks, the monitoring system herein is focused on defining allowed traffic patterns and how to handle events that deviate from those patterns.

The monitoring system comprises, but is not limited to six major features and tools. The first feature discussed is auto-conversion of policy language, whereby policy language is converted to an English language representation. Next, an algorithm for efficient rule evaluation is provided. Then, a credential/assertion optimization technique is provided. A policy generator tool is provided. An embodiment in which the monitoring system is used as an assessment tool is provided. Finally, a technique for secure sensitive event extraction from protocol monitoring is provided.

BRIEF DESCRIPTION OF THE DRAWINGS

FIG. 8 is an example of a query tool dialog box according to the invention;

FIG. 9 is an example of a query tool dialog box according to the invention;

FIG. 27 shows an example of a conformance event details page containing a pop up description according to the invention;

FIG. 32 shows an example of a link to the advanced search dialog box according to the invention.

DETAILED DESCRIPTION OF THE INVENTION

Figure 1A:
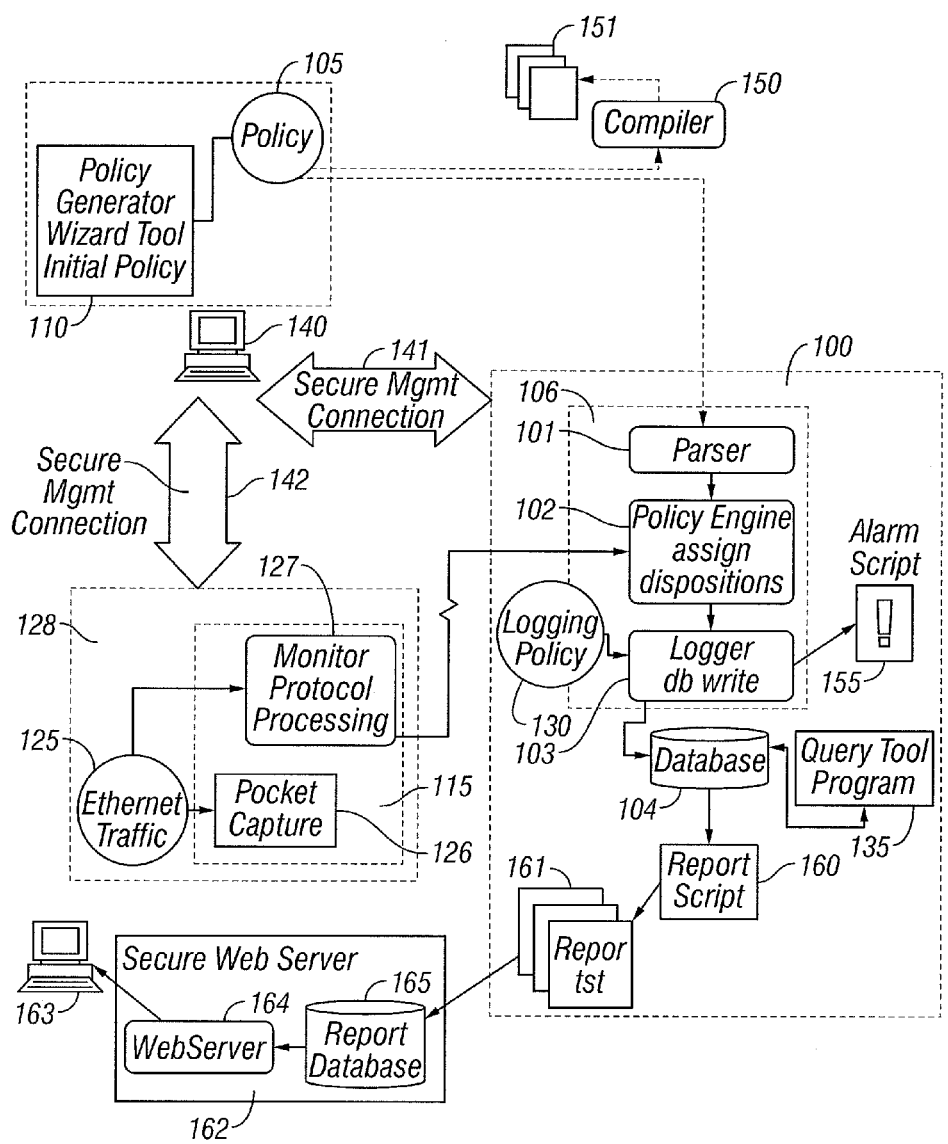
FIG. 1a is a schematic diagram of components of the system according to the invention.

A method and apparatus for a network monitor internals mechanism that serves to translate packet data into multiple concurrent streams of encoded network event data is provided. The data translation is accomplished by interpreting both sides of each protocol transaction.

The invention is a component of a network security policy monitoring system and method that comprises supportive features, algorithms, and tools. The monitoring system is ideally suited for network and security assessments or long-term monitoring where real network traffic is analyzed to identify abnormal traffic patterns, system vulnerabilities, and incorrect configuration of computer systems on the network. The monitoring system listens on a network, logs events, and takes action, all in accordance with a rule based system-wide policy. The monitoring system provides a technique that is able to incorporate external sources of event information, such as are generated in log files of other network components. The inventive technique of the monitoring system gets protocol information, which can make it more meaningful to a network administrator. It sends data upstream to an event log and interprets the data. It listens to secure protocols and can identify encryption quality of service parameters. It extracts basic security parameters, such as, for example, network events, and passes them to a policy manager component.

An important part of understanding the invention is understanding network security terminology for policy monitoring. See Table A below.

TABLE A

Terminology

Network Event: One complete transaction on the network, such as a FTP connection or a HTTPS transaction. Each network event has several component protocol events.
Protocol Event: A transaction at one protocol level. For example, a network event that represents an FTP connection has protocol events representing an IP association, a TCP connection, an FTP control connection, and several FTP control commands.
Initiator, Target: The endpoints of a network event or protocol event.
Credential: An identification of the initiator or target of a protocol event at a particular protocol level. For lower-level protocols, credentials are, for example, IP addresses or UDP port numbers. For higher level protocols, credentials are, for example, user names, file names, or public key certificates.
Association: A placeholder for a transaction run over a datagram-based protocol such as IP, ICMP or UDP. The invention herein constructs an association to collect a conversation between two hosts, or processes in the case of UDP. It is noted that when the invention misses any data packets between the two communicating computers, it might not be able to determine the initiator and the target of the association.
Associative array: A list of value pairs where each associative array entry is indexed by the first element of its value pair, which is called the key. Keys are stored in a hash table to make lookups efficient irrespective of the size of the associative array.
Rule: A policy rule governs a specific interaction, or set of interactions, between two communicating entities. The invention evaluates policy rules against protocol events to determine if the latter conform to the active security policy.
Disposition: The policy definition of what action or state change needs to take place in response to a network event.
Policy Domain: A top level segmentation of a network, roughly akin to a cloud-like object in a network diagram, which hides internal detail. Within the policy domain communities of hosts provide or access services. One community of hosts defines the limits of the domain.
Monitoring Point: A point within a policy domain where it will be possible to plug a machine into the network in order to collect packet data.
Communities of Hosts: A mechanism for grouping hosts that have a similar function, e.g. all web servers or all NT workstations.
Perimeter Element: A hardware device that allows access to and from communities of hosts outside a policy domain. Examples of perimeter elements are firewalls and routers.
Policy Language: A policy language is used to create a formal specification of a network security policy. The preferred embodiment of the invention incorporates the policy definition language of U.S. patent application number 09/479,781, filed Jan. 7, 2000, entitled, "A Declarative Language for Specifying A Security TABLE A-continued Terminology Policy." It defines first class objects such as rules,
credentials and dispositions. It is based on s-expressions, which
are LISP-like parenthesized expressions.
Rogue server: A machine introduced to a network that is not
authorized to be on that network.
Rogue router: An unauthorized router that is added to a network,
providing an alternate path into the network. Typically occurs
through misconfiguration of switches or dialup connections.
Real-time monitoring: Reading packet data off a network and pro-
cessing it to events in a stream, so that an event appearing in
the network causes a corresponding event in the stream a short
time later.
DLL: Any kind of a dynamically linked library System Overview The preferred embodiment of the invention translates traffic on the network into protocol events that are themselves combined into network events. As protocol events are detected, they are compared against a policy. The policy specifies a disposition of the network event, as defined by the observed series of protocol events. Information about the protocol events, the network event and its disposition is stored in a database. This database of network traffic information can be mined for policy violations.

This preferred embodiment of the invention is described with reference to FIG. 1a. FIG. 1a is a schematic diagram of components of the system according to the invention. The system comprises a policy monitoring component 100 that takes as input a policy file 105 that has been generated using a policy generator wizard 110 or other means, and a file containing network packet dump data 115 that has been collected from an observed network 125 by a packet capture 126, or that has been processed by a protocol monitor processor 127. The system can also process packet event data from the observed network 125 in a continuous real-time mode, without first storing packet data to a file.

The policy monitoring component 100 comprises a policy manager component 106 that itself comprises a parser 101 for parsing the policy file 105, a policy engine for 102 for assigning policy dispositions to network events, and a logger 103 for determining how to log the information processed by the policy engine 102, according to an input logging policy 130. It also comprises a database 104 for storing synthesized information of the packet dump's 115 conformance to the specified policy 105 performed by the policy engine 102, where it can be mined with a query tool 135. It also comprises a report script component 160 for querying the database 104 and creating reports 161, and an alarm script component 155, for generating alarms based on the severity of the disposition assigned to network events.

An equally preferred embodiment of the invention also comprises a parser tool 150 that takes the policy specification file 105 as input and automatically generates an English description of the policy 151 for the end user. The parser tool 150 is optional.

An equally preferred embodiment of the invention also provides a secure Web server feature 162 for the end user to review reports from the end user's host computer 163. The secure Web server feature 162 comprises the Web server 164 and a report database 165 that hosts the reports 161 generated using the report script 160. The Web server feature 162 is optional.

An equally preferred embodiment of the invention provides secure management connections (141, 142) and a secure management host 140 for managing the policy monitoring component 100 and the combination of the network monitoring components 128, respectively.

Figure 1B:
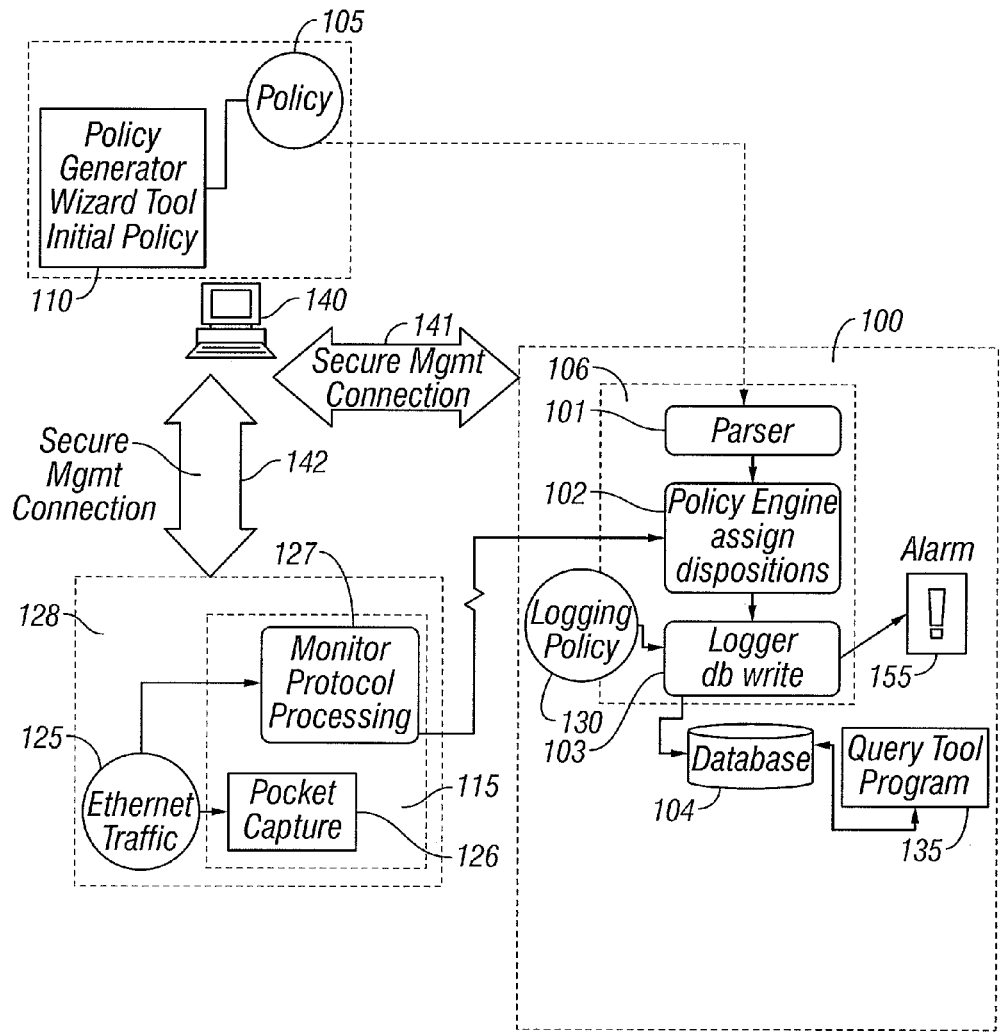
FIG. 1b is a schematic diagram of components of the system according to the invention.

FIG. 1b shows a simpler embodiment of the invention, wherein the parser tool 150 and the secure Web server feature 162 are omitted.

The default action of the policy engine 102 is that it denies all traffic. The policy 105 opens holes in this denial to allow permitted traffic to flow. Although the policy engine 102 assigns a single disposition to an entire network event, the protocol events are significant. As network data 115 arrives, the policy engine 102 interprets protocols and generates updates of protocol event information. The policy 105 is consulted as each new piece of information arrives, so that the earliest determination of disposition is reached. For example, if the policy 105 states that a given IP address may not communicate with another IP address, the policy 105 can generate a disposition immediately upon receiving the first packet 115 of the network event.

To aid policies in early determination of disposition, the policy language divides dispositions into immediate and final. An immediate disposition fires immediately, i.e. its value becomes associated with the network event right away. A final disposition sets a bookmark to itself as the latest and best disposition. When all protocol events are processed without an immediate disposition, the last bookmark set is the disposition that is applied to that network event. Immediate dispositions are designed to generate early results and to allow policy writers to issue a definitive disposition for the network event based on the information received up to that point. Final dispositions allow for the possibility that a better disposition might be determined later on. In other words, they allow the policy engine 102 to make a more informed decision based on additional protocol events that might be received as the network event progresses.

Overview of the Components

An overview of main components of the preferred embodiment of the invention is discussed below with reference to FIG. 1.

Policy Generator

The preferred embodiment of the policy generator component 110, also referred to as policy wizard, is a program that makes an end user readily able to generate a first-pass policy for a new site. Policy information is input into a set of dialog boxes and a policy is generated. The wizard enables the end user to generate policy based on what can be considered gross characteristics of a network at the IP level, such as, for example, policy domains, communities of hosts, servers, subnets and firewalls, as well as at the UDP/TCP service level. For example, such network characteristics can comprise communities of hosts that can access certain services on server hosts.

Once a policy has been generated with the wizard, it is output in the policy specification language 105 so that it may be directly processed by the policy monitor component 100. The policy wizard 110 is also able to save files at the wizard level, i.e. such that the policy may be refined in the wizard and re-generated.

Policy Monitor

The policy monitoring component 100 comprises a suitable user interface, such as an MFC-based front end or a command line interface, and the policy manager 106. The policy manager 106 performs the actual examination of a sequence of event updates stored in a file or transmitted in a continuous stream 115 in the context of a policy specification 105 and signals the adherence to the policy via records written to the database 104.

Network Monitor

The network monitor component 127 provides the following capabilities:

Streams-based interpretation of packet dump data 126 in, for example, DMP format; and Packet- and connection-based textual logging of protocol information. Logging is selectable by protocol and may be enabled only for one or more connections. In another embodiment of the invention, the network monitor 127 can perform serialization of event data. That is, the network monitor 106 can process a packet capture file 126 into a series of event updates that contain only the salient security details for processing by the policy monitor 100. The resulting file is significantly smaller than the original, for example, approximately $\frac{1}{20}^{th}$ to $\frac{1}{100}^{th}$ the size of the original. It is also possible for sensitive data, such as passwords and documents, to be removed from the file. However, it should be appreciated that the original packet capture file is needed to perform full analysis.

In another embodiment of the invention, the network monitor 127 can read packet data directly from observed network 125, generating a continuous stream of event updates for the policy monitor 100. This stream operates in real-time so that the policy monitor 100 processes events shortly after they happen on observed network 125.

It should be noted that the network monitor 127 can be used as a standalone tool, but typically is invoked from within the policy monitor component 100 and the query tool 135 in normal operation of the invention.

It should also be noted that the network monitor and the policy monitor may run on the same machine.

For a more detailed discussion on the internals of the network monitor, refer to the section, below entitled "Network Monitor Internals Descriptions."

Query Tool

The query tool 135 allows the end user to view the data that has been stored in the database 104 by the policy manager 106.

Policy Compiler

The policy compiler performs syntactic and semantic checking of a policy specification. Upon successful compilation the compiler as controlled by runtime arguments, may:

Generate a DLL containing a compilation of credential and condition verification code; and Generate a pseudo-english report that summarizes the policy.

It should be appreciated that it is not necessary to run the compiler because the policy monitor component automatically compiles and installs policy from the policy specification file.

Platform

The policy generator 110 runs on a Windows NT or Unix machine, while the policy monitor 100 and the network monitor 127 run on Linux machine(s). It should be appreciated that these components can run equally well on other suitable operating systems. In addition to policy and network monitoring software, the following software components are also installed on the appropriate machines:

Microsoft Visual C++ 6.0;
Sybase ASE 11.9.2; and
NT NDIS packet drivers and Windump 2.0.

It should be appreciated that these components can run equally well on other compilers, databases, and packet monitoring systems.

Policy Files

There are two file types that are used within the invention's environment, and are described below in Table B.

TABLE B

| File Type | Suffix | Description |
| --- | --- | --- |
| Policy wizard File | .spw | Intermediate file used by the policy wizard to store policy information between invocations. |
| Policy monitor File | .spm | Output file generated by the policy wizard and used as the policy input into the policy monitor. Contains a description of the policy in the policy language. |

The preferred embodiment of the invention incorporates a high level workflow method for developing policy, as follows:

1) Creating an initial policy using the policy generator tool;
2) Uploading the policy file to a remote machine;
3) During the initial policy development phase, running the network monitor to collect traffic, and the policy monitor to analyze traffic separately, as follows:
   a) Running the network monitor and specifying an output file of the collected traffic, and possibly specifying via parameter a limit to the number of packets captured, e.g. 50,000;
   b) Running the policy monitor to analyze traffic collected by specifying the file containing the collected traffic;
4) Examining the output of the policy monitor run by querying the database using the query tool;
5) Modifying the policy as needed using the policy generator tool; and
6) Repeating steps 2 through 5 until a comprehensive desired policy is defined. At this point the end user may start monitoring network traffic on a continuous basis, and using generated reports as input for further policy refinement.

High Level Workflow Example

The high level workflow described above can be illustrated further by understanding an example, as follows. System components of the invention are referenced using FIG. 1. Screen interactions are described with reference to the preferred embodiment of the invention. Other screen displays with similar function might equally well embody the invention.

Figure 2:
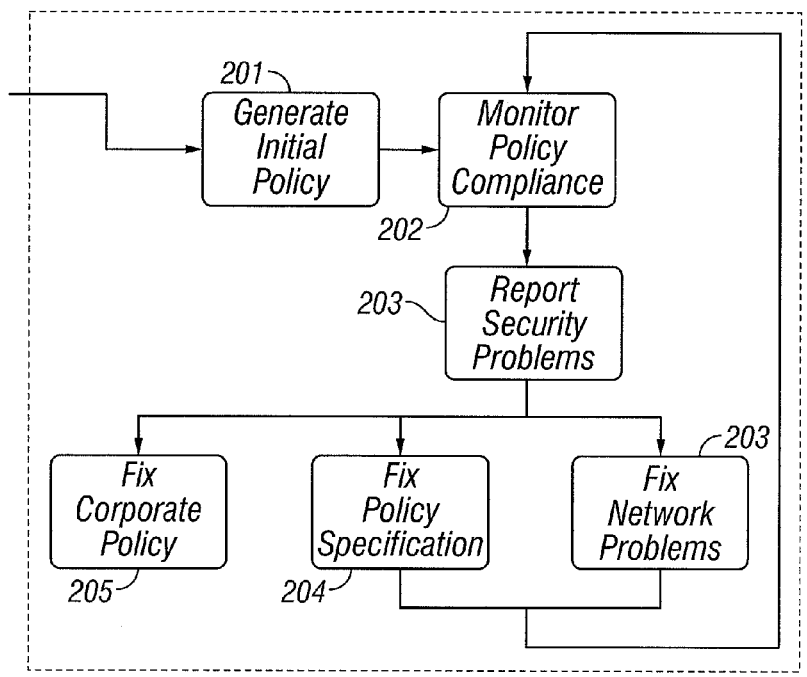
FIG. 2 is a high level workflow flow diagram according to the invention.

Referring to FIG. 2, an initial policy is generated (201). Often the initial policy is created from corporate network policy, in whatever form that may take, and a network topology diagram. For the sake of this example, it is assumed that the policy wizard 110 was used to generate an initial, simple policy 105.

Next, compliance of current network traffic to this initial policy is monitored (202). Such monitoring is achieved by collecting packet information off the network and running such data 115 against the initial policy 105 using the policy monitor 100.

Then the query tool 135 is used to data-mine output network event data from the database 104, using the mined data to check for traffic that is not consistent with the policy 105, and reporting the results (203).

Once anomalies have been found, the next step is to work out where the problem lies. The problem could be network equipment is misconfigured and needs to be corrected (203); otherwise acceptable behavior is not covered currently by the policy specification file the file needs to be corrected (204); or, otherwise acceptable behavior is not covered currently by the corporate policy and the corporate policy needs to be corrected (205). In the case of this example, it is assumed that the policy specification 105 is incomplete and an end user needs to add a new rule to permit the observed traffic pattern.

Generate a Policy Specification File from a Wizard Policy

Figure 3:
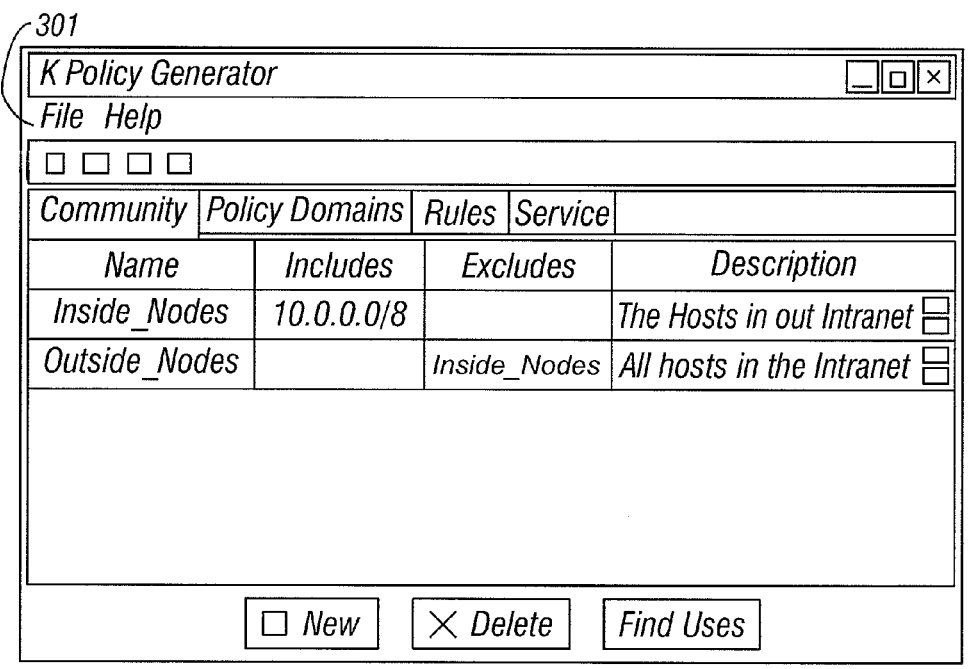
FIG. 3 is an example of a policy wizard dialog box according to the invention.

The end user starts the policy generator tool, or wizard 110, by double clicking on a policy wizard shortcut on the end user's desktop. In the preferred embodiment, a window such as depicted in FIG. 3 opens.

In this example, the end user has opened a file, c:\spm\quickstart\null.spw, through the File->Open menu item 301. This file contains a very simple policy that defines a single policy domain defined by a 10.0.0.0/8 subnet mask. Rules within this policy deny essentially all traffic.

The end user chooses to compile the policy, whereby the dialog box in FIG. 4 opens. The end user presses the "Process Policy" button 401 and a file named null.spm in the output file entry field 402 is generated and saved.

Figure 4A:
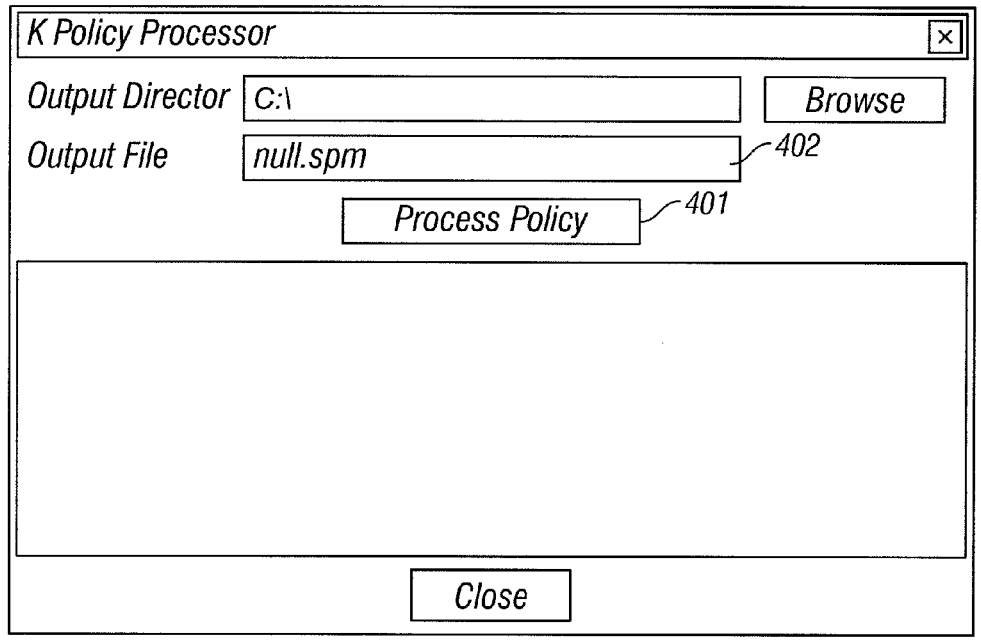
FIG. 4a is an example of a policy wizard dialog box according to the invention.
Figure 4B:
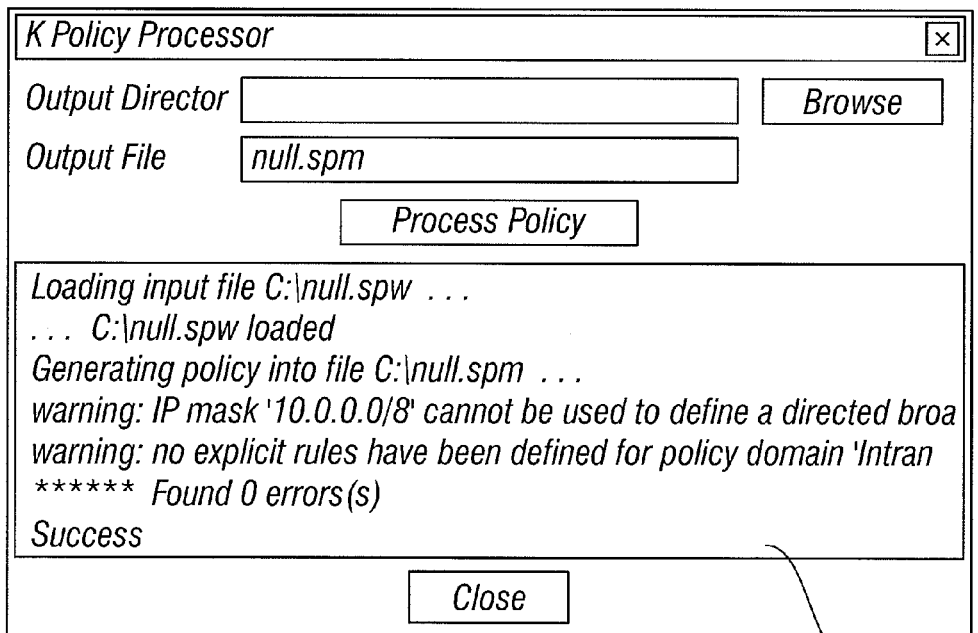
FIG. 4b is an example of a policy wizard dialog box according to the invention.

FIG. 4b shows the dialog box in FIG. 4a with printed results from the compile process in a text window 403.

File Running Policy Monitor Over Canned Data

Figure 5:
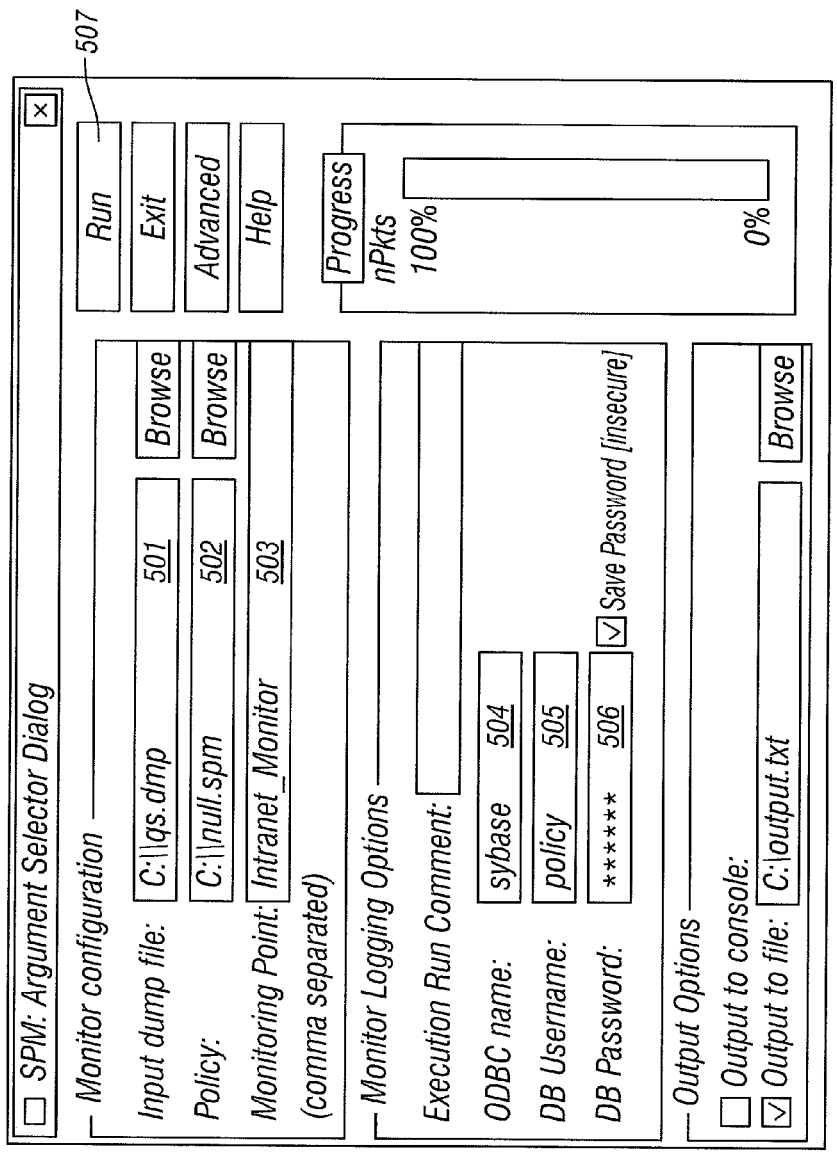
FIG. 5 is an example of a policy monitor dialog box according to the invention.

The end user starts the policy monitor 100 by double clicking on a policy monitor shortcut on the desktop. In the preferred embodiment, a window such as depicted in FIG. 5 opens.

The end user ensures that the "Input Dump File" entry field 501 points to a data dump file, here qs.dmp, and that the "Policy" entry field 502 points to the null.spm (monitor) file that the end user generated above. The "Monitoring Point" entry field 503 is derived from a policy domain name "Intranet" that is present in the null.spw (wizard) file.

The end user ensures database connectivity information is set correctly. The ODBC entry field 504 with entry "sybase" points to a Sybase database running on a local machine. The username "policy" 505 with some password, shown as "******" 506 have been preinstalled.

The end user presses the Run button 507 and the .dmp file is processed through the policy specification file 105 placing the output data into the database 104.

Look at the Results Using Query Tool

Figure 6:
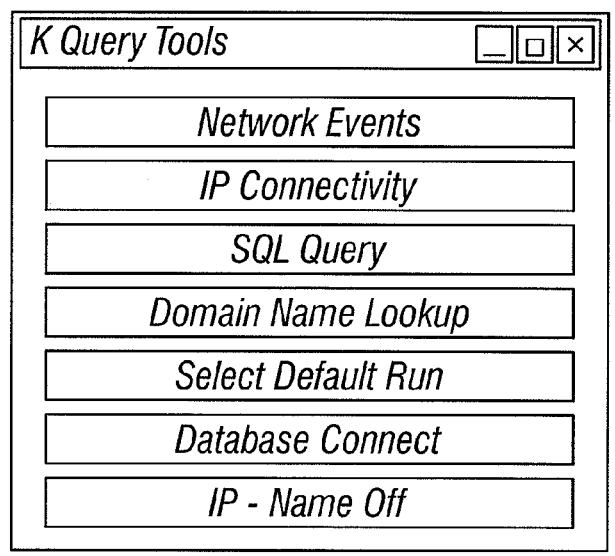
FIG. 6 is an example of a query tool dialog box according to the invention.

The end user starts the query tool 135 by double clicking on a query tool shortcut on the desktop. In the preferred embodiment, a window such as depicted in FIG. 6 opens.

Figure 7:
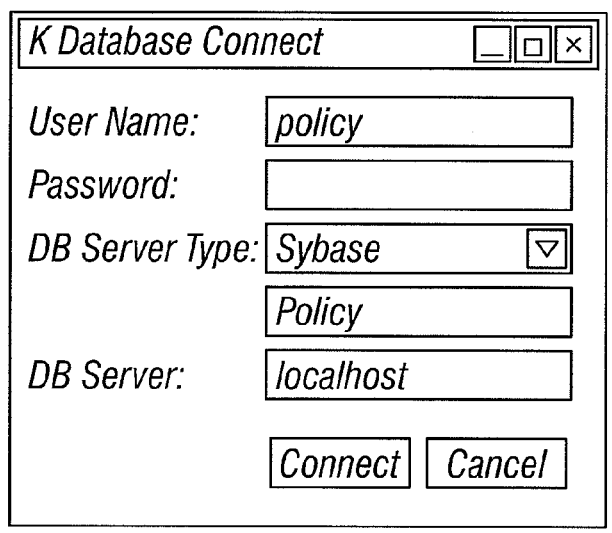
FIG. 7 is an example of a query tool dialog box according to the invention.

The end user presses a "Network Events" button 601 and the dialog box depicted in FIG. 7 appears. FIG. 7 is a dialog box that allows the end user to enter login information for the database 104.

Here, the end user enters the same username and password as was used in policy monitor 100 and connects to a database 104 named Policy on localhost.

When connected, the screen shown in FIG. 8 appears. FIG. 8 is a dialog box that allows the user to select which processed network data to view from database 104. The topmost entry in the "Execution Run" pull-down contains most recent data was added to the database 104. In this case it is current processing of the qs.dmp file. The end user presses the "Query" button and network event information for this run is retrieved from the database 104 and shown in as in FIG. 9.

FIG. 9 shows a queried rule view dialog box according to the preferred embodiment of the invention. FIG. 9 shows that the null.spw policy has denied all traffic. The network events having disposition Udp_Access_Denied represent DNS lookups from an internal host (10.5.63.143) to another internal host (10.5.63.6). It is assumed for this example that this is traffic conforming to policy, and therefore the end user adds a rule to the policy to permit this event.

Add a New Rule Using the Wizard

Figure 10A:
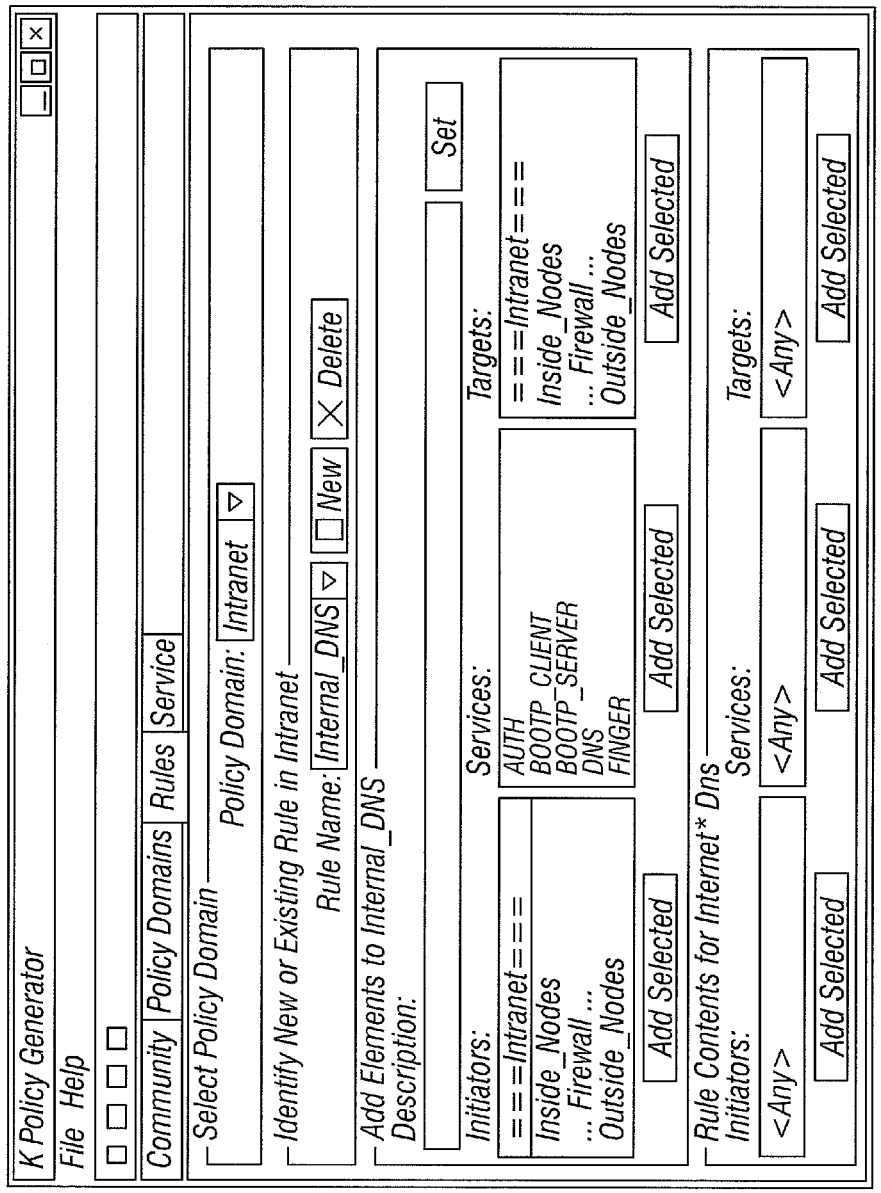
FIG. 10a is an example of a policy wizard dialog box according to the invention.
Figure 10B:
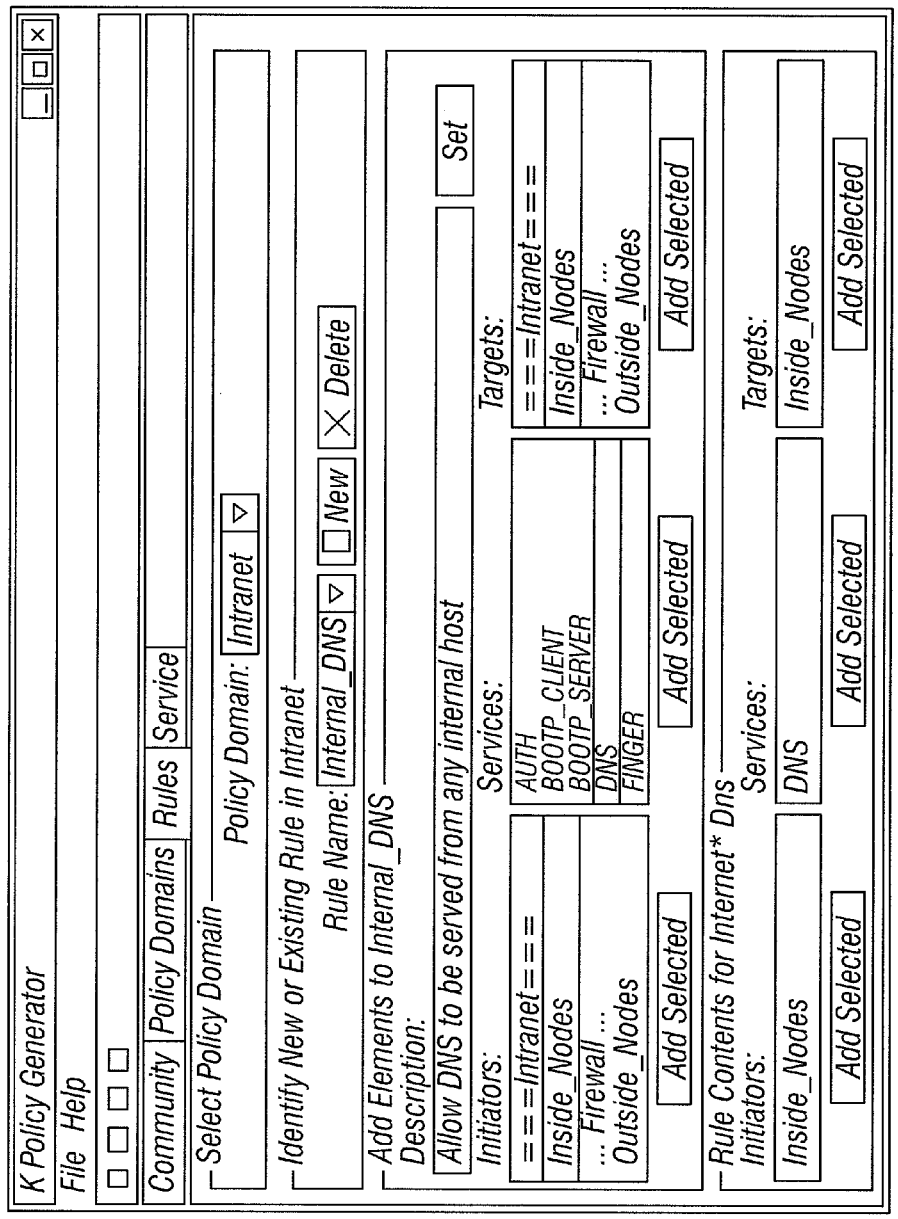
FIG. 10b is an example of a policy wizard dialog box according to the invention.

The end user returns to the policy wizard main window and presses the "Edit Rules" button which opens a dialog box as shown in FIG. 10a. FIG. 10a shows a dialog box for generating a new rule according to the invention. The end user selects the "Intranet" domain from the "Policy Domain" pull-down to add a rule for our Intranet domain. The end user types a rule name, such as Internal_Dns into the "Rule Name" field and presses the "New" button. The end user selects the communities and services to which this rule applies. For simplicity in this example, the end user wants to allow DNS from any internal nodes to any other internal nodes and therefore selects an Initiator community of hosts Inside_Nodes, a service of DNS, and a Target community of hosts Inside_Nodes. The end user then presses the "Add Selected" button for each in turn to create a rule as shown in FIG. 10b, where FIG. 10b shows a dialog box for generating a new rule according to the preferred embodiment of the invention.

Figure 10C:
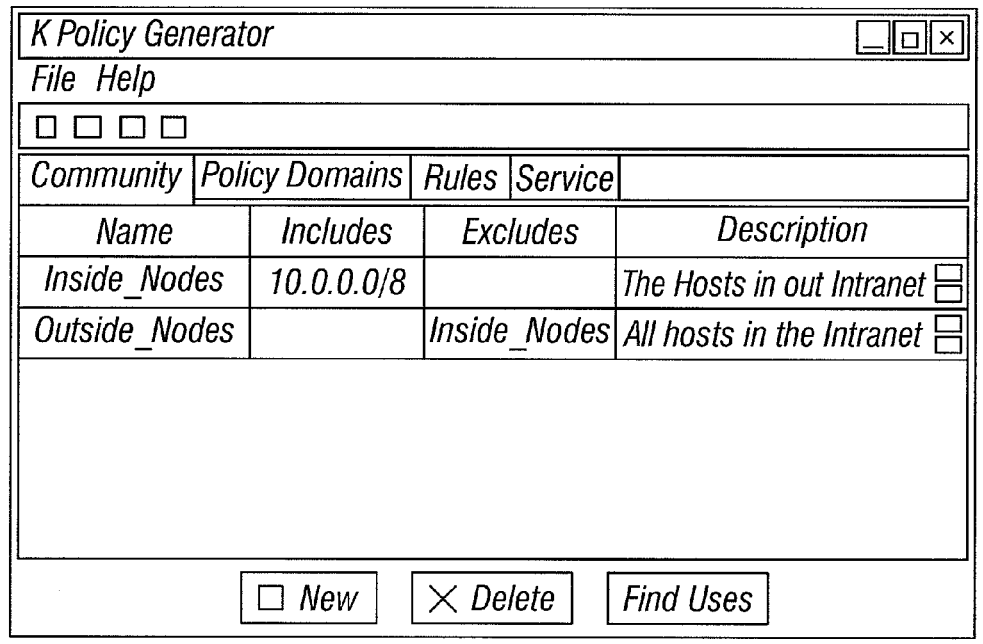
FIG. 10c is an example of a policy wizard dialog box according to the invention.

Next the end user generates a new policy specification file and runs policy monitor. The end user returns to the query tool and presses the "Network Events" button again to get a new rule view dialog box. The topmost "Execution Run" is now the output from the processing just completed. The end user presses the "Query" button and can now see that DNS traffic from 10.5.63.143 to 10.5.63.6 is now conformant to the policy as shown in FIG. 10c, where FIG. 10c shows the communities of the policy specification.

Detailed Description of Components

The preferred embodiment of the invention incorporates the following components, detailed description of which follows below.

The Policy Generator Tool

The preferred embodiment of the invention provides a policy generator tool, or simply policy generator, equally referred to as policy wizard, that provides a level of abstraction on top of the policy language, and which simplifies the process of creating an initial policy based on gross characteristics of a network at the IP level, such as policy domains, communities of hosts, servers, subnets, firewalls.

The policy generator provides a novel mechanism for translating desired network security policy, such as corporate network security policy, into a policy specification file that can be interpreted and implemented by a policy monitor mechanism.

Building a policy with the policy wizard involves: deciding on logical divisions within the network, i.e. policy domains, grouping network nodes into logical communities, and expressing rules about which communities of hosts can provide what services to which communities of hosts.

High Level View of Policy Generation

The first step in building a basic policy is to define a high-level topology for the network. Not much detail is necessary. In the preferred embodiment of the invention, the network needs to be divided into bounded units called policy domains. In practice, the choice of a policy domain boundary is fairly obvious. Usually natural logical and physical boundaries in a network help define policy domain boundaries. For example, firewalls and routers with packet filters commonly denote the important boundaries. When defining a simple policy, it is reasonable to ignore switches, bridges, hubs, and routers that connect interior subnets.

It is suggested that policy domains be as small as required by traffic monitoring limitations and as large as specification of rules allow. Rules are written about traffic visible in a policy domain. Traffic in a policy domain is logically considered to be visible anywhere within the policy domain even though networking elements, such as, for example, switches prevent such visibility in most networks. By writing rules about traffic as though it is visible anywhere within the policy domain, the same set of rules can be applied to network traffic anywhere within the policy domain.

It has been found that if a policy domain is too small, rules need to be duplicated for each extraneous policy domain. If a policy domain is too large, then the choice of a network traffic monitoring point can become overly constrained, or the ability to detect IP spoofing and rogue routers is lost.

Identify the Policy Domains

Figure 11:
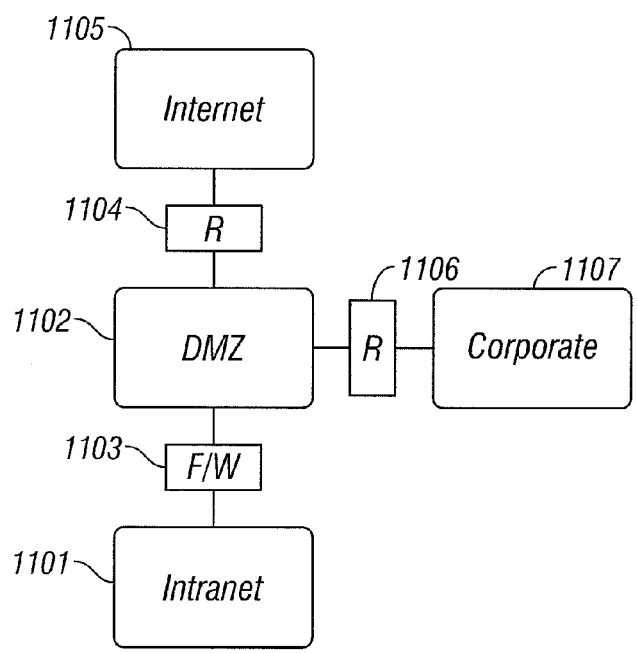
FIG. 11 shows a high-level view of an example network according to the invention.

FIG. 11 shows a high-level view of an example network. An Intranet 1101 is connected to a DMZ 1102 through a firewall 1103. The DMZ 1102, in turn, connects through a router 1104 to the Internet 1105 and through a second router 1106 to an external corporate network 1107. In this example, an end user is only expected to be able to monitor traffic in the Intranet and DMZ, so these two entities are declared to be policy domains. Rules in the policy only apply to allowed traffic in the DMZ and Intranet. The corporate network and Internet are viewed only as communities of hosts visible from within the policy domains.

It should be appreciated that the end user could choose to declare the Internet and Corporate network to be policy domains, but, by doing so, would only create unnecessary work because the end user does not intend to monitor traffic there. Any rules generated would thus never be used.

Add Perimeter Elements

In the preferred embodiment of the invention, the point of connection of a policy domain to the outside world is known as a perimeter element. For each perimeter element the set of nodes visible through it needs to be known and, for generating rules to detect IP spoofing and rogue routers, the MAC address of the perimeter element itself needs to be known.

As an example, if an end user could sit inside a policy domain and look out through boundaries, it is probable that the end user would see a filtered version of what is on the other side. Network address translation (NAT) can change the IP addresses seen though the boundary. For example, a proxying firewall may not let the end user see anything directly beyond a single IP address at the boundary. Filters may limit the view to only a few hosts when thousands are actually present.

Define Communities

In the preferred embodiment of the invention, communities consist of sets of IP addresses. They can be expressed as, for example, individual IP addresses, ranges of addresses, or subnet masks. Additionally, communities can be composed of other communities. It is often the case that a community of nodes involves all nodes in some existing set except for a node or two. Communities are defined in terms of included elements and excluded elements.

Define Rules for Each Policy Domain

In the preferred embodiment of the invention, rules defined for a policy domain describe allowed transactions. For example, if no rules are written, the policy specifies that everything at the IP level or above is denied, although this specification is not strictly true because typically auto-generated rules that apply to IP broadcast traffic and ICMP traffic within the policy domain exist. Rules create holes in this base layer that declares all traffic illegal.

Rules are defined in terms of initiator communities, target communities, and the services allowed. Services consist of a set of port numbers and indicators of whether TCP or UDP protocols are used.

Using the Policy Generator

The preferred embodiment of the invention provides a front end for the policy generator. It provides a user interface for entering and editing a simple policy. The front end reads and writes the current state of a policy from or to an intermediate file. The currently preferred extension for the intermediate file is .spw. When a policy has been specified to the satisfaction of the end user, it is written to an intermediate policy file for processing by the policy generator backend that generates a formal policy specification file compatible with the policy monitoring system.

The front end allows the end user to edit policy domains, communities, services, and rules, to read and write the current policy from or to an intermediate file, and to process the intermediate policy file into the formal policy specification file.

The preferred embodiment of the invention allows several instances of each editing process to be open simultaneously. The interaction is intended to feel very live. Data changed in one editing process should be reflected in the contents shown in other editing processes. For example, if a community is added in one community editing process, then it is immediately available for use in all editing processes. When building a policy, entities are first created, then filled in. From the time of creation they can be used throughout the policy. Consequently, a community or policy domain does not need to be fully specified in order to be used. However, to prevent errors in backend processing, all entities should be complete before the intermediate policy file is submitted to the backend for policy specification file generation.

In the preferred embodiment, only one policy is under development at any time. The front end starts up containing a default policy that is empty except for some predefined default services. This policy can be used as a starting point or an existing policy can be read from a saved intermediate policy file.

It has been found that it is best to use simple names in developing a policy and to use a name that makes sense from a predetermined point of reference, not a fully qualified name that makes sense from any point of reference. For example, it is better to give a rule a short, descriptive name such as, "Allow_Outgoing_Mail" than to give the rule a long name such as, "Allow_Mail_From_Intranet_To_Outside_Intranet".

For an in-depth understanding of the formal policy specification generated by the policy generator, or policy wizard, please refer to the section, Understanding the Wizard Generated Policy, below.

Collecting Packet Data

The preferred embodiment of the packet gathering component 128 is a program referred to as the harvester. It reads packets off the observed network 125 and writes them to either a packet capture file 126 or to a TCP socket that is connected to the policy monitor 100.

As an example, the harvester reads packets off the network when invoked as follows:

harvester -i eth0 -c 1000 -dump qs.dmp

In this example, 1000 packets are read from a network interface labeled 'eth0' and stored in file 'qs.dmp.'

The harvester can also be configured to read packet data and convert it to event data suitable for policy monitor 100. As an example, the harvester may be invoked as follows:

harvester -i eth0 -c 1000 -enc qs.dme

In this example, 1000 packets are read off the network interface labeled 'eth0', converted to event data suitable for policy monitor 100, and stored in the file 'qs.dme'.

The harvester can also be configured to read packet data, convert it to event data suitable for policy monitor 100, and stream such data directly to the policy monitor in real time. As an example, the harvester may be invoked as follows:

harvester-i eth0 -c 1000 -enc 10.5.63.6:333

In this example, 1000 packets are read off the network interface labeled 'eth0', converted to event data suitable for policy monitor 100, and transmitted in a TCP network stream to port 333 on the machine with IP address 10.5.63.6. This machine and TCP port may be configured so that the policy monitor 100 reads the data and processes it.

It should be appreciated that the events are transmitted as they are processed, so that the policy monitor 100 is able to see events shortly after they occur on the observed network 125.

In this mode of operation, the policy monitor 100 is also able to pass information about policy dispositions back to the harvester. The harvester can use this information to make processing of packets more efficient. For example, if the policy monitor 100 has determined that, a given network event is acceptable according to the policy, the monitor can sometimes expedite its protocol processing by skipping packets until the network event terminates.

Policy Monitor

The preferred embodiment of the invention provides a policy monitor component that provides a user interface, either graphical or command line, that allows the configuration of various options of the monitor, policy engine and logger.

Monitor Configuration

Monitor configuration allows the end user to configure the location of the input packet dump, policy to be used, and the specification of the monitoring point.

The Input dump file specifies the input file, in tcpdump format that is to be used.

The Policy input specifies the spm file that contains the policy specification to be used.

The Monitoring Point is a specification of where the Input dump file was collected. This name is derived from policy domain names that are specified in the policy wizard. For example, if a packet dump was collected in a policy domain named "Intranet" then the Monitoring Point name INTRANET_MONITOR should be used.

Monitor Logging Options

The monitor logging options allow the end user control of the location and the amount of data that gets written to the backend database.

The Execution Run Comment field allows the entry of freeform text that is added to the logs in the database to help identify this particular run of policy monitor.

ODBC Name provides the name of the ODBC source to which output data is written. The DB Username and DB password are the end user's database login information. The Save Password allows the program to save the password in the clear so that it does not need to be entered the next time the program is run.

Output Options

Output options allow the end user to specify whether the trace output from the monitor should be displayed in a console window (Output to console) or sent to a file (Output to file:).

Advanced Options

Advanced options allow more options to be set. In day to day operation, it is rare that such options need to be changed.

Advanced Monitor Configuration

An Assert DLL parameter allows specification of the name of the DLL to be used to verify condition and credential assertions. Note that if this DLL does not match the version of the policy specified then this DLL is regenerated, overwriting the provided DLL.

A Trace Options parameter allows the end user to provide configuration of runtime trace options. This option affects the amount of output generated by the monitor. For a more efficient operation, this field should be left blank.

A Certificate Dir argument points to a directory that contains trusted CA root certificates in DER encoded form.

Advanced Packet Logging Options

The packet logging options section allows the configuration of the trace options to be provided by the low level packet monitor. The various logging options may be specified at a global level (by setting them for layer "-All-") or individually on a per-layer basis. Again it is to be noted that specifying logging options adversely affect the performance of the monitor.

The Site Handle parameter specifies a name that is associated with the particular company or site that is being monitored. It is used to segment a table that is used for IP-address name resolution within the output database.

Advanced Monitor Logging Options

The Disable Logging checkbox disables the writing of all logging data to the database. If logging is enabled then the remaining checkboxes provide for the enabling or disabling of the logging of network events with the given final disposition code. For example, if Disable Logging is not selected and only Policy Error selected then the only network events that are logged to the database are those that resulted in a final disposition code of POLICY_ERROR.

During normal operation information about all protocol events within a network event is logged, even those that occurred after a final disposition was reached. An Enable All Layer Logging parameter can control this feature. When set on, all protocol events are logged to the database. When not set only those protocol events that are processed before a disposition is reached are logged.

QueryTool

The preferred embodiment of the invention provides a query tool to examine the data that was placed in the database. The preferred query tool allows the following functions to be performed:

Examining network events, such as protocol events, that are contained within the execution runs in the database;
Examining IP Connectivity for execution runs in the database;
Editing and making user defined SQL queries to the database;
Performing forward and reverse DNS lookups (using the current DNS configuration);
Viewing policy monitoring run information from the database, and selecting a default run for further viewing;
Explicitly connecting to a specific database; and
Turning on/off IP address to hostname resolution.

Other Tools

The preferred embodiment of the invention provides other tools discussed below.

Compiler

In its simplest form the compiler needs just a single argument that is the input policy specification file. This form is often all that is needed while doing initial development of a policy. It should be appreciated that the compiler is rarely used in standalone form since its function, with the exception of the -r flag, is subsumed into the policy monitor component.

Example Usage

During initial development a command such as the following could be used while getting rid of syntactic and semantic errors from the policy under development:

pmsCompiler.exe security.pms

Once compiler errors are gone, the end user is ready to generate pieces that are used to run the policy monitor. For example, the end user can use the command line:

pmsCompiler.exe -d verify security.pms that compiles the security policy, and generates a verification DLL named "verify.dll".

Compiler Options

The following arguments in Table C may be provided to the example pmsCompiler.exe.

TABLE C

```
pmsCompiler -? -r
              -c <cxx-file> -d <dll-file>
                    <policy-file>*
-c <cxx-file>
Generate Credential and Condition assertion verification code to the named file. The
suffix ".cxx" is appended to the name that is provided. This option is rarely used to allow
the end user to look at the actual code that is used to verify assertions.
-d <dll-file>
Generate a DLL containing the assertion verification code to the named file. The suffix
".dll" is appended to the name that is provided. If the -d flag is used without the -c flag
then the source code is written to a temporary file. This option is often used to generate
the assertion verification DLL. The alternative is to allow the runtime Policy Monitor to
generate the DLL for itself.
-r
Generate a pseudo-english description of the policy to stdout. The output of this
command is a useful starting point for a policy report to a customer.
-?
Display a usage string.
<policy-file>
The required policy specification (".pms") file.
-b <db-name>
Store information about the compiled policy in the named database. db-name is the
name of a user data source that has been configured within Control Panels->ODBC. This
argumant is rarely used. The alternative is to allow the runtime Policy Monitor to write
the policy to the database if needed.
-o <output-file>
Redirect compiler messages to stdout to the named output file. Rarely used.
-t <trace-opts>
Enable debug tracing. For more specific details try providing the argument "-t ?". This
option is rarely used because it only provides information to allow debugging of the
compiler itself.
-v
Use VisualC++ to preprocess macros rather than the internal preprocessor. This
overrides the -n option. This option is rarely used.
Add debug trace code, i.e. printf statements, to the generated Credential and Condition
verification code. The generated code is compiled with symbol information (the C
compiler -g flag). This option is rarely used.
-n
Do not run a preprocessor. C preprocessor macros such as #define and #include may be
included within a policy file. This option specifies that the pre-compiler should not be run
prior to actually compiling. This option is rarely used.
-z
Output the dump output of the parsed policy. This output looks remarkably similar to the
input file with the comments stripped and some component definitions recorded.
```

Network Monitor

The preferred embodiment provides a streams-based network monitor that can be run in a standalone mode independent of the policy monitor. In this way it can be used to provide a detailed, streams-based view of the network traffic, or a subset thereof. For example, run in standalone mode is desirable when a particular protocol is not supported natively by the policy monitor and an end user desires to see raw data to gain an understanding of what is going on.

It should be appreciated that a convenient way of accessing such functionality is through the query tool.

Example Usage

The following invocation of the network monitor:

mon -ev 2 -I ALL=all C:\spm\quickstart\qs.dmp examines the qs.dmp file, producing extremely verbose output for event 2 only.

Table D provides a list of network monitor options according to the invention.

TABLE D

Monitor Options mon [−log LAYER[=[−]option1,[−]option2...]]*
[−n npkt] [−skip pkt] [−until endpkt]
[−ev eventID] [−untilev eventid] [−justev eventid]
[−noclients] dump_file
−log
−n npkt
Only process the first npkt packets from the input data.
−skip pkt
Skip pkt packets before beginning to process the input data.
−until endpkt
Only process data through the packet number provided is reached
−ev eventID
Only process the data starting at the given eventID.
−untilev eventid
Only process the data through eventid. Note that to find the end of eventid, events with ids greater than eventid may be processed.
−justev eventid
Only process the data for eventid. Note that to find the end of eventid, events with ids greater than eventid may be processed. This option is the equivalent of −eventid −untilev eventid.
−noclients
Do not generate any output for higher level protocols such as HTTP, FTP, etc.
dump_file
The dump file, in tcpdump/windump format, that contains the input data.

guage is taught in A Declarative Language for Specifying a Security Policy, patent application Ser. No. 09/479,781 (Jan. 7, 2000).

Understanding the output of the preferred query tool requires understanding how the preferred wizard translates the high-level view of security policy it presents to its users into a set of policy language objects such as rules, credentials and dispositions.

Understanding the policy generation process involves the following:

Understanding the predefined rules, credentials and dispositions;

Understanding the implicit rules and credentials; and

Understanding the explicit rules and credentials.

Predefined Rules, Credentials and Dispositions

Every policy generated by the wizard includes a set of predefined default rules for handling protocol events that do not conform to the user-defined policy i.e. rules that deny access, as well as rules for handling common network events not covered by the user policy. These rules and their dispositions are shown in Table E and Table F, and further discussed below.

TABLE E

| Rule | Protocol-Action | Description |
| --- | --- | --- |
| Ip_Deny | IP-all | Ip_Access_Denied |
| Icmp_Deny | ICMP-all | Icmp_Access_Denied |
| Udp_Deny | UDP-all | Udp_Access_Denied |
| Tcp_Deny | TCP-all | Tcp_Access_Denied |
| Http_Deny | HTTP-all | Http_Access_Denied |
| Ftp_Deny | FTP-all | Ftp_Access_Denied |
| Ssl_Deny | SSL-all | Ssl_Access_Denied |
| Ssh_Deny | SSH-all | Ssh_Access_Denied |

Table F shows the default rules for all the protocols supported by the policy monitor. The policy engine selects these rules when no other rule can be found that is satisfied by the protocol event.

TABLE F

| Rule | Protocol-Action | Disposition |
| --- | --- | --- |
| Ip_Deny_Pure_Ip | IP-PROTOCOL_UNKNOWN | Deny_Pure_Ip |
| Tcp_Missed_Connections | TCP-MISSED_CONNECT | Warn_Missed_Tcp_Connect |
| Ftp_Ignore_Data_Connections | FTP-DATA_OPEN | ok |

Understanding the Wizard Generated Policy

Using the Policy Generation Wizard, a user specifies a network security policy in terms of the network services provided by certain hosts to other hosts in the network. When such policy is processed, the wizard generates a formal and more detailed description of the network security policy using the policy language. The policy language specification may then be used to analyze network traffic using the policy monitor tool. The results of this analysis can be studied using the query tool. An exemplary policy language.

Table G below shows rules that cover protocol events not addressed by the wizard's user interface. These are well understood events that can be separated from those handled by the default rules. Ip_Deny Pure_Ip is assigned to IP associations whose payload is not one of the three well-known IP-based protocols (ICMP, UDP and TCP). Tcp_Missed_Connections is assigned to network events where the establishment of the TCP connection was not witnessed by the policy monitor. Ftp_Ignore_Data_Connections is assigned to all FTP data connections which, from a security policy monitoring perspective, can be safely ignored. It is noted that the preferred policy wizard generates other rules to deal with common protocol events as discussed below.

Table G shows the predefined dispositions used by all the rules in the generated policy. Associated with each disposition are its disposition code and severity, which may be used in the query tool to filter network events.

TABLE G

| Disposition | Disposition Code | Disposition Severity |
|---|---|---|
| ok | OK | None |
| policy-error | POLICY_ERROR | CRITICAL |
| Ip_Access_Denied | ACCESS_DENIED | HIGH |
| Deny_Pure_Ip | ACCESS_DENIED | HIGH |
| Monitor_Broadcasts | OK | MONITOR |
| Icmp_Access_Denied | ACCESS_DENIED | HIGH |
| Monitor_Icmp | OK | MONITOR |
| Udp_Access_Denied | ACCESS_DENIED | HIGH |
| Tcp_Access_Denied | ACCESS_DENIED | HIGH |
| Warn_Missed_Tcp_Connect | OK | WARNING |
| Ftp_Access_Denied | ACCESS_DENIED | HIGH |
| Http_Access_Denied | ACCESS_DENIED | HIGH |
| Ssl_Access_Denied | ACCESS_DENIED | HIGH |
| Ssh_Access_Denied | ACCESS_DENIED | HIGH |

It should be noted that ok and policy-error are actually built-in dispositions in the policy language. If policy-error is encountered it indicates an error in the processing of either the policy or the network traffic data by the policy monitor. The meaning of the other dispositions is explained later in this document in the context of the rules in which they are used.

Finally, the wizard includes a set of predefined credentials that are combined with dynamically generated credentials and used in implicitly generated rules:

_Multicast Addresses—a set of commonly used IP multicast addresses;

_Local Broadcast_Address—the IP address used for non-directed local broadcasts (255.255.255.255); and _Zero_Ip_Address—a zero-valued IP address (0.0.0.0), commonly used by BOOTP clients;

It is noted that the double underscore prefix in these credential names is used to ensure that there aren't any name conflicts with credentials generated to represent user-defined communities and services.

Explicit Rules and Credentials

Every community defined by the user results in a credential of the same name. Because the scope of a community name is that of the entire policy specification, the resulting credential names need not be massaged to ensure uniqueness.

Service names are also global in scope. Because services and communities share the same name space, every service defined in the policy results in a credential whose name is constructed by prefixing the user-supplied service name with the underscore character. Thus, for example, the Smb service is represented by a credential named_Smb.

Rule names, on the other hand, are only unique within the scope of a policy domain. Furthermore, if a user-defined rule addresses a service that is both a UDP and a TCP service, the wizard generates two rules, one for the UDP protocol and another for the TCP protocol. Thus, a rule name is constructed by prefixing the user-supplied name with the protocol name (Udp_ or Tcp_) and the policy domain name.

For example, if the user defines a rule titled Smb_Services within a policy domain named Intranet, the wizard generates two rules, Udp_Intranet_Smb_Services and Tcp_Intranet_Smb_Services, for the UDP and TCP protocols respectively.

User-defined rules may also result in the generation of additional credentials. When defining a rule, the user provides the following information:

Zero, one, or more initiator communities;

Zero, one, or more services; and

Zero, one, or more target communities.

If more than one initiator community are specified, the wizard generates a credential that combines these communities into a union. The credential name is constructed by appending the word _Initiator to the user-supplied rule name, prefixed by the policy domain name. Using the example above, the wizard would create a credential named Intranet_Smb_Services_Initiator.

Likewise, if more than one target communities are specified, the wizard creates a credential representing their union and names it by appending the word _Target to the policy domain and rule names, e.g. Intranet_Smb_Services_Target).

However, if one or more services are specified they are combined with the target credentials according to the service type. For example, the Smb service (for the SMB protocol suite) and its like-named credential include ports that are used for both TCP and UDP. Thus, for the Smb_Services rule used above, the wizard would generate the following additional credentials: Udp_Intranet Smb_Services_Target and Tcp_Intranet_Smb_Services_Target. These credentials combine Intranet_Smb_Services_Target (or a single target community) with the _Smb credential and constitute the actual target credentials used in Udp_Intranet_Smb_Services and Tcp_Intranet_Smb_Services respectively. It should be noted that, in many cases, the set of UDP and TCP services referenced in a rule have little, if any overlap.

If the end user does not specify any services the wizard uses the Intranet_Smb_Services_Target credential (or a single target community credential) to identify the target principal.

Implicit Rules and Credentials

For each policy domain within the policy specification, the wizard automatically generates a set of rules and credentials that define the valid IP-level traffic seen at the monitoring point within the domain. In addition, an ICMP rule is generated that handles all intradomain ICMP traffic, as well as a credential for the monitoring point in that domain.

The monitoring point credential is based on an agent descriptor string manufactured by the wizard. The agent descriptor is constructed by converting the policy domain name to uppercase and appending to it the word _MONITOR. Thus, for example, a policy domain named Intranet is assigned the agent descriptor:

INTRANET_MONITOR.

Note that this is the agent descriptor to be used in the policy monitor when analyzing data collected at this monitoring point.

The monitoring point credential itself is named by appending the word _Monitors to the policy domain's name. In the example above, the credential is named Intranet_Monitors.

The wizard segregates all intradomain ICMP traffic (common on an enterprise network) by use of a rule that assigns it the disposition Monitor_Icmp. The rule is named by combining the protocol name with the domain name using the word _Within. For example, in the Intranet policy domain the rule is named Icmp_Within_Intranet.

IP traffic is described by a set of rules that systematically enumerate all valid IP-level traffic within the policy domain, between hosts in the policy domain and external hosts, and between external hosts through the policy domain (when more than one perimeter element is present). Most of these rules provisionally allow IP traffic, letting the subsequent protocol layers (ICMP, UDP, TCP, etc.) determine if the traffic is indeed allowed either by a user-defined (explicit) rule or by a predefined rule.

The first IP rule provisionally allows all intradomain IP traffic. It is named by combining the protocol name with the domain name using the word _Within (e.g., Ip_Within_Intranet). In the absence of a higher-level protocol within an intradomain IP association, the rule assigns the network event a disposition of Deny_Pure_Ip, i.e. its final outcome.

The intradomain IP rule uses the policy domain's defining community as its target principal. However, it generates another credential to be used as the initiator. This credential combines the defining community with the predefined credential for zero-valued IP addresses (_Zero_Ip_Address). The generated credential is named by appending the word _Initiator to the generated rule name, e.g. Ip_Within_Intranet_Initiator.

Another intradomain IP rule is used to segregate typical broadcast and multicast traffic within an enterprise network. It is named by combining the protocol name with the domain name using the words _Broadcasts_Within, e.g. Ip_Broadcasts_Within_Intranet. Its initiator principal is the same as that used for the general intradomain traffic, e.g. Ip_Within_Intranet_Initiator. Its target is a new credential constructed by combining the predefined credentials _Multicast_Addresses and _Local Broadcast_Address with the directed broadcast addresses for all the subnets within the policy domain's defining community. The new credential is named by appending the word _Target to the rule name e.g. Ip_Broadcasts Within_Intranet_Target.

The intradomain broadcast and multicast traffic is assigned the disposition Monitor_Broadcasts.

Traffic between hosts in the policy domain and external hosts is described by a set of rules whose complexity depends on how much information the user supplied about the topology of the network. Specifically, it depends on how many perimeter elements were specified and on whether or not the interface addresses, i.e. MAC addresses, of the perimeter elements are included in the policy specification.

If there are external communities associated with at least one perimeter element for which the interface address is not known, the wizard generates a credential combining all such communities in a single union unless there is only one such community, in which case its credential already exists. This credential is named by combining the policy domain name with the string _External_Communities, e.g. Intranet_External Communities.

The wizard then generates two rules defining the traffic between hosts internal to the policy domain and these external communities. The wizard names these rules by combining the protocol name with the domain name and the string _To_External_Communities or _External_Communities_To, depending on the direction of the IP traffic, e.g. Ip_Intranet_To_External_Communities for outbound traffic and Ip_External_Communities_To_Intranet for inbound traffic.

The credentials used alternately as the initiator and target principals for these rules are the policy domain's defining community and the aforementioned credential for the external communities. The rules provisionally allow the IP traffic to flow, subject to other rules for higher level protocols. In the absence of a higher-level protocol within the network event, the rule assigns it a disposition of Deny_Pure_Ip, i.e. its final outcome.

External communities visible through one or more perimeter elements whose interface addresses are known, are handled by a separate set of rules, two per perimeter element. For each perimeter element, the wizard starts by creating a credential that combines one or more credentials for one or more external communities visible through it with the perimeter element's interface address. Such credential is named by combining the domain name with the perimeter element name and the string _Communities. For example, external communities visible through a perimeter element named Firewall are described by a credential named Intranet_Firewall_Communities.

The wizard then generates two rules defining the traffic between hosts internal to the policy domain and the external communities visible through this perimeter element. The wizard names these rules by combining the protocol name, the domain name, the perimeter element name and the word _ To, e.g. Ip_Intranet_To_Intranet_Firewall for outbound traffic and Ip_Intranet_Firewall_To_Intranet for inbound traffic.

The credentials used alternately as the initiator and target principals for these rules are the policy domain's defining community and the aforementioned credential for the external communities. The rules provisionally allow the IP traffic to flow, subject to other rules for higher level protocols. In the absence of a higher-level protocol within the network event, the rule assigns it a disposition of Deny_Pure_Ip, i.e. its final outcome.

Finally, if there is more than one perimeter element associated with the policy domain, the wizard generates rule-pairs that describe the traffic between external communities visible through specific perimeter elements as well as external communities visible through any perimeter element, i.e. those without associated interface addresses. The rules are named by combining the names of each pair of perimeter elements with the protocol name, the policy domain name and with the word _To, in the case of addressable perimeter elements, or with the string _External Communities, for all other external communities. An additional rule is generated to cover traffic between external communities not associated with an addressable perimeter element and is named by combining the protocol name with the domain name and the string _Between_External_Communities.

Thus, if the Intranet domain used as an example in this section were to have a second (addressable) perimeter element named Router and a third non-addressable perimeter element (whose name is unimportant), the wizard would generate the following rules to cover all traffic amongst their respective external communities:

Ip_Intranet_Firewall_To_Intranet_Router
Ip_Intranet_Router_To_Intranet_Firewall
Ip_Intranet_Firewall_To_External_Communities
Ip_External_Communities_To_Intranet_Firewall
Ip_Intranet_Router_To_External_Communities
Ip_External_Communities_To_Intranet_Router
Ip_Intranet_Between_External_Communities Table H and Table I summarize all the implicit rules and credentials generated for the example policy domain Intranet. The policy domain includes two perimeter elements with a specified interface address (Firewall and Router) and a third non-addressable perimeter element.

TABLE H

| Credential | Comment |
| --- | --- |
| Intranet_Monitors | Uses agent descriptor INTRANET_MONITOR |
| lp_Within_Intranet_Initiator | Defining community plus zero-values IP address |
| lp_Broadcasts_Within_Intranet_Target | Combines standard multicast addresses with local broadcast and directed broadcast addresses |
| Intranet_External_Communities | Combines all external communities not associated with addressable perimeter elements |
| Intranet_Firewall_Communities | Combines all external communities visible through the Firewall perimeter element |
| Intranet_Router_Communities | Combines all external communities visible through the Router perimeter element |

TABLE I

| Rule | Credentials (I - Initiator T - Target) | Disposition (I - Immediate F - Final) |
| --- | --- | --- |
| lp_Within_Intranet | I: lp_Within_Intranet_Initiaor T: Intranet | I: continue F: Deny_Pure_lp |
| lp_Broadcasts_Within_Intranet | I: lp_Within_Intranet_Initiator T: lp_Broadcasts_Within_Intranet_Target | I: Monitor_Broadcasts |
| lcmp_Within_Intranet | I: none (ignore) T: none (ignore) Note: uses lp_Within_Intranet as prerequisite | I: Monitor_lcmp |
| lp_Intranet_To_External_Communities | I: Intranet T: Intranet_External_Communities | I: continue F: Deny_Pure_lp |
| lp_External_Communities_To_Intranet | I: Intranet_External_Communities T: Intranet | I: continue F: Deny_Pure_lp |
| lp_Intranet_To_Intranet_Firewall | I: Intranet T: Intranet_Firewall_Communities | I: continue F: Deny_Pure_lp |
| lp_Intranet_Firewall_To_Intranet | I: Intranet_Firewall_Communities T: Intranet | I: continue F: Deny_Pure_lp |
| lp_Intranet_To_Intranet_Router | I: Intranet T: Intranet_Router_Communities | I: continue F: Deny_Pure_lp |
| lp_Intranet_RouterTo_Intranet | I: Intanet_Router_Communities T: Intranet | I: continue F: Deny_Pure_lp |
| lp_Intranet_Firewall_To_Intranet_Router | I: Intranet_Firewall_Communities T: Intranet_Router_Communities | I: continue F: Deny_Pure_lp |
| lp_Intranet_Router_To_Intranet_Firewall | I: Intranet_Router_Communities T: Intranet_Firewall_Communities | I: continue F: Deny_Pure_lp |
| lp_Intranet_Firewall_To_External_Communities | I: Intranet_Firewall_Communities T: Intranet_External_Communities | I: continue F: Deny_Pure_lp |
| lp_External_Communities_To_Intranet_Firewall | I: Internal_External_Communities T: Intranet_Firewall_Communities | I: continue F: Deny_Pure_lp |
| lp_Intranet_Router_To_External_Communities | I: Intranet_Router_Communities T: Intranet_External_Communities | I: continue F: Deny_Pure_lp |
| lp_External_Communities_To_Intranet_Router | I: Intranet_External_Communities T: Intranet_Router_Communities | I: continue F: Deny_Pure_lp |
| lp_Intranet_Between_External_Communities | I: Intranet_External_Communities T: Intranet_External_Communities | I: continue F: Deny_Pure_lp |

Logging and Reporting Modules

The preferred embodiment of the invention provides logging and reporting modules, as described herein with reference to FIG. 1a. As the policy engine module 102 reaches dispositions on network events, it passes the network event object to the logging module 103.

The preferred embodiment of the invention also provides an alarm script 155. As the policy engine module 102 reaches dispositions on network events of a certain disposition severity, for example, CRITICAL or HIGH, the alarm script is invoked to provide expedited alerting of the disposition.

The following algorithm is used to enter the data into the database 104.

During initialization of the logging module 103, the database 104 is tested to see if it contains a policy that matches the MD5 hash of the policy 105 currently being used by the policy engine 102. If no such policy is found then the policy details are added to the database 104;

with each network event passed to the logging module 103, if logging of network events is enabled, then:

if the final disposition of the network event matches one of the list of dispositions that is to be logged, then:

add the network event to the buffer of network events, flushing the buffer to the database 104 if it is full;

loop through each of the protocol events contained in the network event;

if the initiator and responder principals have not been already added to the database 104 then do so, caching the database keys for later use; and add the protocol event to the buffer of network events, flushing the buffer to the database 104 if it is full.

On a periodic basis report statistics 161 are sent across a secure channel to a secure, customer accessible server 162. The preferred embodiment of the invention uses the following algorithm.

A report script 160 described is used to generate a report 161 for the configured or predetermined time period. An example of a list of preferred acquired or calculated statistics or intermediate steps is contained in Table J below;

The report 161 is then packaged using the tar command and PGP to encrypt the resulting file using the public key of a recipient email account; and This encrypted file is then emailed to the recipient email account.

It should be appreciated that an equally preferred embodiment performs name resolution on packet data after the packet data has been collected, rather than concurrent with collecting the packet data. An advantage to such name resolution technique is that name resolution after collection is removed from real-time processing, thereby rendering name resolution more efficient.

On the receiving secure server 162 the following algorithm is invoked on the received email message.

PGP is used to decrypt the received encrypted tar file;

Tar is used to extract the report data;

The report data is then processed to link the report into the reporting website 164 for the client; and Any supplied protocol event data is then stored in a reporting database 165.

Upon accessing the reporting website 164 the client is able to peruse the reports that have been generated, access the protocol event data stored in the database 165 via a cgi script.

TABLE J

Generate network events in subsidiary web files, based on execution run;
Generate network events table,
Generate table for URL's and status codes;
Find events of intrest;
Check for all execution runs being in sequence;
Give best optimization for queries;
Compute number of events and number of exceptions;
Apply definitions of log severity and disposition code in order of critically;
Apply query to several execution runs at a time, collect results;
Select key disposition and key policy rule first, to be able to find distinct disposition and policy rule;
Determine sort order for disposition and policy rule table; and
Generate a list of dispositions in the selected events, counting how many events were generated by each.

Automated Generation of an English Language Representation of a Formal Network Security Policy Specification The preferred embodiment of the invention uses a formal specification of network security policy that is to be enforced on a network. This specification provides a precise, compact description of network security policy. However, it is difficult for a layperson to understand. In order to allow comprehension of the policy by non-technical staff within a user's organization the parser module (FIG. 1 150) is used to generate an English language description of the policy. This description is simple enough to be understood, yet captures the salient details of the policy. It will be appreciated that the invention generated a representation in a human readable language, such as english, those skilled in the art will recognize that the invention may generate representations in any human readable language.

The preferred embodiment of the invention provides the following algorithm for generating the English language representation. The algorithm comprises the following:

Loading the policy into the parser from its text representation; and

Looping through all supported protocols, from the highest level protocols to the lowest;

Sorting the rules for this protocol into ranked order; and

Looping through these rules from the highest ranking to the lowest;

Generating a text description of the rule using the algorithm below. If an HTML flag has been set then format the text into a HTML table; and Append this description to a collection of descriptions already generated.

Figure 12:
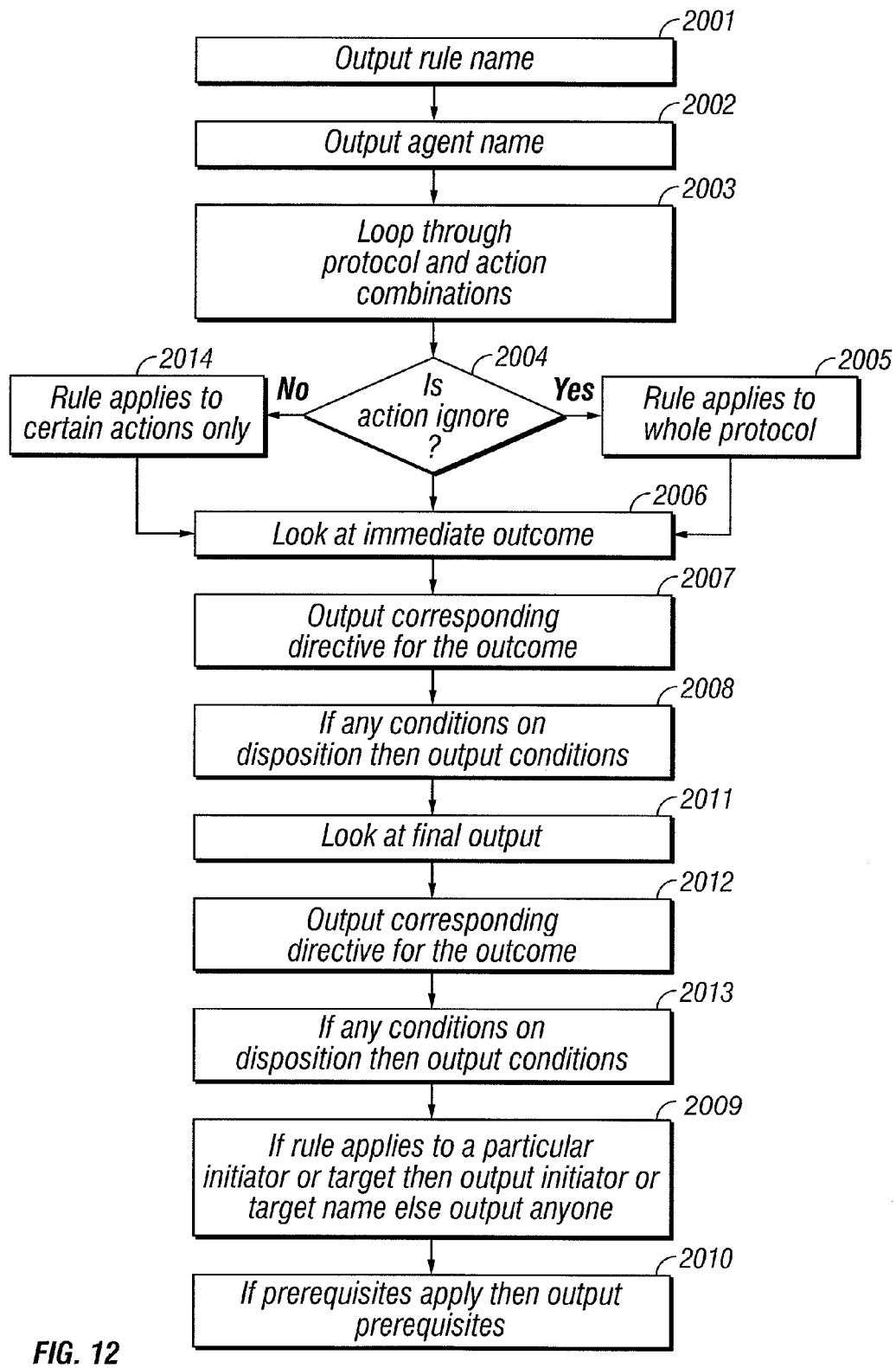
FIG. 12 shows an algorithm according to the invention.

The preferred embodiment of the invention provides the following rule algorithm to generate an English language representation of a single policy language rule. The algorithm is described with reference to FIG. 12. The algorithm outputs the name of the rule at hand (2001). It then proceeds to output the agent's name (2002), where the agent is the subject network monitor(s) to which the policy applies. The algorithm then loops through all protocol and action combinations (2003). If the action is to be ignored (2004), then the rule applies to the whole protocol (2005). Otherwise, the rule applies to certain actions only (2014). The algorithm then looks at the immediate outcome for the rule (2006). The algorithm then outputs the corresponding directive for the outcome (2007). If any conditions exist on the disposition, then the algorithm outputs the conditions (2008). The algorithm looks at the final outcome (2011), then outputs the corresponding final outcome of the rule (2012). If any conditions exist on the disposition, then the algorithm outputs the conditions (2013). If the rule applies to a particular initiator or target, then the algorithm outputs the initiator or target name (2009). Otherwise, the algorithm outputs a general inclusive name, such as, for example, "anyone." The algorithm then checks for prerequisites (2010). If any are discovered, the algorithm then outputs such prerequisites.

For an example of the rule algorithm discussed above, Table K below shows code to the example implementation.

TABLE K

```
        if (isBuiltin())
                return;
            Bool processdImmediate = false;
            Bool immediateDefaultContinue = false;
            Bool capitalize = true;
            string str;
            string protocol;
            // output the table row start
            if (html) str = "\n<tr><p>"; else str = "\n\n";
            // output the rule name
            if (html)
                str += "<TD WIDTH=\"10%\" VALIGN=\"TOP\"><B>" + getName() + "<a name = \"" + getName() +
"\"></a></B></TD>";
            else
                str += "Rule " + getName() + ": ";
            // output the agent name
            string agentName;
            if (getAgent() == 0)
                agentName = "All Monitors";
            else
                agentName = getAgent()->getName();
            if(html)
                str += "<TD WIDTH=\"5%\" VALIGN=\"TOP\">" + agentame + "</TD>";
            // start the cell for the description
            if (html)
                str += "<TD WIDTH=\"85%\" VALIGN=\"TOP\">";
            // loop through the protocol and action combinations
            Bool first = true;
            for (PrsUnion::const_iterator t0 = _protocol->begin();
                t0 != _protocol->end();
                t0++)
                    {
                        for (PrsUnion::const_iterator t2 = _action->begin();
                            t2 != _action->end();
                            t2++)
                        {
                            if (first)
                                first = false;
                            else
                                protocol += "; ";
                            // if the action is ignore then it applies to the whole protocol
                            if ((*t2)->getStringRepresentation() != PrsConst::META_IGNORE)
                                protocol += (*t0)->getStringRepresentation() + "-" + ("t2)->getStringRepresentation() + " ";
                            else
                                protocol += ("t0)->getStringRepresentation() + " ";
                        }
                    }
            // look at the outcome to figure what we do with this traffic
            // is there an immediate clause
            if (_immediate != 0)
            {
                // output text based on the code
                string code = _immediate->getDefault()->getCode();
                if (code == PrsConst::DISPCODE_OK)
                {
                    capitalize ? str += "Allow" : str += "allow ";
                    capitalize = false;
                }
                else if (code == PrsConst::DISPCODE_CONTINUE)
                {
                    if (_final->getDefault()->getCode() == PrsConst::DISPCODE_OK)
                        capitalize ? str += "Provisionally allow " : str += "provisionally allow ";
                    else if (_final->getDefault()->getCode() == "POLICY_ERROR");
                        ; // say nothing... this is the default
                    else
                        capitalize ? str += "Provisionally deny " : str += "provisionally deny ";
                    immediateDefaultContinue = true;
                }
                else
                {
                    capitalize ? str += "Deny" : str += "deny";
                    capitalize = false;
                }
```

TABLE K-continued

```
                str += protocol;
                if ((_immediate->getGuards()) != 0 && (_immediate->getGuards()->size() != 0)) /* KGS &&
!immediateDefaultContinue */
                {
                    if (_immediate->getGuards()->size() == 1)
                        str += "with condition (";
                    else
                        str += "with conditions (";
                    first = true;
                    for (std::vector<PrsGuardedDisposition">::const_iterator cond = _immedate->getGaurds()-
>begin();
                         cond != _immediate->getGuards()->end();
                         cond++)
                    {
                        if (first)
                            first = false;
                        else
                            str += ", ";
                        if (html) str += "<l>";
                        str += (*cond)->getGuard()->getName();
                        if (html) str += "</l >";
                    }
                    str += "), ";
                }
                processdimmediate = true;
            }
            // is there a final clauses
            if (_final != 0)
            {
                if (!processdimmediate)
                {
                    // output text based on the code
                    string code = _final->getDefault()->getCode();
                    if (code == PrsConst::DISPCODE_OK)
                    {
                        capitalize ? str += "Provisionally allow" : str += "provisionally allow ";
                        capitalize = false;
                    }
                    else if (code == "POLICY_ERROR")
                        ; // say nothing... this is the default
                    else
                    {
                        capitalize ? str += "Provisionally deny " : str += "provisionally deny ";
                        capitalize = false;
                    }
                    str += protocol;
                    if ((_final->getGaurds()) != 0 && (_final->getGuards()->size() != 0))
                    {
                        if (_final->getGuards()->size() == 1)
                            str += "with conditions (";
                        else
                            str += "with conditions (";
                        Bool first = true;
                        for (std::vector<PrsGuardedDisposition*>::const_iterator cond = _immediate->getGuards()-
>begin();
                             cond != _immediate->getGuards()->end();
                             cond++)
                        {
                            if (first)
                                first = false;
                            else
                                str += ", ";
                            if (html) str += "<l">;
                            str += (*cond)->getGuard()->getName();
                            if (html) str += "</l>";
                        }
                        str += "), ";
                    }
                }
                else
                {
                    // output text based on the code
                    string code = _final->getDefault()->getCode();
                    if (!immediateDefaultContinue)
                    {
                        if (code == PrsConst::DISPCODE_OK)
                            str += "but provisionally allow ";
```

TABLE K-continued

```
                else if (code == "POLICY_ERROR")
                    ; // say nothing... this is the default
                else
                    str += "but provisionally deny ";
            }
            if ((_final->getGuards()) != 0 && (_final->getGuards()->size() != 0))
            {
                str += "with conditions (";
                Bool first = true;
                for (std::vector<PrsGuardedDisposition">::const_iterator cond = _immediate->getGuards()-
>begin();
                    cond != _immediate->getGuards()->end();
                    cond++)
                {
                    if (first)
                        first = false;
                    else
                        str += ", ";
                    if (html) str += "<I>";
                    str += (*cond)->getGuard()->getName();
                    if (html) str+= "</I>";
                }
                str += "), ";
            }
        }
    }
    if (html)
        str += "from <I>"
            + (_initiator->getCredential() ? _initiator->getCredential()->getName() : "anyone")
            + "</I> to <I>"
            + (_target->getCredential() ? _target->getCredential()->getName() : "anyone")
            + "</I>";
    else
        str += "from "
            + (_initiator->getCredential() ? _initiator->getCredential()->getName() : "anyone")
            + " to "
            + (_target->getCredential() ? _target->getCredential()->getName() : "anyone");
    if (getPrerequisite() != 0)
    {
        str += ", provided that ";
        Bool first = true;
        for (vector<const PrsRule*>::const_iterator t3 = _prerequisite->begin();
            t3 != _prerequisite->end();
            t3++)
        {
            if (first)
                first = false
        else
            str += " or ";
        if (html)
            str += "<I><a href=\"#" + (*t3)->getName() + "\">" + (t3)->getName() + "</a></I>";
        else
            str += (*t3)->getName();
        }
        str += " is true.";
    }
    // start the cell for the description
    if (html)
        str += "</TD></TR>";
    else
        str += " (Agent " + agentName + ").";
    ostm << str.c_str();
```

For an example of an output file generated by the main algorithm discussed above, Table L shows the example of the output in table format. For an example of a policy specification file that can be used as input into the main algorithm discussed above, refer to Table P below.

TABLE L

| | | |
|---|---|---|
| | Rules for protocol HTTP | |
| Http_Blocked_Service_Violation | All Monitors | Deny HTTP from anyone to anyone, provided that TcpBlockedServices is true. |
| Http_Deny | All Monitors | Deny HTTP from anyone to anyone |
| | Rules for protocol FTP | |
| Ftp_Blocked_Service_Violation | All Monitors | Deny FTP from anyone to anyone, provided that TcpBlockedServices is true. |
| Ftp_Deny | All Monitors | Deny FTP from anyone to anyone |
| Ftp_Anonymous_Authentication | All Monitors | Allow FTP-CONTROL_AUTHENTICATE with condition (Authentication_Rejected), from Anon_User to anyone |
| Ftp_Validate_Password | All Monitors | Allow FTP-CONTROL_AUTHENTICATE with conditions (Authentication_Rejected, Strong_Password), from anyone to anyone |
| Ftp_Ignore_Data_Connections | All Monitors | Allow FTP-DATA_OPEN from anyone to anyone |
| | Rules for protocol SSH | |
| Ssh_Validate_Handshake | All Monitors | Allow SSH-HANDSHAKE, SSH-SESSION_ABORTED with conditions (Ssh_Authentication_Failed, Ssh_Authentication_Aborted, Ssh_Secure_Authentication_Modes), from anyone to anyone |
| Ssh_Blocked_Service_Violation | All Monitors | Deny SSH from anyone to anyone, provided that TcpBlockedServices is true. |
| Ssh_Deny | All Monitors | Deny SSH from anyone to anyone |
| | Rules for protocol SSL | |
| Ssl_Validate_Handshake | All Monitors | Allow SSL-HANDSHAKE with conditions (Authentication_Rejected, Ssl_Session_Qos), from anyone to anyone |
| Ssl_Blocked_Service_Violation | All Monitors | Deny SSL from anyone to anyone, rpvided that TcpBlockedServices is true. |
| Ssh_Deny | All Monitors | Deny SSH from anyone to anyone |
| Ssl_Missed_Handshakes | All Monitors | Allow SSL-MISSED_HANDSHAKE from anyone to anyone |
| | Rules for protocol TCP | |
| Tcp_Blocked_Services_Response | All Monitors | Deny TCP-ABORT, TCP-CLOSE, TCP-TIMEOUT with conditions (Tcp_Data_Xfer), from anyone to anyone, provided that TcpBlockedServices is true. |
| Tcp_Connection_Terminated | All Monitors | Allow TCP-ABORT, TCP-CLOSE, TCP-TIMEOUT from anyone to anyone |
| Tcp_Deny | All Monitors | Provisionally deny TCP from anyone to anyone |
| Tcp_X_Shh_From_Clouds_To_Cgi_Provisional | X_Monitors | Provisionally allow TCP-CONNECT from Clouds to Tcp_X_Shh_From_Clouds_To_Cgi_Provisional_Target |
| Tcp_X_Spm_Colloc_Traffic | X_Monitors | Allow TCP-CONNECT from Modin to Tcp_X_Spm_Colloc_Traffic_Target |
| Tcp_X_Spm_Colloc_Traffic_Provisional | X_Monitors | Provisionally allow TCP-CONNECT from Modin to Tcp_X_Spm_Colloc_Traffic_Provisional_Target |
| Tcp_X_Ssh_From_Monkey_To_Fluffy_Provisional | X_Monitors | Provisionally allow TCP-CONNECT from Monkey to Tcp_X_Ssh_From_Monkey_To_Fluffy_Provisional_Target |
| Tcp_X_X_Loghost_Traffic | X_Monitors | Allow TCP-CONNECT from X_Web_Servers to |

TABLE L-continued

| | | |
|---|---|---|
| Tcp_C_Dns_From_Colloc_To_Dns_Server | X_Monitors | Allow TCP-CONNECT from X_Coloc_Subnet to Tcp_X_Dns_From_Colloc_To_Dns_Server_Target |
| Tcp_X_Port_1984_Traffic | X_Monitors | Allow TCP-CONNECT from X_Coloc_Subnet to Tcp_X_Port_1984_Traffic_Target |
| Tcp_X_Ssh_To_Web_Server | X_Monitors | Allow TCP-CONNECT from X_Ssh_To_Web_Server_Initiator to Tcp_X_Ssh_To_Web_Server_Target |
| Tcp_X_Ssh_From_Fluffy_To_Monkey_Provisional | X_ | Provisionally allo TCP-CONNECT from Fluffy to Tcp_X_Ssh_From_Fluffy_To_Monkey_Provisional_Target |
| Tcp_X_Ssh_From_X_To_X_Web_Servers_Provisiona; | X_Monitors | Provisionally allow TCP-CONNECT from $X_{Ssh}$_From_X_To_X_Web_Servers_Provisional_Initiator to Tcp_Ssh_From_X_To_X_Web_Servers_Provisional_Target |
| Tcp_X_Http_From_Any_To_All_Web_Servers_Provisional | X_Monitors | Provisionally allow TCP-CONNECT from anyone to Tcp_X_Http_From_Any_To_All_Web_Servers_Provisional_Target |
| Tcp_X_Stmp_From_All_To_X | X_Monitors | Allow TCP-CONNECT from X_Stmp_From_All_To_X_Initiator to _Stmp |
| Tcp_Blocked_Services | All Monitors | Provisionally deny TCP-CONNECT from anyone to anyone |
| Tcp_Missed_Connections | All Monitors | Allow TCP_MISSED_CONNECT from anyone to anyone |
| Tcp_Blocked_Services_Violation | All Monitors | Deny TCP-PROTOCOL_UNKNOWN from anyone to anyone, provided that TcpBlockedServices is true. |
| Tcp_Unknown_Protocol | All Monitors | Deny TCP-PROTOCOL_UNKNOWN from anyone to anyone |
| Rules for protocol UDP | | |
| Udp_X_Dns_From_Colloc_To_Dns_Server | X_Monitors | Allow UDP-ASSOCIATION from X_Coloc_Subnet to Udp_X_Dns_From_Colloc_To_Dns_Server_Target |
| Udp_Deny | All Monitors | Deny UDP from anyone to anyone |
| Rules for protocol ICMP | | |
| Icmp_Within_X | X_Monitors | Allow ICMP-ASSOCIATION from anyone to anyone, provided that IpWithinX is true. |
| Icmp_Deny | All Monitors | Deny ICMP from anyone to anyone |
| Rules for protocol IP | | |
| Ip_Directed_Broadcasts_Within_X | X_Monitors | Allow IP-ASSOCIATION from Ip_Within_X_Initiator to Ip_Directed_Broadcasts_Within_X_Target |
| Ip_External_Communities_To_X | X_Monitors | Provisionally deny IP-ASSOCIATION from X_External_Communities to X_Coloc_Subnet |
| Ip_X_To_External_Communities | X_Monitors | Provisionally deny IP-ASSOCIATION from X_Coloc_Subnet to X_External_Communities |
| Ip_Within_X | X_Monitors | Provisionally deny IP-ASSOCIATION from Ip_Within_X_Initiator to X_Coloc_Subnet |
| Ip_Non_Directed_Broadcasts_Within_X | X_Monitors | Allow IP-ASSOCIATION from Ip_Within_X_Initiator to _Generic_Multicast_And_Broadcast_Addresses |
| Ip_Deny | All Monitors | Deny IP from anyone to anyone |
| Ip_Unknown_Protocol | All Monitors | Deny IP-PROTOCOL_UNKNOWN from anyone to anyone |

Algorithm for Efficient Rule Evaluation

The preferred embodiment of the invention comprises a technique for a policy engine internally to organize policy rules in order to effect an efficient evaluation of protocol events at runtime. Evaluation of a protocol event entails selecting one or more applicable policy rules using an evaluation algorithm. The preferred evaluation algorithm is described in A Declarative Language for Specifying a Security Policy, U.S. patent application Ser. No. 09/479,781 (Jan. 7, 2000). An excerpt describing the preferred evaluation algorithm is provided below in Table Q.

Figure 13:
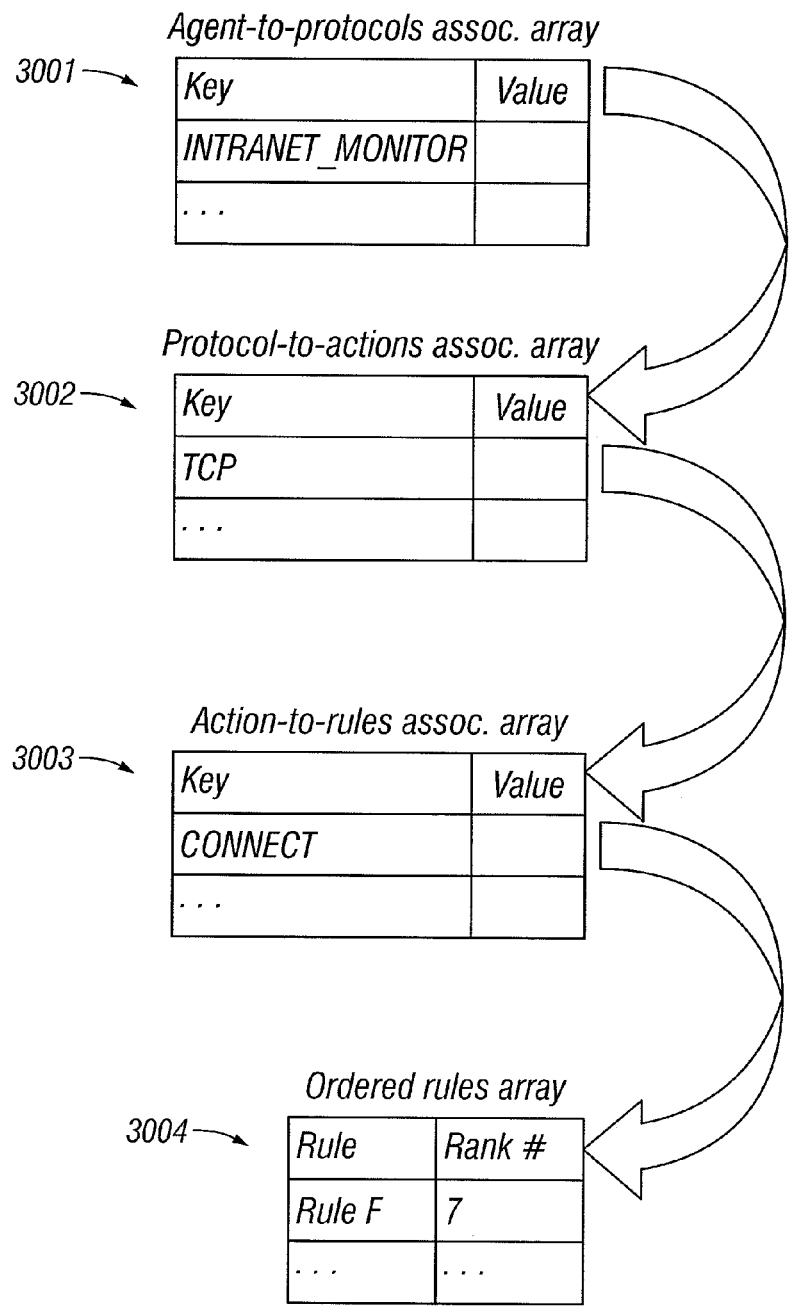
FIG. 13 shows a flow diagram according to the invention.

Using this technique, policy rules are organized in a manner that minimizes the number of rules that need to be considered when determining the set of rules applicable to a given protocol event. The algorithm is described with reference to FIG. 13 as follows:

Create a first associative array, such as, for example, agent-to-protocols, where the key is an agent descriptor and the value is a reference to a second associative array with all the policy rules applicable to network traffic monitored by that agent (3001);

Create a second associative array, such as, for example, protocol-to-actions, where the key is a protocol name and the value is a reference to a third associative array with all the policy rules applicable to that protocol (3002).

Create a third associative array, such as, for example, action-to-rules, where the key is a protocol action and the value is a list of references to the policy rules applicable to that protocol action (3003). The rules referenced in this list (3004) are sorted in decreasing order of rank number, taking into account any constraints such as, for example, rank-above, that might be present. Rules with the same rank number are ordered in the lexical order of their names.

It should be noted that the same rule can be referenced by different lists of ordered rules and, in each list, can have different rank numbers because the ranking of a rule is relative to the ranking of the other rules in the same list.

Assessment Tool

The preferred embodiment of the invention provides an assessment tool that allows the discussed technique for continuously assessing the security of a system to be applicable to both long-term and short-term network assessment. The tool provides an additional dimension to network assessment. That is, it provides the ability to capture and classify large volumes of network traffic efficiently, based on a formal policy which describes permitted traffic. The tool adds network usage to the known list of features discussed in an assessment framework.

It has been found through field experience that the invention can be useful in the following contexts:

Identifying services that were not mentioned by the system administration staff of a network that is being assessed;

Identifying usage patterns of critical machines. In an assessment framework, this applies to typical usage patterns, because a long-term deployment of the invention is needed to continuously analyze and monitor changes in usage or rare aberrant behavior;

Identifying services; and

Analyze routing patterns. It should be appreciated that subnets are not scanned.

It should be appreciated that using the invention as a supplemental process in performing network assessments results in at least the following benefits:

Rather than providing an inference of possible network behavior that is based on what hosts are configured to do, the network behavior is directly analyzed based on direct observation of data traffic;

Rather than basing security analysis on a static snap-shot of the network environment as it existed at a particular moment, the analysis is based on a dynamic recording of network behavior over some non-trivial amount of time. As an analogy, traditional known network vulnerability scans take still photographs, while the invention takes a motion picture;

Instead of relying on the accuracy of information provided by the customer point of contact through an interview process, the invention provides specific and tangible data points for discussion that facilitates the interview process and educates the customer on problems in an immediate feedback loop; and Because the invention is policy based, and because of the rigor built into the policy language and analysis engine, the otherwise manual (and hence error prone) analysis of security issues relative to the business and architectural context are enforced with a precise methodology which greatly reduces errors and omissions during the assessment process.

It should be appreciated that because the invention operates passively, the customer network can be monitored while in normal operation or production.

Operational Description

An example of implementing the assessment tool is described in the following discussion. A consultant arrives at a customer office with one or more workstations with the monitoring invention discussed herein loaded. The workstation, or station for short, may be a laptop computer, or other suitably portable platform. The monitoring station is attached to the customer network at a critical network bottleneck, e.g. just inside an Internet firewall, and monitors all traffic at that point in the network. From a security point of view, the monitoring station is entirely passive and invisible to the network. The monitoring station only receives packets and does not respond to any protocol actions. Due to the monitoring station's passive nature, no operational impact is imposed on the subject network. Hence, assessments may be performed during peak production times, as well as when a network is in a quiescent state.

In this example, the monitoring station is left attached to the network for a long period of time, depending on conditions, such as, for example, the practical demands of the visit, storage space on the station, and the amount of traffic on the customer's network. If appropriate, the station can be left at the customer site to gather data over a short-term period, such as, for example, days and weeks.

In this example of an assessment situation, the policy specification is used to remove from consideration as much mundane network traffic as possible, allowing the analyst to concentrate on more interesting traffic. Due to the opinion of the analyst being part of the assessment process, there is no fixed goal for the level of detail needed in the policy specification. In the simplest case, the analyst generates no policy at all, and examines the network events one by one (perhaps using the query tool to filter them). In practice, it can be suggested that the analyst undergoes a short policy development phase, as the short policy development phase can serve the analyst well to reduce thousands of network events into a page or two, which may then be examined by inspection.

The invention allows data to be stored in full packet form for most detailed analysis, or in compressed form storing only security-sensitive events. The latter form also removes customer-confidential information, such as, for example, embedded passwords, so that it is more appropriate for removal from the customer site. A typical usage scenario is capturing full-packet data in a short burst, such as, for example, five minutes. After a brief analysis, a longer data collection is run using the compressed form.

Figure 14:
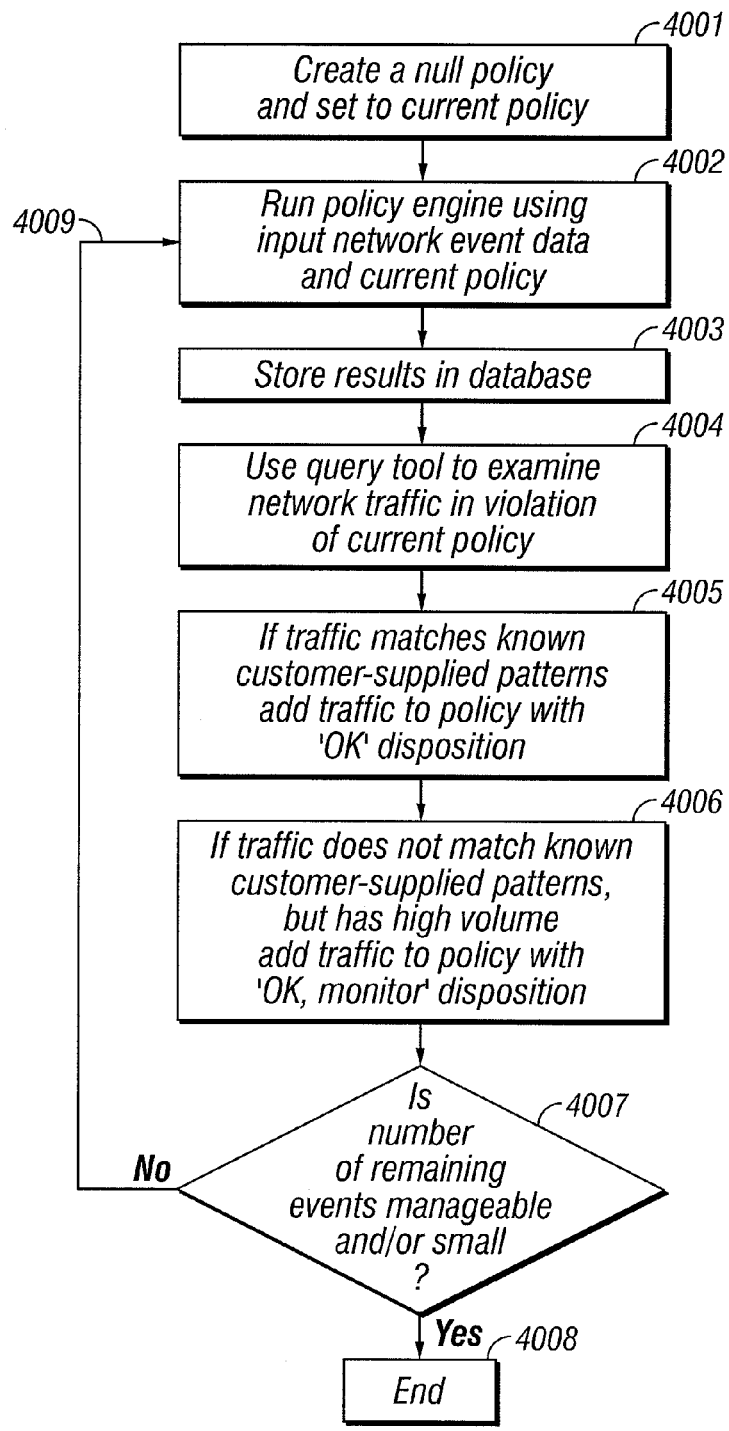
FIG. 14 shows an algorithm according to the invention.

The preferred embodiment of the invention provides the following algorithm for an operator, such as an analyst, to perform the data analysis on a data packet or on a compressed file of data. The algorithm is described referring to FIG. 14, as follows:

1) Create a null policy, which denies all actions, for a customer site (copying a file). Set null policy to the current policy (4002);

2) Run the policy engine discussed herein over the input data and using current policy (4002), and store the resulting data in a local database (4003);
3) Using the query tool discussed herein, examine the network traffic that is declared in violation by the current policy (4004);
4) Categorize the most frequent traffic based on customer input:
   a) If the traffic matches known customer-supplied input patterns, add this traffic to the policy with an OK disposition (4005);
   b) If the traffic does not match customer-supplied input patterns, but has high volume, add this traffic to the policy with an OK,monitor disposition (4006).
5) Repeat from step 2 (4009) until only a small, manageable number of events remains (4007). Then end the algorithm (4008).

It should be appreciated that the same packet or compressed file is run by the policy engine multiple times.

It should be appreciated that in an assessment situation a policy can be edited by using the policy generator discussed herein. The invention provides for using the policy generator for rapid policy development based on transport-level parameters. Enhanced policy development, using more complex tools, typically is not necessary in an assessment situation.

It should also be appreciated implementing the algorithm discussed above does not take very long. Part or all of the process may take place at the customer site, in a hotel room, on an airplane, or back at the analyst's office, for example. When the process is completed, the analyst has a list of monitored network events. This list is used as a basis for additional discussion with the customer to determine the meaning of such events. Experience has shown that such conversation is useful to the assessment interviewing process.

It should also be appreciated that the variations of the algorithm above can be implemented and are within the scope of the invention. Examples of variations follow.

Example Variation I

An equally preferred embodiment comprises the analysts first determining the customer requirements and the customer network credentials. Using this information, the analyst programs an initial policy. The analyst can derive and use additional information from the scanning process as described in the algorithm above.

Example Variation II

The customer or analysts designs an initial best policy as a set of credentials and rules, set all dispositions to DENY, and monitors the network to determine what the dispositions should be.

Credential/Condition Assertion Verification Optimization

In the preferred embodiment of the invention, the policy language describes a policy decision involving two principals, an initiator and a target principal. These principals are identified by a set of one or more credentials. For each policy decision the policy engine ascertains which credential in the policy best describes the information about the principals involved in an interaction. Similarly, the policy language herein describes conditions that in turn describe tests performed on the state of an associated protocol event.

The preferred embodiment of the invention provides a credential/condition assertion verification optimization algorithm to ensure that the choice of credentials and conditions are made as efficiently as possible.

To accomplish credential/condition assertion verification optimization, the policy engine:

During the initialization process dynamically creates comparing functions for principals with credentials, and comparing functions for state of protocol events with particular conditions in a high level language such as C++;

Dynamically creates and loads a module containing the comparing functions;

During runtime ensures that installed policy file matches module containing comparing functions, otherwise generates new module containing comparing functions that correspond to installed policy file; and Calls comparing functions as appropriate.

The preferred embodiment provides a more rigorous algorithm, an example of which is described in Table M below.

TABLE M

During the initialization process of the policy engine:

the policy engine requests that the parser module load a policy file, comprising credentials and conditions into an in-memory representation;
the policy engine requests that the parser module load an assertion verification dynamically loadable library (DLL);
if this DLL exists then
    it is loaded into memory; and
    a predetermined function, for example named dllValidateFunc( ), contained in the loaded DLL is called. If the return value of the function call is the same as a MD5 hash of the previously loaded policy file, then loading is complete.
    Otherwise execution initialization continues below;
because the DLL does not exist or because the MD5 hash does not match, a code generation function of the parser module is invoked, which:
    adds header information to a C++ assertion code file;
    adds a function that returns the MD5 hash of the policy file that was used to generate this C++ file;
iterates through credentials contained in the in-memory representation, generating C++ function prototype and function declarations for code that can compare a principal description with the definition of a credential into the assertion code file, wherein such comparison is performed by:
    calling other credential comparison methods for any credentials used in the definition of the credential under test;
    making calls to the policy engine module to perform comparison operations based on allowable operations for the built-in types of the policy language; and
    combining the results of the above tests with logical operators AND, OR and NOT;
iterates through the conditions contained in the in-memory representation, generating C++ function prototype and function declarations for code that can compare a protocol state description with the definition of a condition into the assertion code file, wherein such comparison is performed by:
    calling other condition comparison methods for any conditions used in the definition of the condition under test;
    making calls to the policy engine module to perform comparison operations based on the allowable operations for the built-in types of the policy language; and
    combining the results of the above tests with logical operators AND, OR and NOT;
    compiles and links this generated C++ file to create a dynamically loadable module containing a compiled version of the principal/credential and protocol/condition comparison functions;
    and loads this newly created module.

During the runtime of the policy engine:

each time that it needs to decide whether a principal is described by a particular credential it computes the name of the comparison function based on the name of the credential to be tested;
calls the comparison function which returns a Boolean value

TABLE M-continued that represents whether the credential under test matches the principal under test;

each time that it needs to decide whether a protocol state satisfies a particular condition it computes the name of the comparison function based on the name of the condition to be tested; and calls the comparison function which returns a Boolean value that represents whether the condition under test satisfies the protocol state under test.

Network Monitor Internals Descriptions

The preferred embodiment of the invention provides a network monitor internals mechanism discussed below that serves to translate packet data into multiple concurrent streams of network event data. It accomplishes this by interpreting both sides of each protocol transaction.

Figure 15:
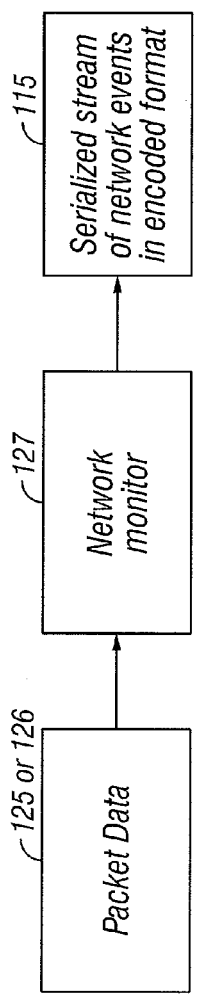
FIG. 15 shows a high level schematic diagram according to the invention.

FIG. 15 shows a high level schematic diagram of the network monitor 127 accepting packet data from either a live network interface 125 or a file containing packet data 126. The network monitor extracts security-sensitive details from the input packet stream 125, 126, and generates output in a serialized stream of encoded network event information 115. The preferred encoded format is DME encoded format, discussed below in section, Network Event Encoding Format. The output network event information can be stored for logging or debugging purposes, or can be passed directly to the policy engine. Thus, the discussed network monitor provides an efficient process of exporting data from a customer's site, such process comprising extracting security-sensitive information.

Figure 16:
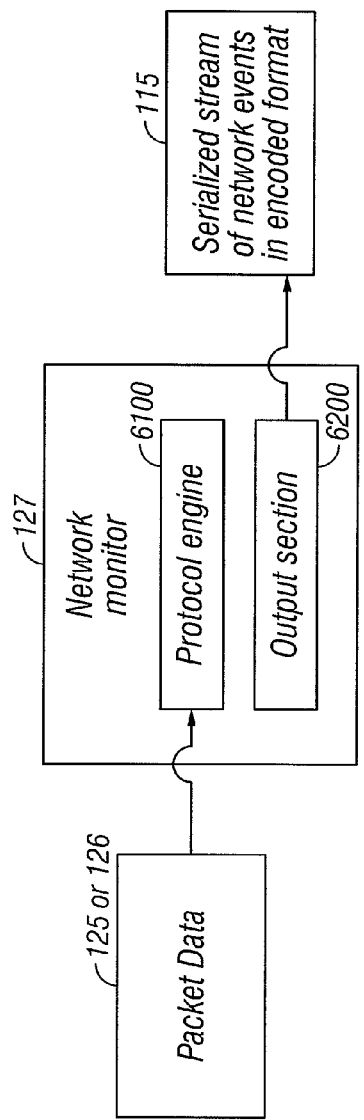
FIG. 16 shows a schematic diagram of process flow according to the invention.

FIG. 16 shows a schematic diagram of process flow according to the invention. The network monitor 127 is a single-threaded program that processes packets (125 or 126) as they are read. Each packet is passed to a monitor protocol engine 6100 for processing. When security-sensitive protocol events are encountered in the packet data, the monitor calls into its output section 6200 to transmit network or protocol events to the rest of the policy monitoring system 100 via a network pipe, direct procedure call. Output section 6200 can also store protocol events in a file for later processing.

Protocol Engine

Figure 17:
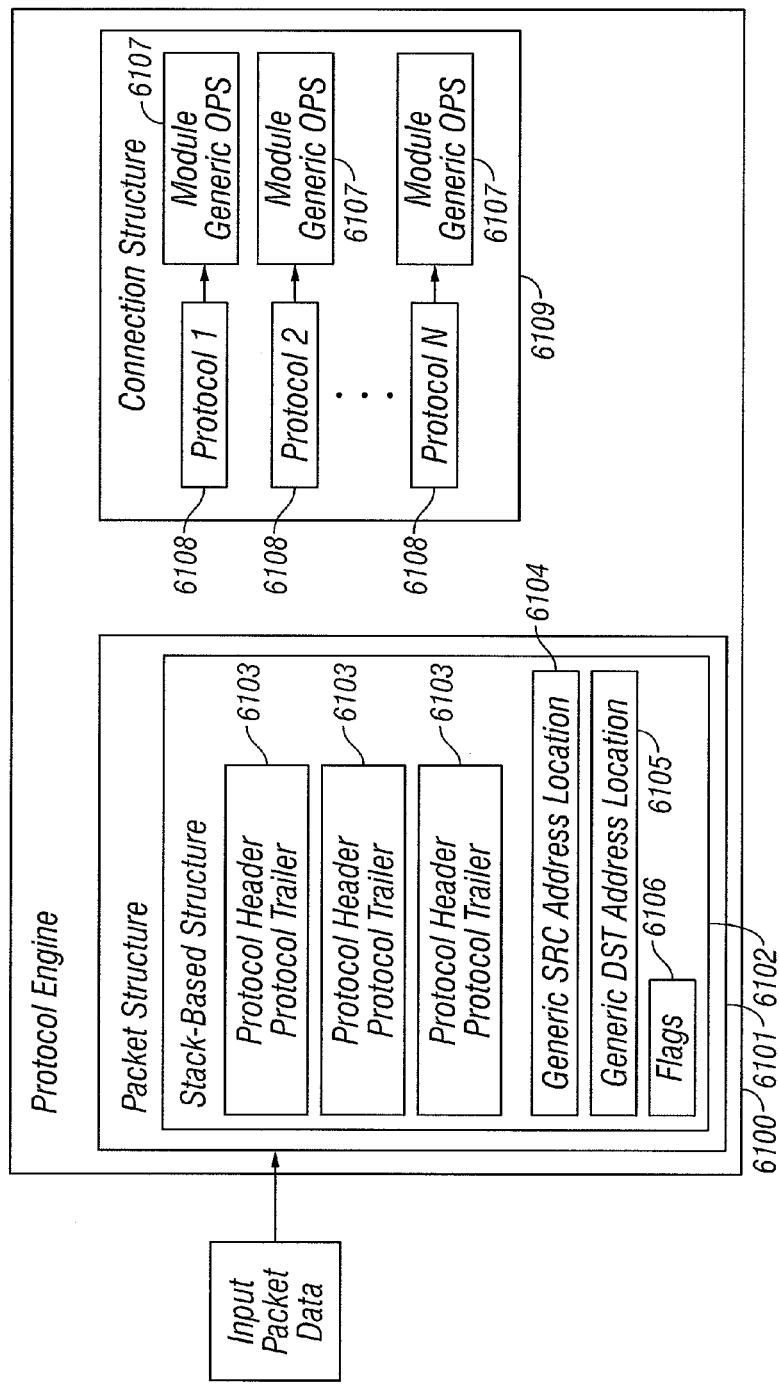
FIG. 17 is a block schematic diagram according to the invention.

The preferred embodiment of the invention provides a protocol engine in the network monitor that can be described with reference to FIG. 17, which is a block schematic diagram of features of the protocol engine according to the invention. Input packet data 115 is read into a known object-oriented structure type 6101, such as, for example, a C structure here named pkt_t structure. The pkt_t structure 6101 represents a packet on the network. It provides a stack-based structuring mechanism 6102 that allows protocol headers and trailers 6103 to be marked in the packet so that software may focus easily on the correct protocol layer. The pkt_t structure 6101 also includes generic src 6104 and dst 6105 address locations, and flags 6106 to pass useful information up and down a connection stack, for example, if such packet is transiting from server to client or vice versa.

The protocol engine 6100 provides one module 6107 for each protocol implemented 6108. The modules implement a generic series of operations, a preferred example of such series is provided below in Table N. A common connection structure 6109 allows connection data to be arranged in a stack allocation for each access across layer boundaries. In Java or C++ terminology, for example, each protocol is a superclass of connection. The layering permits protocols to assume one or more roles as the layer responsible for each corresponding boundary, such as, for example: Network, Transport, Session, Application, or Transactions.

Table N

Example of generic operations for each protocol implementation:

1. Init: Call-once initialization
2. Bind(packet, connection): given the first packet of a connection, attempt to bind this packet into a new instance of this protocol within connection. Establish the instance in its proper role(s) within the connection.
3. Input(packet, connection): given a packet, which has been associated with a connection (in some cases, connection is NULL, indicating that no such relationship exists, or exists yet), process the packet as input to the connection.
4. GiveBack(packet, connection): given a packet, which has been associated with a connection at a higher level of protocol, give back the packet to this layer, so that the data will be received later, as if it was retransmitted. Typically, packet has been modified to contain only part of the input data.
5. GetMore(connection, amountNeeded, fromClientOrServer) returns(packet): given a connection, attempt to return a packet containing more data on the connection, if such is available. This call is used from a higher layer of protocol calling down to a lower layer of protocol. The fromClientOrServer argument is used to determine if the data is being requested that was received by the server side or the client side of the connection.
6. StopCollecting(connection): given a connection, adjust the protocol stack so that no further data will be processed on this connection. Depending on the protocol in question, this may involve discarding data or adjusting filters. A connection which is not "collecting" attempts to process packets in the most efficient manner.
7. Shutdown(connection, fromOrg, fromDst): given a connection, modify the connection state to indicate that the client, server, or both have acted to take down the connection. The full generality of the call is needed only for a transport connection like TCP.
8. Del(connection): given a connection, arbitrarily delete the instance of this protocol from the connection object. This call is intended to clean up the resources used by the connection; Shutdown is used to indicate protocol agreement that the connection is coming to an end.
9. Alarm(connection, time): given a connection and the current time, this call is used to signal an alarm has expired on this connection. The time argument is the official time of the alarm, which may not even be related to the current time.
10. SwitchSrcDst(connection): this call indicates that a higher layer of software (perhaps a higher level protocol) has determined that the choice of client and server in this protocol instance are wrong, and should be reversed. This may happen when initial connection negotiation packets are not seen by the monitor, but later information makes the client and server clear.

It should be appreciated that in the stopCollecting generic operation, and in a transport protocol, header information in packets may need to be examined to determine connection state, allowing freeing of resources when the connection terminates. Transport protocols discard all subsequent data from the connection, and do not forward packets on to higher level protocols. Such mechanism allows the monitor to efficiently process bulk transfers, encrypted connections, or connections that are no longer of interest to the policy engine.

It should be appreciated that the process discussed above for the stopCollecting generic operation can be appropriate for a hardware filter to stop packets from arriving.

The concept of the current time in the monitor flows from the packet level upwards. That is, time is associated with the packet and is maintained throughout the packet. When the network monitor is running in real time off live packet data, current time reduces to the time a packet was received, which may be earlier than the time when the packet is processed. When the network monitor is running off stored packet data, current time in the monitor has no relation to actual current time. The packet is processed relative to the time it was received and whereby time intervals remain the same. Also, results can be lined up in the database reflecting the point of reference of the time the packet was received.

The network monitor provides support for setting alarms on connections. An alarm is set by registering a connection to receive a signal when the network monitor transitions to a predetermined value of current time. The signal consists of a call to a generic alarm operation in every protocol layer registered with such connection. Alarm handlers are called in order from lowest protocol layer to highest protocol layer.

Because network monitor functionality is based on network events that can map to network connections, the network monitor provides a connectionless association feature. By using the feature, the network monitor registers the fact that it noticed two IP hosts communicating. Typically, an association is long lived, whether or not the network monitor knows its intention. Examples of associations are a series of ICMP PING/PING REPLY packets and a stream of IPSEC packets. The network monitor treats associations as connections. Indeed, often associations are connections at a higher level of protocol.

Output Section

Figure 18:
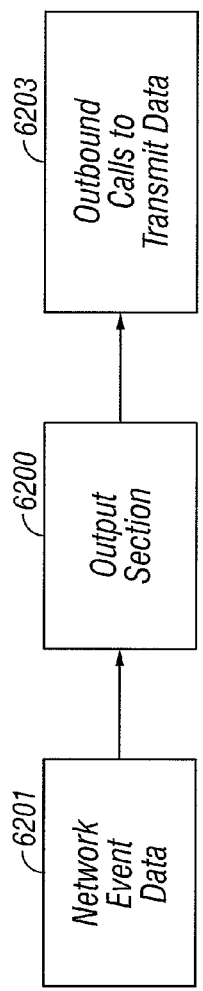
FIG. 18 is a high level flow diagram of the preferred output section according to the invention.

The preferred embodiment of the invention provides an output section in the protocol engine. FIG. 18 is a high level flow diagram of the preferred output section according to the invention. The output section 6200 of the network monitor receives network event data from the protocol engine and generates outbound calls 6203 to transmit such data to the policy engine or to a file.

Figure 19:
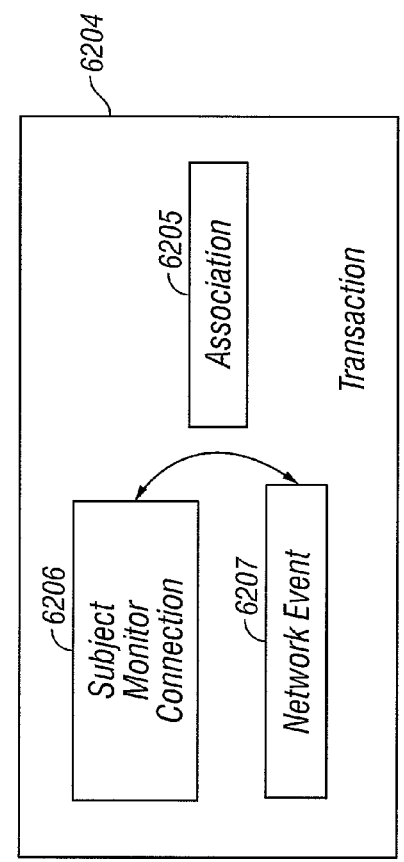
FIG. 19 shows a schematic diagram according to the invention.

The output section 6200 works by allowing the network monitor to establish a transaction which forms an association between a monitor connection and a network event in the policy engine. FIG. 19 shows a schematic diagram of a transaction 6204, comprising an association 6205 between a subject monitor connection 6206 and a network event 6207. Typically, the lifetime of the connection 6206, the transaction 6204, and the network event 6207 is similar.

The output section's interface comprises a set of calls to establish communication with the policy engine, and to start and finish transactions, and a set of protocol-specific calls. The calls progress as follows:

---

Connect
     BeginTransaction
      ProtocolEvent1
      ProtocolEvent2
      ...
     EndTransaction
    Disconnect

---

It should be appreciated that in addition to the calls above, multiple transactions can be active at a time, as long as each transaction follows the ordering described above.

The output section internally translates such calls into a generic set of calls, an example of which is listed below. At initialization of the network monitor, the output section is configured with a chain of output generic modules, each of which is used as filter on the output data. An example of the implemented modules follows:

NULL: acts as an endpoint, but discards input data without doing anything;
 SM: connects by procedure call directly to policy processing;
 ENC: generate encoded form of output; and
 LOG: generate textual form of output.

In an equally preferred embodiment of the invention, the network monitor also includes an input section that decodes an encoded version of events. For an example application, in a real-time monitoring system embodiment the monitor 127 processes network traffic 125 in real time and uses ENC to generate encoded output. The encoded output is transmitted in real-time over a TCP connection where it is decoded and connected using SM to the Policy Engine 102.

In another embodiment of the invention, the output section is used for testing purposes. The output section is configured using command line arguments. An example of an algorithm for such testing follows:

1. Capture packet data into a file;
2. Run the network monitor on the packet data, using LOG→ENC. Store the logged textual data and the encoded form into separate files; and
3. Run the network monitor on the encoded data, using LOG→NULL. Store the logged textual data in a file.
4. Compare the two textual files to make sure that the decoded version matches the logged textual file.

Network Event Encoding Format

The preferred embodiment of the invention provides a technique for network event encoding to be used by the network monitor. The encoding technique is designed for both archival and transmission purposes. The basic format of the encoding is:

Header
 Embedded agent descriptors
 Typemap
 Encoded transactions

An example of the preferred form of the header follows:

4 byte magic number: "SMKo"
 1 byte major version=2
 1 byte minor version=1
 4 bytes containing the size of this header
 8 bytes (struct timeval) begin time, which is a time which is less than or equal to every timestamp in this encoded record
 4 bytes offset of agent descriptor section
 4 bytes indicating number of agent descriptors
 4 bytes offset of type map section
 4 bytes indicating number of type map entries
 4 bytes offset to first transaction record
 4 bytes size of this file, or 0xFFFFFFFF if unknown.
 4 bytes 1's complement checksum of this file or 0xFFFFFFFF if unknown The agent descriptor section is used to store a possibly null list of agent descriptors that are configured into the network monitor at encoding time. The agent descriptors are strings that plug into a particular policy language policy. They indicate the location of the subject monitor in the subject network wiring structure, enabling rules that apply to such location in the network and disable rules that do not apply.

A preferred agent descriptor section comprises an array, where each element of the array is an ASCII string, preceded by a single byte giving its length. The size of the array is given in the header cited above.

The preferred type map section is used to improve maintainability of the full policy monitoring system. Provided by the type map section is a mapping between update types used in an encoded record and the update types' string names. The decoding module uses this information to detect new update types that are not supported by mapping known updates to the correct values.

That is, because new update types typically are not interpretable by old software, they are therefore successfully skipped.

A preferred type map section comprises an array, where each element of the array contains a four-byte type value, a single byte of string length, and the ASCII name of the type. The size of the array is given in the header cited above.

The preferred encoded transactions comprise an array of individual update encodings. The size of the array is either derivable from the header file size information, or is unbounded, such as, for real-time monitoring.

A preferred header for an individual update has the following format:

1 byte, giving the update type 4 bytes, giving the size of this header in bytes, not including the length of the header 8 bytes (struct timeval) giving the absolute time when this update occurred 4 bytes, giving the packet number of this update since the monitor started (first packet=packet #0)

4 bytes, giving the eventiD of this update, which is the number of BEGIN_TRANS updates that occurred before this one, since the monitor started Following the header a body contains additional update-type-specific data, or possibly none.

To understand all events that transpire on a connection, it is necessary to combine events of different protocol layers. For example, an update, named SM_IP_ASSOCIATION, provides IP src and dst addresses and establishes a peer relationship. Subsequent events assume that this information is known and builds on it. For example, an update named ICMP_ECHO has no body at all.

An example of a set of update types and corresponding encoding body for each update, according to the invention is given below in Table O. The meaning of the term "string" is: if length(string) is <255, then byte[length], byte[string][length], else byte[0xff], byte[a], byte[b], byte[c], byte[d], byte[string][length] where a,b,c,d are the four (big-endian) bytes of length.

TABLE O

SM_BEGIN_TRANS
    Body: none
    Meaning: begin new transaction (network event)
SM_END_TRANS
    Body: none
    Meaning: end previously "begin" transaction (network event)
SM_PUOSU
    Body: none
Meaning: the monitor can glean no more useful information about this network event.
The policy engine should process policy and give additional input to the monitor.
SM_DEBUG_MSG
    Body: string
    Meaning: debug message, to be inserted into SPM debugging log.
SM_PROTOCOL_UNKNOWN
    Body: none
    Meaning: the monitor is unable to determine the higher level protocol
SM_FTP_DATAOPEN
    Body: none
    Meaning: This (new) connection is an FTP data connection
SM_FTP_DATACLOSE
    Body: none
    Meaning: This FTP data connection has closed normally.
SM_FTP_DATAABORT
    Body: none
    Meaning: This FTP data connection has close abnormally.
SM_FTP_OPEN
    Body: none
    Meaning: This (new) connection is an FTP control connection
SM_FTP_CLOSE
    Body: none
    Meaning: This FTP control connection has closed normally.
SM_FTP_ABORT
    Body: none
    Meaning: This FTP control connection has closed abnormally
SM_FTP_NOAUTH
    Body: 4-byte, number of authentication failures
    Meaning: This FTP control connection has failed to authenticate
SM_FTP_AUTH
    Body: String, user name
        String, password, if user was anonymous
        4-byte, password length
        1-byte, nonzero if password contains alphabetics
        1-byte, nonzero if password contains numeric characters
        1-byte, nonzero if password contains characters which are non-alphanumeric
        4-byte, number of authentication failures
    Meaning: This FTP control connection has successfully authenticated
SM_FTP_FILEGET
SM_FTP_FILEPUT
SM_FTP_DEL TABLE O-continued SM_FTP_MKDIR
SM_FTP_RMDIR
    Body: String, file name
        1-byte, FTP error code
        String, FTP error message
Meaning: attempt to perform FTP RETR, STORE, DEL, MKD, RMD command. If immediate failure, the error is given in the message. For GET/PUT, if transfer is proceeding, error status comes in the XFERDONE message.
SM_FTP_XFERDONE
    Body: String, unused
        1-byte, FTP error code
        String, FTP error message
    Meaning: status from continuing FILEPUT or FILEGET command
SM_FTP_RENAME
    Body: String, from file name
        String, from file name
        1-byte, FTP error code
        String, FTP error message
Meaning: attempt to perform FTP file rename command. If failure, the error is given in the message.
SM_HTTP_CLOSE
    Body: none
    Meaning: This HTTP connection has closed normally.
SM_HTTP_METHOD
    Body: 1-byte, method code (one value for each HTTP method)
        1-byte, HTTP version (major)
        1-byte, HTTP version (minor)
        String, URL
    Meaning: Describes HTTP method line
SM_HTTP_POSTDATA
    Body: 1-byte, always true.
        1-byte, nonzero if this is the last POSTDATA call to complete all the post data.
        String, post data
    Meaning: contains some or all of the post data for an HTTP POST method.
SM_HTTP_REQCTYPE
SM_HTTP_RESPCTYPE
    Body: String, content type
    Meaning: HTTP content type from request or response header.
SM_HTTP_REQCOOKIE
SM_HTTP_RESPSETCOOKIE
    Body: String
    Meaning: HTTP cooking / set-cookie headers
SM_HTTP_REQHEADER
SM_HTTP_RESPHEADER
    Body: 1-byte, nonzero if this is the last group of header info
        4-byte, number of header lines
        String[number of header lines]
    Meaning: contains HTTP header information from request or response header.
SM_HTTP_REQHEADEREND
SM_HTTP_RESPHEADEREND
    Body: none
    Meaning: End of request or resonse header has been reached.
SM_HTTP_RESPONSE
    Body: 4-byte, response code
        1-byte, HTTP version (major)
        1-byte, HTTP version (minor)
        String, response message
    Meaning: encoding of the HTTP response header line
SM_HTTP_MISS
    Body: none
    Meaning: Monitor was unable to parse the HTTP transaction (perhaps because of missed packets)
SM_ICMP_BADCODE
    Body: none
    Meaning: ICMP packet received of unknown type
SM_ICMP_DU_FRAG (destination unreachable: fragmentation needed and DF set)
SM_ICMP_DU_HOST (destination unreachable: host unreachable)
SM_ICMP_DU_NET (destination unreachable: net unreachable)

TABLE O-continued

SM_ICMP_DU_PORT (destination unreachable: port unreachable)
SM_ICMP_DU_PROT (destination unreachable: protocol unreachable)
SM_ICMP_DU_SRCRT (destination unreachable: source route failed)
SM_ICMP_DU_FILTER (destination unreachable: packet filtered)
SM_ICMP_PARAM (parameter problem)
SM_ICMP_SRCQ (source quench)
SM_ICMP_TE_EXCD (time to live exceeded in transit)
SM_ICMP_TE_FRAG (fragment reassembly time exceeded)
    Body: 4-byte, IP src address
        2-byte, UDP/TCP src port
        4-byte, IP dst address
        2-byte, UDP/TCP src port
        4-byte, IP protocol
Meaning: This connection contains a particular ICMP error. The body gives
information from the nested packet within the ICMP packet.
SM_ICMP_ECHO
SM_ICMP_ECHOR
    Body: none
    Meaning: ICMP echo / echo reply seen (echo is commonly called "ping").
SM_ICMP_IREQ
SM_ICMP_IREQR
    Body: none
    Meaning: ICMP information request/reply seen
SM_ICMP_RD_HOST (Redirect datagrams for the Host)
SM_ICMP_RD_HOSTTOS (Redirect datagrams for the Type of Service and Host)
SM_ICMP_RD_NET (Redirect datagrams for the Network)
SM_ICMP_RD_NETTOS (Redirect datagrams for the Type of Service and Network)
    Body: 4-byte, gateway address
        4-byte, IP src address
        2-byte, UDP/TCP src port
        4-byte, IP dst address
        2-byte, UDP/TCP src port
        4-byte, IP protocol
Meaning: For the given ICMP redirect, the body gives gateway information and
information from the nested packet within the ICMP packet.
SM_ICMP_TSTMP
SM_ICMP_TSTMPR
    Body: none
    Meaning: ICMP Timestamp / Timestamp reply seen
SM_ICMP_ASSOCIATION
    Body: none
    Meaning: This connection contains an ICMP-level association.
SM_IPINFO_IP_ASSOCIATION
    Body: 6-byte, src MAC address
        6-byte, dst MAC address
        4-byte, IP src address
        2-byte, UDP/TCP srt port
        4-byte, IP dst address
        2-byte, UDP/TCP src port
        1-byte, IP protocol
        1-byte, IP version
    Meaning: an IP protocol association exists on this connection.
SM_TCP_CONNECT
SM_TCP_MISSED_CONNECT
    Body: none
Meaning: a (new) TCP connection exists on this connection. In the case of a
"missed" connect, the first packets from the connection were not seen, so the monitor
is unable to properly classify the connection.
SM_TCP_DATA
    Body: none
    Meaning: data has transited this connection
SM_UDP_ASSOCIATION
    Body: none
    Meaning: This connection contains a (new) UDP association
SM_SSH_AUTH
    Body: 4-byte, client version (major)
        4-byte, client version (minor)
        4-byte, server version (major)
        4-byte, server version (minor)
        4-byte, authmask, gives which cipher suites are supported (see SSH
specification)
        4-byte, cipher suite selected
    Meaning: a successful SSH authentication has occurred.

TABLE O-continued

```
SM_SSH_ABORT
SM_SSH_CLOSE
    Body: none
    Meaning: the SSH connection has terminated. An ABORT means that the
transport layer aborted.
SM_SSH_HANDSHAKE_FAILURE
    Body: none
    Meaning: the monitor was able to determine that the SSH handshake failed.
SM_SSH_HANDSHAKE_MISS, // We cannot interpret handshake.
    Body: none
    Meaning: the monitor was unable to determine whether the SSH handshake
failed or succeeded.
SM_SSL_ABORT (fatal alert)
SM_SSL_WARNING (non-fatal alert)
SM_SSL_HANDSHAKE_FAILURE (alert seen, indicates handshake failure)
    Body: 1-byte, alert level (see SSL3 specification)
        1-byte, alert description
    Meaning: The SSL connection has signaled an ALERT.
SM_SSL_HANDSHAKE_SUCCEED
    Body: none
    Meaning: the SSL connection has completed its handshake
SM_SSL_HANDSHAKE_ABORT
    Body: none
    Meaning: the SSL connection was aborted by transport level without handshake
completion
SM_SSL_HANDSHAKE_MISS
    Body: none
Meaning: The monitor was unable to determine the SSL session credentials.
Because if resumed sessions, this may mean that the session was completely
successful.
SM_SSL_SERVER_HELLO
    Body: 1-byte, version (major)
        1-byte, version (minor)
        4-byte, ciphersuite (enum)
        1-byte, non-zero if a resumed session
        String, sessionid
    Meaning: SSL (client+)server hello information
SM_SSL_CLIENT_CERT
SM_SSL_SERVER_CERT
    Body: String, client or server certificate chain
    Meaning: client or server certificate
SM_TCP_ABORT
    Body: none
    Meaning: TCP RST packet received, killed connection
SM_TCP_CLOSE
    Body: none
    Meaning: TCP normal close (both sides)
SM_TCP_TIMEOUT
    Body: none
    Meaning: TCP drain timer expires, killing connection.
```

Table R ( policy PolicyGen "0.9"

( group PolicyGen_Monitors agent_attr_t ( union

```
            X_MONITOR
        )
    )

( credential Home_Machine
    ( assertion
        ( eq ip-address 10.0.0.176 ) ) // assertion
)

( credential Cgi
    ( assertion
        ( eq ip-address 10.0.0.119 ) ) // assertion
)

( credential Clouds
    ( assertion
        ( eq ip-address 10.0.0.118 ) ) // assertion
)

( credential Fluffy
    ( assertion
        ( eq ip-address 10.0.0.125 ) ) // assertion
)

( credential Monkey
    ( assertion
        ( or
```

```
            ( eq ip-address 10.0.0.114 )

( eq ip-address 10.0.0.115 )

( eq ip-address 10.0.0.121 )

) // or

) // assertion

)

( credential X_Web_Servers ( assertion ( or

Cgi

Clouds

Fluffy

Monkey

) // or

) // assertion

)

( credential Security_Web_Server ( assertion ( eq ip-address 10.0.0.120 ) ) // assertion

)

( credential All_Web_Servers ( assertion ( or

X_Web_Servers

Security_Web_Server
```

```
            ) // or
        ) // assertion
)

( credential Anon_User
    ( assertion
        ( or
            ( eq login-name "anonymous" )
        ) // or
    ) // assertion
)

( credential Dns_Server
    ( assertion
        ( eq ip-address 10.0.0.21 )   ) // assertion
)

( credential Ip_Directed_Broadcasts_Within_X_Target
    ( assertion
        ( or
            ( eq ip-address 10.0.0.119 )
        ) // or
    ) // assertion
)

( credential X_Coloc_Subnet
    ( assertion
```

```
        ( ip-mask ip-address 10.0.0.112/29  )     ) // assertion
)

( credential __Zero_Ip_Address
    ( assertion
        ( eq ip-address 10.0.0.0 )   ) // assertion
)

( credential Ip_Within_X_Initiator
    ( assertion
        ( or
            X_Coloc_Subnet
            __Zero_Ip_Address
        ) // or
    ) // assertion
)

( credential Loghost
    ( assertion
        ( eq ip-address 10.0.0.190 ) ) // assertion
)

( credential Modin
    ( assertion
        ( eq ip-address 10.0.0.117 ) ) // assertion
)
```

```
( credential Mother
    ( assertion
        ( eq ip-address 10.0.0.124 ) ) // assertion
)

( credential X_Netops
    ( assertion
        ( ip-range ip-address 10.0.0.187 10.0.0.190 )    ) // assertion
)

( credential Security
    ( assertion
        ( eq ip-address 10.0.0.61 ) ) // assertion
)

( credential X_External_Communities
    ( assertion
        ( or
            Home_Machine
            Dns_Server
            Loghost
            X_Netops
            Security
        ) // or
    ) // assertion
)
```

```
( credential X_Monitors
    ( assertion
        ( member X_MONITOR agent-attribute )    ) // assertion
)

( credential X_Ssh_From_X_To_X_Web_Servers_Provisional_Initiator
    ( assertion
        ( or
            Home_Machine
            X_Netops
        ) // or
    ) // assertion
)

( credential X_Ssh_From_X_To_X_Web_Servers_Provisional_Target
    ( assertion
        ( or
            Mother
            X_Web_Servers
        ) // or
    ) // assertion
)

( credential X_Ssh_To_Security_Web_Server_Initiator
    ( assertion
        ( or
            X_Netops
```

```
            Security
        ) // or
    ) // assertion
)

( credential X_Stmp_From_All_To_X_Initiator
    ( assertion
        ( or
            Cgi
            Clouds
        ) // or
    ) // assertion
)

( credential _Dns
    ( assertion
        ( eq ip-port 53  ) ) // assertion
)

( credential Tcp_X_Dns_From_Colloc_To_Dns_Server_Target
    ( assertion
        ( and
            Dns_Server
            _Dns
        ) // and
    ) // assertion
)
```

```
( credential _Http
    ( assertion
        ( eq ip-port 80 ) ) // assertion
)

( credential Tcp_X_Http_From_Any_To_All_Web_Servers_Provisional_Target
    ( assertion
        ( and
            All_Web_Servers
            _Http
        ) // and
    ) // assertion
)

( credential _Bigbrother
    ( assertion
        ( eq ip-port 1984 ) ) // assertion
)

( credential Tcp_X_Port_1984_Traffic_Target
    ( assertion
        ( and
            Loghost
            _Bigbrother
        ) // and
    ) // assertion
)
```

```
( credential _Ssh26

( assertion ( eq ip-port 26 ) ) // assertion

)

( credential Tcp_X_X_Loghost_Traffic_Target ( assertion ( and

Loghost

_Ssh26

) // and

) // assertion

)

( credential _Ssh ( assertion ( eq ip-port 22 ) ) // assertion

)

( credential Tcp_X_Shh_From_Clouds_To_Cgi_Provisional_Target ( assertion ( and

Cgi

_Ssh

) // and

) // assertion
```

)

( credential Tcp_X_Spm_Colloc_Traffic_Provisional_Target ( assertion ( and

Security

_Ssh

) // and

) // assertion

)

( credential _Smtp ( assertion ( eq ip-port 25  ) ) // assertion

)

( credential Tcp_X_Spm_Colloc_Traffic_Target ( assertion ( and

Security

_Smtp

) // and

) // assertion

)

( credential Tcp_X_Ssh_From_Fluffy_To_Monkey_Provisional_Target ( assertion

```
        ( and

Monkey

_Ssh

) // and

) // assertion

)

( credential Tcp_X_Ssh_From_Monkey_To_Fluffy_Provisional_Target ( assertion ( and Fluffy _Ssh ) // and ) // assertion

)

( credential Tcp_X_Ssh_From_X_To_X_Web_Servers_Provisional_Target ( assertion ( and X_Ssh_From_X_To_X_Web_Servers_Provisional_Target _Ssh ) // and ) // assertion

)

( credential _Ssh20

( assertion ( eq ip-port 20 ) ) // assertion
```

)

( credential Tcp_X_Ssh_To_Security_Web_Server_Target ( assertion ( and

Security_Web_Server

_Ssh20

) // and

) // assertion

)

( credential Udp_X_Dns_From_Colloc_To_Dns_Server_Target ( assertion ( and

Dns_Server

_Dns

) // and

) // assertion

)

( credential _Auth ( assertion ( eq ip-port 113 )    ) // assertion

)

( credential _Bootp_Client ( assertion

```
            ( eq ip-port 68 ) ) // assertion
)

( credential _Bootp_Server
    ( assertion
            ( eq ip-port 67 ) ) // assertion
)

( credential _Finger
    ( assertion
            ( eq ip-port 79 ) ) // assertion
)

( credential _Ftp
    ( assertion
            ( eq ip-port 21 ) ) // assertion
)

( credential _Gopher
    ( assertion
            ( eq ip-port 70 ) ) // assertion
)

( credential _High_Ports
    ( assertion
            ( range ip-port 1025 65535 )    ) // assertion
```

)

( credential _Https
    ( assertion
        ( eq ip-port 443 )    ) // assertion
)

( credential _Ident
    ( assertion
        ( eq ip-port 113 )    ) // assertion
)

( credential _Imap4
    ( assertion
        ( eq ip-port 143 )    ) // assertion
)

( credential _Imap4s
    ( assertion
        ( eq ip-port 993 )    ) // assertion
)

( credential _Netbios_Rpc
    ( assertion
        ( eq ip-port 135 )    ) // assertion
)

```
( credential _Nntp
    ( assertion
        ( eq ip-port 119 )    ) // assertion
)

( credential _Pop3
    ( assertion
        ( eq ip-port 110 )    ) // assertion
)

( credential _Pop3s
    ( assertion
        ( eq ip-port 995 )    ) // assertion
)

( credential _Printer
    ( assertion
        ( eq ip-port 515 )    ) // assertion
)

( credential _Rlogin
    ( assertion
        ( eq ip-port 513 )    ) // assertion
)
```

```
( credential _Rshell
    ( assertion
        ( eq ip-port 514 )    ) // assertion
)

( credential _Smb
    ( assertion
        ( range ip-port 137 139 )    ) // assertion
)

( credential _Smtps
    ( assertion
        ( eq ip-port 465 )    ) // assertion
)

( credential _Syslog
    ( assertion
        ( eq ip-port 514 )    ) // assertion
)

( credential _Telnet
    ( assertion
        ( eq ip-port 23 ) ) // assertion
)
```

( credential _Whois
    ( assertion
        ( eq ip-port 43 ) ) // assertion
)

( credential __Multicast_Addresses
    ( assertion
        ( ip-range ip-address 224.0.0.0 239.255.255.255 )    ) // assertion
)

( credential __Non_Directed_Broadcast_Address
    ( assertion
        ( and
            ( eq ip-address 255.255.255.255 )
            ( eq mac-address FF-FF-FF-FF-FF-FF )
        ) // and
    ) // assertion
)

( credential __Generic_Multicast_And_Broadcast_Addresses
    ( assertion
        ( or
            __Non_Directed_Broadcast_Address
            __Multicast_Addresses
        ) // or
    ) // assertion
)

```
( condition Authentication_Rejected
    ( assertion
        ( eq auth-status REJECTED )   ) // assertion
)

( condition Ssh_Authentication_Aborted
    ( assertion
        ( eq ssh-handshake-status ABORTED ) ) // assertion
)

( condition Ssh_Authentication_Failed
    ( assertion
        ( eq ssh-handshake-status FAILED )    ) // assertion
)

( condition Ssh_Secure_Authentication_Modes
    ( assertion
        ( or      ( member
            SSH_RSA ssh-supported-auth-modes )        ( member
            SSH_RHOSTS_WITH_RSA ssh-supported-auth-modes )
        ) // or
    ) // assertion
)

( condition Ssl_Session_Qos
    ( assertion
```

```
            ( and ( or ( absent initiator-auth-keysize    )

( ge initiator-auth-keysize 1024  )

) // or ( ge target-auth-keysize 1024 )

( ge ke-keysize 768 )

( ge encipher-keysize 128 )

( ge protocol-version ( version "3.0" ) )

) // and

) // assertion

)

( condition Strong_Password ( assertion ( and ( ge password-length 8 )

( or ( eq password-has-alphabetic true )

( eq password-has-numeric true )

) // or ( eq password-has-special true )

) // and

) // assertion

)

( condition Tcp_Data_Xfer
```

```
( assertion ( eq tcp-data true ) ) // assertion
)

( disposition Authentication_Failed ( code AUTHENTICATION_VIOLATION )

( log-directive

HIGH

"Authentication handshake failed"

)
)

( disposition Ftp_Access_Violation ( code ACCESS_DENIED )

( log-directive

HIGH

"Illegal traffic at FTP level"

)
)

( disposition Handshake_Aborted ( code AUTHENTICATION_VIOLATION )

( log-directive

INFORMATION

"Authentication handshake aborted by either party"

)
)

( disposition Http_Access_Violation ( code ACCESS_DENIED )
```

```
( log-directive
    HIGH
    "Illegal traffic at HTTP level"
)
)

( disposition Icmp_Access_Violation
    ( code ACCESS_DENIED )
    ( log-directive
        HIGH
        "Illegal traffic at ICMP level"
    )
)

( disposition Incorrect_Port_Usage
    ( code SECURITY_ATTACK )
    ( log-directive
        MEDIUM
        "A TCP/UDP service is being used by an unexpected/unknown protocol"
    )
)

( disposition Ip_Access_Violation
    ( code ACCESS_DENIED )
    ( log-directive
        HIGH
        "Illegal traffic at IP level"
    )
)

( disposition Monitor_Anonymous_Login
```

```
    ( code OK )

( log-directive

MONITOR

"Anonymous login is being used"

)

)

( disposition Monitor_Broadcasts ( code OK )

( log-directive

MONITOR

"Multicast or Broadcast traffic detected"

)

)

( disposition Monitor_Icmp ( code OK )

( log-directive

MONITOR

"ICMP traffic detected"

)

)

( disposition Probable_Scan ( code SECURITY_ATTACK )

( log-directive

WARNING

"A probable network scan of a blocked TCP service has been detected"

)

)
```

```
( disposition Protocol_Unknown ( code ACCESS_DENIED )

( log-directive

HIGH

"A protocol not understood by the monitoring system has been detected"

)

)

( disposition Ssh_Access_Violation ( code ACCESS_DENIED )

( log-directive

HIGH

"Illegal traffic at SSH level"

)

)

( disposition Ssl_Access_Violation ( code ACCESS_DENIED )

( log-directive

HIGH

"Illegal traffic at SSL level"

)

)

( disposition Tcp_Access_Violation ( code ACCESS_DENIED )

( log-directive

HIGH

"Illegal traffic at TCP level"

)

)
```

```
( disposition Udp_Access_Violation ( code ACCESS_DENIED )

( log-directive

HIGH

"Illegal traffic at UDP level"

)

)

( disposition Warn_Missed_Handshake ( code OK )

( log-directive

WARNING

"Missed the authentication handshake"

)

)

( disposition Warn_Missed_Tcp_Connect ( code OK )

( log-directive

WARNING

"Missed TCP connect"

)

)

( disposition Weak_Authentication ( code SECURITY_QOS )

( log-directive

HIGH

"A weak authentication mode or mechanism is being allowed"

)
```

)

( disposition Weak_Password ( code SECURITY_QOS )

( log-directive

HIGH

"A weak password is being used for authentication"

)

)

( rule Ftp_Anonymous_Authentication ( protocol FTP )

( action CONTROL_AUTHENTICATE )

( initiator Anon_User )

( target ignore )

( outcome ( immediate ( if Authentication_Rejected Authentication_Failed )

( default Monitor_Anonymous_Login )

)

)

)

( rule Tcp_Blocked_Services ( protocol TCP )

( action CONNECT )

( initiator ignore )

( target ignore )

( outcome ( final ( default Probable_Scan )

```
            )
          )
        )

( rule Ftp_Blocked_Service_Violation
        ( protocol FTP )
        ( action ignore )
        ( prerequisite Tcp_Blocked_Services )
        ( initiator ignore )
        ( target ignore )
        ( outcome
            ( immediate
                ( default Ftp_Access_Violation )
            )
        )
    )

( rule Ftp_Deny
        ( protocol FTP )
        ( action ignore )
        ( initiator ignore )
        ( target ignore )
        ( outcome
            ( immediate
                ( default Ftp_Access_Violation )
            )
        )
    )

( rule Ftp_Ignore_Data_Connections
        ( protocol FTP )
```

```
( action DATA_OPEN )

( initiator ignore )

( target ignore )

( outcome ( immediate ( default ok )

)

)

)

( rule Ftp_Validate_Password ( protocol FTP )

( action CONTROL_AUTHENTICATE )

( initiator ignore )

( target ignore )

( outcome ( immediate ( if Authentication_Rejected Authentication_Failed )

( ifnot Strong_Password Weak_Password )

( default ok )

)

)

)

( rule Http_Blocked_Service_Violation ( protocol HTTP )

( action ignore )

( prerequisite Tcp_Blocked_Services )

( initiator ignore )

( target ignore )

( outcome
```

```
        ( immediate ( default Http_Access_Violation )

)

)

)

( rule Http_Deny ( protocol HTTP )

( action ignore )

( initiator ignore )

( target ignore )

( outcome ( immediate ( default Http_Access_Violation )

)

)

)

( rule Icmp_Deny ( protocol ICMP )

( action ignore )

( initiator ignore )

( target ignore )

( outcome ( immediate ( default Icmp_Access_Violation )

)

)

)

( rule Ip_Within_X
```

```
( protocol IP )
( action ASSOCIATION )
( agent X_Monitors )
( initiator Ip_Within_X_Initiator )
( target X_Coloc_Subnet )
( outcome
    ( final
        ( default Protocol_Unknown )
    )
)
)

( rule Icmp_Within_X
    ( protocol ICMP )
    ( action ASSOCIATION )
    ( agent X_Monitors )
    ( prerequisite Ip_Within_X )
    ( initiator ignore )
    ( target ignore )
    ( outcome
        ( immediate
            ( default Monitor_Icmp )
        )
    )
)

( rule Ip_Deny
    ( protocol IP )
    ( action ignore )
    ( initiator ignore )
    ( target ignore )
```

```
    ( outcome
        ( immediate
            ( default Ip_Access_Violation )
        )
    )
)

( rule Ip_Directed_Broadcasts_Within_X
    ( protocol IP  )
    ( action ASSOCIATION  )
    ( agent X_Monitors )
    ( initiator Ip_Within_X_Initiator )
    ( target Ip_Directed_Broadcasts_Within_X_Target )
    ( outcome
        ( immediate
            ( default Monitor_Broadcasts )
        )
    )
)

( rule Ip_External_Communities_To_X
    ( protocol IP  )
    ( action ASSOCIATION  )
    ( agent X_Monitors )
    ( initiator X_External_Communities )
    ( target X_Coloc_Subnet )
    ( outcome
        ( final
            ( default Protocol_Unknown )
        )
    )
```

)

( rule Ip_Non_Directed_Broadcasts_Within_X ( protocol IP )

( action ASSOCIATION )

( agent X_Monitors )

( initiator Ip_Within_X_Initiator )

( target __Generic_Multicast_And_Broadcast_Addresses )

( outcome ( immediate ( default Monitor_Broadcasts )

)

)

)

( rule Ip_X_To_External_Communities ( protocol IP )

( action ASSOCIATION )

( agent X_Monitors )

( initiator X_Coloc_Subnet )

( target X_External_Communities )

( outcome ( final ( default Protocol_Unknown )

)

)

)

( rule Ip_Unknown_Protocol ( protocol IP )

( action PROTOCOL_UNKNOWN )

```
        ( initiator ignore )

( target ignore )

( outcome ( immediate ( default Protocol_Unknown )

)

)

)

( rule Ssh_Blocked_Service_Violation ( protocol SSH )

( action ignore )

( prerequisite Tcp_Blocked_Services )

( initiator ignore )

( target ignore )

( outcome ( immediate ( default Ssh_Access_Violation )

)

)

)

( rule Ssh_Deny ( protocol SSH )

( action ignore )

( initiator ignore )

( target ignore )

( outcome ( immediate ( default Ssh_Access_Violation )

)
```

```
        )
    )

( rule Ssh_Validate_Handshake ( protocol SSH )

( action ( union HANDSHAKE SESSION_ABORTED ) )

( initiator ignore )

( target ignore )

( outcome ( immediate ( if Ssh_Authentication_Failed Authentication_Failed )

( if Ssh_Authentication_Aborted Handshake_Aborted )

( ifnot Ssh_Secure_Authentication_Modes Weak_Authentication )

( default ok )

)

)

)

( rule Ssl_Blocked_Service_Violation ( protocol SSL )

( action ignore )

( prerequisite Tcp_Blocked_Services )

( initiator ignore )

( target ignore )

( outcome ( immediate ( default Ssl_Access_Violation )

)

)

)
```

```
( rule Ssl_Deny ( protocol SSL )

( action ignore )

( initiator ignore )

( target ignore )

( outcome ( immediate ( default Ssl_Access_Violation )

)

)

)

( rule Ssl_Missed_Handshakes ( protocol SSL )

( action MISSED_HANDSHAKE )

( initiator ignore )

( target ignore )

( outcome ( immediate ( default Warn_Missed_Handshake )

)

)

)

( rule Ssl_Validate_Handshake ( protocol SSL )

( action HANDSHAKE )

( initiator ignore )

( target ignore )

( outcome ( immediate
```

```
            ( if Authentication_Rejected Authentication_Failed )

( ifnot Ssl_Session_Qos Weak_Authentication )

( default ok )

)

)

)

( rule Tcp_Blocked_Services_Response ( protocol TCP )

( action ( union ABORT CLOSE TIMEOUT ) )

( prerequisite Tcp_Blocked_Services )

( initiator ignore )

( target ignore )

( outcome ( immediate ( if Tcp_Data_Xfer Tcp_Access_Violation )

( default Probable_Scan )

)

)

)

( rule Tcp_Blocked_Services_Violation ( protocol TCP )

( action PROTOCOL_UNKNOWN )

( prerequisite Tcp_Blocked_Services )

( initiator ignore )

( target ignore )

( outcome ( immediate ( default Tcp_Access_Violation )

)
```

```
    )
)

( rule Tcp_Connection_Terminated ( protocol TCP )

( action ( union ABORT CLOSE TIMEOUT ) )

( initiator ignore )

( target ignore )

( outcome ( immediate ( default ok )

)

)

)

( rule Tcp_Deny ( protocol TCP )

( action ignore )

( initiator ignore )

( target ignore )

( outcome ( final ( default Tcp_Access_Violation )

)

)

)

( rule Tcp_Missed_Connections ( protocol TCP )

( action MISSED_CONNECT )

( initiator ignore )
```

```
( target ignore )
( outcome
    ( immediate
        ( default Warn_Missed_Tcp_Connect )
    )
)
)

( rule Tcp_X_Dns_From_Colloc_To_Dns_Server
    ( protocol TCP )
    ( action CONNECT )
    ( agent X_Monitors )
    ( initiator X_Coloc_Subnet )
    ( target Tcp_X_Dns_From_Colloc_To_Dns_Server_Target )
    ( outcome
        ( immediate
            ( default ok )
        )
    )
)

( rule Tcp_X_Http_From_Any_To_All_Web_Servers_Provisional
    ( protocol TCP )
    ( action CONNECT )
    ( agent X_Monitors )
    ( initiator ignore )
    ( target Tcp_X_Http_From_Any_To_All_Web_Servers_Provisional_Target )
    ( outcome
        ( final
            ( default ok )
        )
```

)
)

( rule Tcp_X_Port_1984_Traffic
    ( protocol TCP )
    ( action CONNECT )
    ( agent X_Monitors )
    ( initiator X_Coloc_Subnet )
    ( target Tcp_X_Port_1984_Traffic_Target )
    ( outcome
        ( immediate
            ( default ok )
        )
    )
)

( rule Tcp_X_X_Loghost_Traffic
    ( protocol TCP )
    ( action CONNECT )
    ( agent X_Monitors )
    ( initiator X_Web_Servers )
    ( target Tcp_X_X_Loghost_Traffic_Target )
    ( outcome
        ( immediate
            ( default ok )
        )
    )
)

( rule Tcp_X_Shh_From_Clouds_To_Cgi_Provisional
    ( protocol TCP )

```
        ( action CONNECT )

( agent X_Monitors )

( initiator Clouds )

( target Tcp_X_Shh_From_Clouds_To_Cgi_Provisional_Target )

( outcome ( final ( default ok )

)

)

)

( rule Tcp_X_Spm_Colloc_Traffic ( protocol TCP )

( action CONNECT )

( agent X_Monitors )

( initiator Modin )

( target Tcp_X_Spm_Colloc_Traffic_Target )

( outcome ( immediate ( default ok )

)

)

)

( rule Tcp_X_Spm_Colloc_Traffic_Provisional ( protocol TCP )

( action CONNECT )

( agent X_Monitors )

( initiator Modin )

( target Tcp_X_Spm_Colloc_Traffic_Provisional_Target )

( outcome
```

```
            ( final
                ( default ok )
            )
        )
    )

( rule Tcp_X_Ssh_From_Fluffy_To_Monkey_Provisional
    ( protocol TCP )
    ( action CONNECT )
    ( agent X_Monitors )
    ( initiator Fluffy )
    ( target Tcp_X_Ssh_From_Fluffy_To_Monkey_Provisional_Target )
    ( outcome
        ( final
            ( default ok )
        )
    )
)

( rule Tcp_X_Ssh_From_Monkey_To_Fluffy_Provisional
    ( protocol TCP )
    ( action CONNECT )
    ( agent X_Monitors )
    ( initiator Monkey )
    ( target Tcp_X_Ssh_From_Monkey_To_Fluffy_Provisional_Target )
    ( outcome
        ( final
            ( default ok )
        )
    )
)
```

```
( rule Tcp_X_Ssh_From_X_To_X_Web_Servers_Provisional
    ( protocol TCP )
    ( action CONNECT )
    ( agent X_Monitors )
    ( initiator X_Ssh_From_X_To_X_Web_Servers_Provisional_Initiator )
    ( target Tcp_X_Ssh_From_X_To_X_Web_Servers_Provisional_Target )
    ( outcome
        ( final
            ( default ok )
        )
    )
)

( rule Tcp_X_Ssh_To_Security_Web_Server
    ( protocol TCP )
    ( action CONNECT )
    ( agent X_Monitors )
    ( initiator X_Ssh_To_Security_Web_Server_Initiator )
    ( target Tcp_X_Ssh_To_Security_Web_Server_Target )
    ( outcome
        ( immediate
            ( default ok )
        )
    )
)

( rule Tcp_X_Stmp_From_All_To_X
    ( protocol TCP )
    ( action CONNECT )
    ( agent X_Monitors )
```

```
( initiator X_Stmp_From_All_To_X_Initiator )

( target _Smtp )

( outcome ( immediate ( default ok )

)

)

)

( rule Tcp_Unknown_Protocol ( protocol TCP )

( action PROTOCOL_UNKNOWN )

( initiator ignore )

( target ignore )

( outcome ( immediate ( default Incorrect_Port_Usage )

)

)

)

( rule Udp_Deny ( protocol UDP )

( action ignore )

( initiator ignore )

( target ignore )

( outcome ( immediate ( default Udp_Access_Violation )

)

)
```

)

( rule Udp_X_Dns_From_Colloc_To_Dns_Server ( protocol UDP )

( action ASSOCIATION )

( agent X_Monitors )

( initiator X_Coloc_Subnet )

( target Udp_X_Dns_From_Colloc_To_Dns_Server_Target )

( outcome ( immediate ( default ok )

)

)

)

)

TABLE P

Evaluation Algorithm

In the preferred embodiment the policy engine applies a policy evaluation algorithm to each incoming protocol event. The algorithm results in a selection of a policy rule applicable to the protocol event and may produce
an immediate or final disposition.
Following is a step-by-step description of the evaluation algorithm according to the preferred embodiment. It is noted that the evaluation procedure described herein below is in conceptual form and does not take into account any possible runtime optimizations:
1) Select a set of rules applicable to an Agent reporting an event;
2) From said set, select a second set of rules applicable to an associated examined protocol.
3) From said second set, select a third set of rules applicable to an associated examined protocol action.
4) Starting with a most specific policy rule in said third set and descending to a least specific rule find a policy rule satisfied by said protocol event. A matching algorithm according to the preferred embodiment is as follows:
   a) If one or more orderly listed prerequisite rules are specified, ensure at least one of said prerequisite rules is satisfied by a previously processed protocol event. In the preferred embodiment a prerequisite rule is satisfied if it is a pending policy rule for the protocol event.
   b) Match initiator and target credentials in the policy rule against the corresponding initiator and target credentials presented in the protocol event.
5) If a policy rule satisfying the protocol event is not found the policy engine generates a disposition for the network event indicating that a policy specification error was encountered. Effectively the processing of the network event thereby terminates.
6) If a policy rule satisfying the protocol event is found, the policy engine checks for other rules having a same ranking number and also satisfying the event. If such rules are found the policy engine uses the following algorithm in the preferred embodiment to select a single applicable rule:
   a) Rules that specify all protocols, i.e. using ignore or present, are less specific than rules that explicitly list a set of one or more protocols.
   b) Rules that specify all actions (i.e. using ignore or present) are less specific than rules that explicitly list a set of one or more actions.
   c) Rules that have prerequisites are more specific than rules that do not have prerequisites. Rules that specify a higher-ranking prerequisite are more specific than rules that specify a lower-ranking prerequisite. In the preferred embodiment a ranking relationship is relevant only if both prerequisite rules belong to a same protocol-action group.
   d) If thereafter a single rule is determined as more specific than the others it is selected for the protocol event. If more than one rule remains the policy engine sorts the remaining rules in increasing lexical order by name and selects a first rule from the sorted rules having an immediate disposition indicating in decreasing order of precedence:
     i) a policy violation (any disposition code other than OK or CONTINUE);
     ii) CONTINUE (allows other rules to examine further the network event); and
     iii) OK The outcome of the policy evaluation algorithm herein above is a policy rule that satisfies the protocol event. If an immediate outcome is specified for that rule, it is executed, producing a disposition for the protocol event. If the disposition comprises a final disposition code (any code other than CONTINUE), the disposition is also the final disposition for the network event.
Otherwise in the preferred embodiment the selected policy rule is a pending policy rule for the network event. In absence of any further protocol events the pending policy rule is promoted to selected policy rule. A final outcome of the selected policy rule is executed producing a final disposition for the network event.

An Exemplary User Interface for Providing and Reporting Processed and Analyzed Network Data to an End User An exemplary user interface for providing and reporting the processed and analyzed network data from the database (FIG. 1a-165) to an end user is provided below.

It should be appreciated that examples of a typical end user using such interface are, but are not limited to a customer whose network is being monitored, an operations analyst reviewing the customer's network environment and network data, and/or a policy analyst reviewing the network data and its conformance to network policy.

The preferred embodiment of the invention uses a web page paradigm as an example of a type of user interface, and is described with reference to figures of screen prints of web pages herein. While the claimed invention herein has disclosed a web page implementation of a user interface, it will be appreciated by those skilled in the art that such user interface readily encompasses any form, that can be substituted therefore to effect a similar result as is achieved by the web page, including but not limited to any graphical user interface or non-graphical user interface.

The preferred embodiment of the invention is described with reference to FIG. 20 and comprises a system dashboard, label 20000 on a home page, wherein the dashboard 20000 is kept up to date with current monitoring information from the monitored network.

In the preferred embodiment of the invention, the dashboard 20000 updates once every five minutes. It should be appreciated that different update rates can be used to keep the data on the dashboard 20000 current, and that parts of the underlying customer data may be updated at a different, such as a slower rate.

Figure 21:
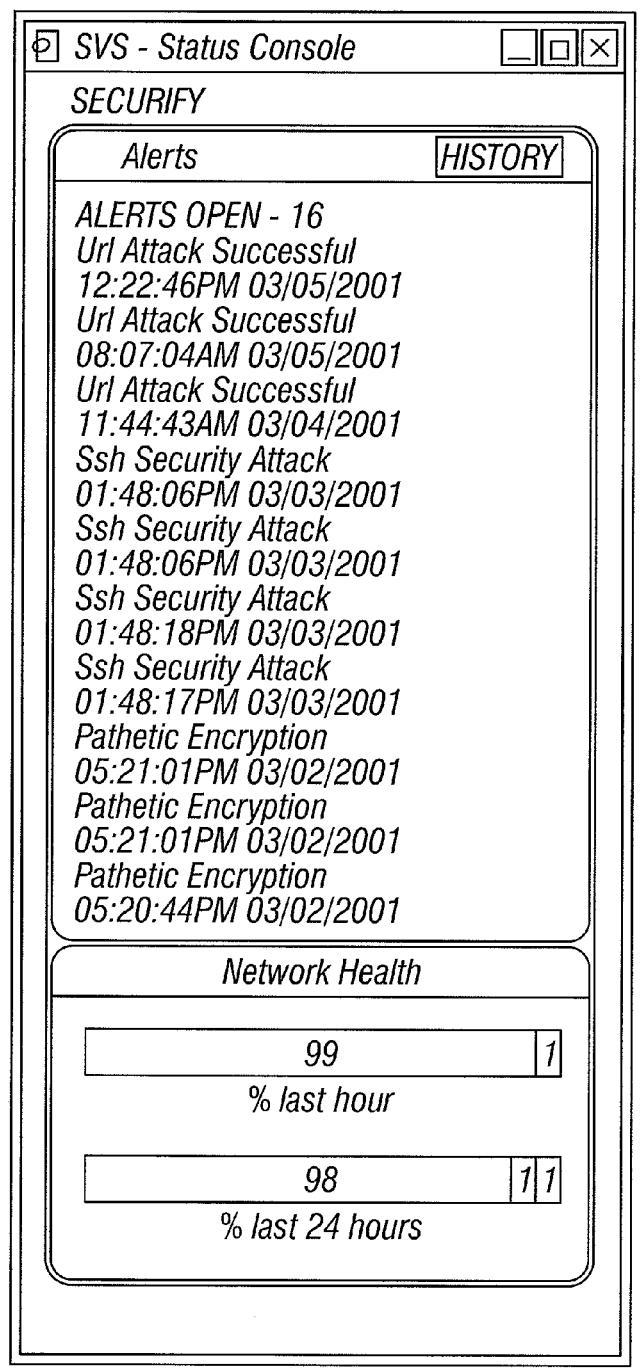
FIG. 21 shows an example of a tear off console according to the invention.

The preferred embodiment of the invention provides a tear off feature on the system dashboard 20000. In this example, the end user clicks on a tear off tab 20010 to open a tear off console window. FIG. 21 shows an example of a tear off console window according to the invention. It is intended that the end user keep the console window open on the computer desktop all day long to view high level reporting of the health of the monitored network.

The preferred embodiment of the invention provides an outstanding alerts area 20020 of the dashboard and consists of a FIFO queue of CRITICAL alerts that have been generated by the policy monitoring system (FIG. 1a-106). In the preferred embodiment of the invention the following applies. The size of the alert list can be limited to a predetermined number of elements. The total number of open alerts can be displayed within the alerts area 20030.

Figure 28:
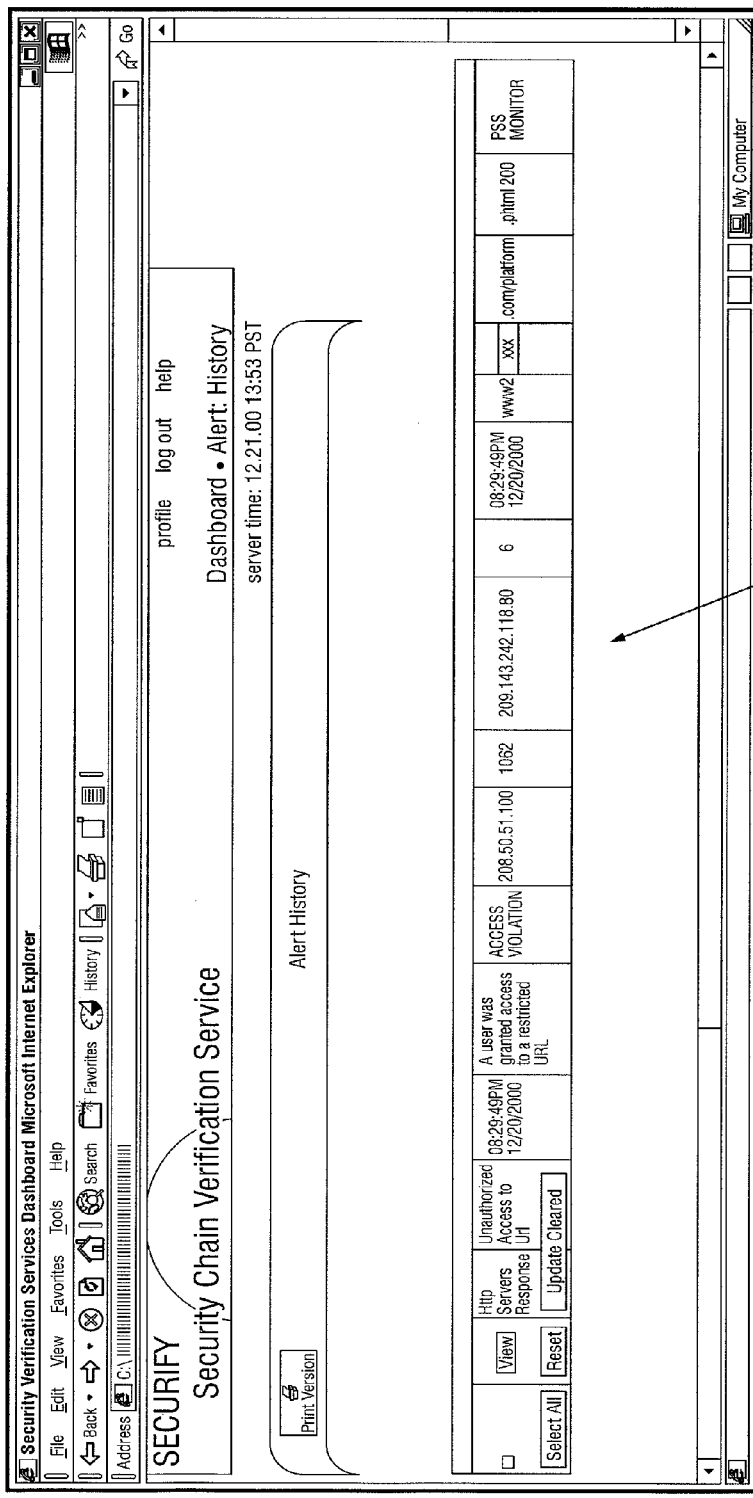
FIG. 28 shows an example of an alert details page according to the invention.

The underlying data is updated on a real-time basis. Entries in the list link to alert details, as depicted in FIG. 28. In this example, clicking on an entry in the list 20030 opens up an alert details page 2801 for that particular alert, comprising such alert details as, for example rule, disposition, time of alert, type of alert, source ip-address, destination IP-address, and the like.

The preferred embodiment of the invention provides a health monitor 20040 to show a visual representation of the severity categories into which the current observed traffic has been assigned over a predetermined amount of time. In this example, the underlying data is updated every five minutes and summarizes traffic over the last one hour and last twenty four hour periods. CRITICAL and HIGH severity alerts have a red bar 20050, MEDIUM, WARNING and MONITOR uses a yellow bar 20060, and all others are green 20070.

The preferred embodiment of the invention provides access to current summary reports. An example is shown in FIG. 20 as part of the end user's home page. Such screen allows the end user to generate queries that summarize report data filtered by the monitoring point and over configurable time periods. An interface feature, such as a dropdown listbox 20090 allows the end user to choose one of a predetermined set of time periods, such as but not limited to the following:

Select date range—A specific time period expressed in starting month, day and hour, followed by ending month, day and hour using an interface feature such as dropdown listboxes 20091;
Last two hours;
Last 24 hours;
Today (since midnight);
Yesterday (00:00-23:59:59);
Last seven days;
This month (from first to present);
Last month (from first to end of month);
Last three months (three months back from present); and
Custom (retrieves date/time range from the last manually configured query).

Figure 22:
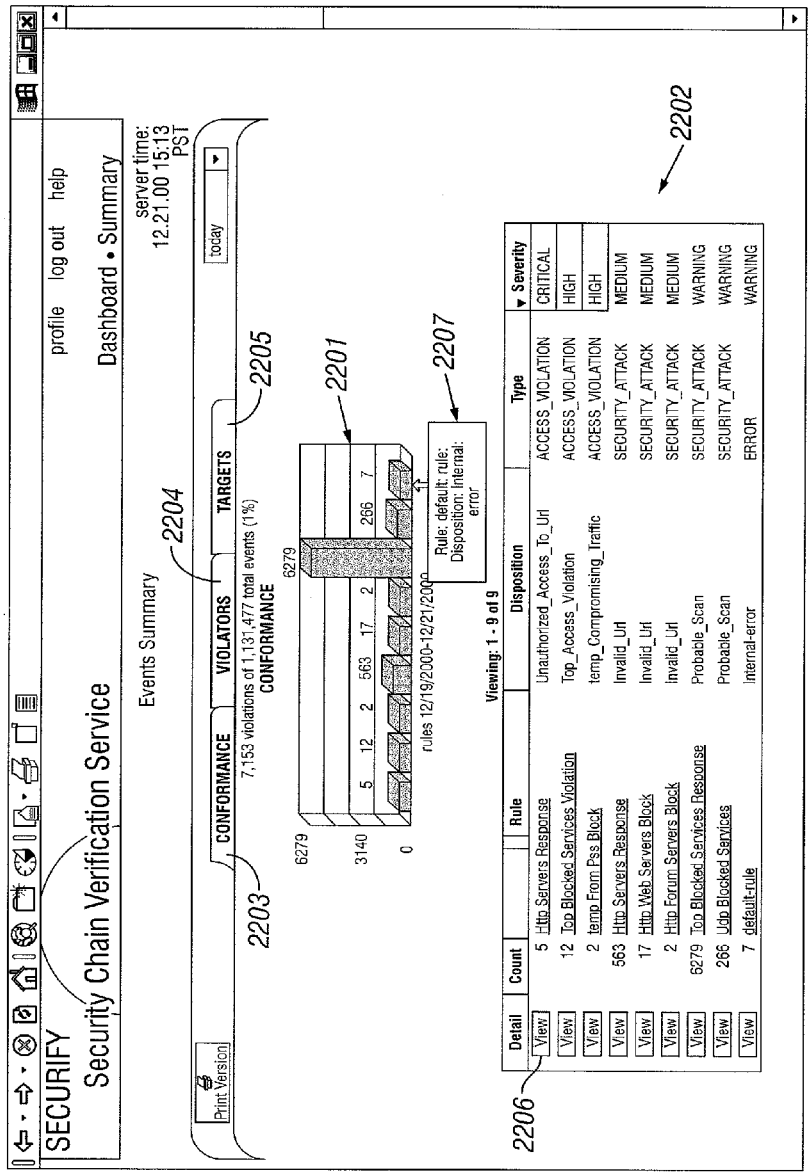
FIG. 22 shows an example of an events summary view according to the invention.

The preferred embodiment of the invention provides an events summary view as shown in FIG. 22.

Figure 23:
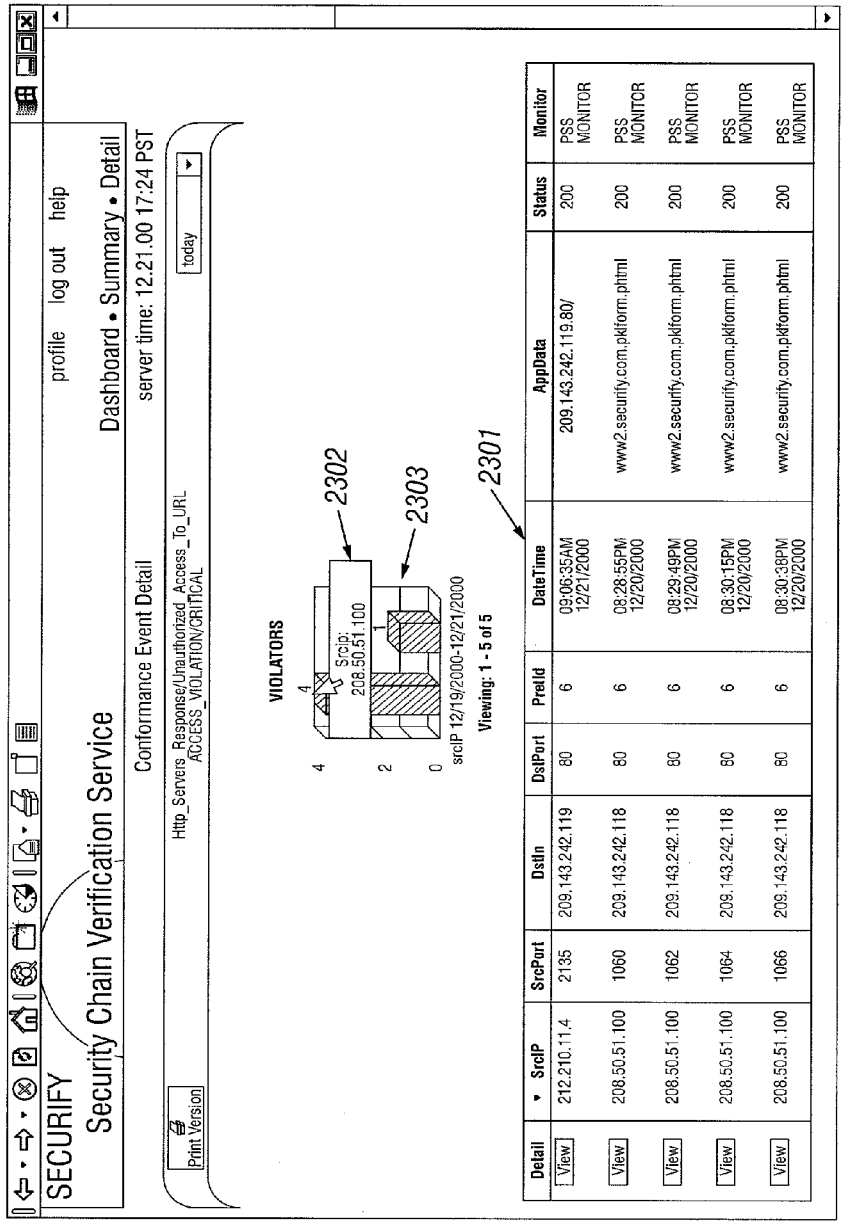
FIG. 23 shows an example of a conformance event details page according to the invention.
Figure 29:
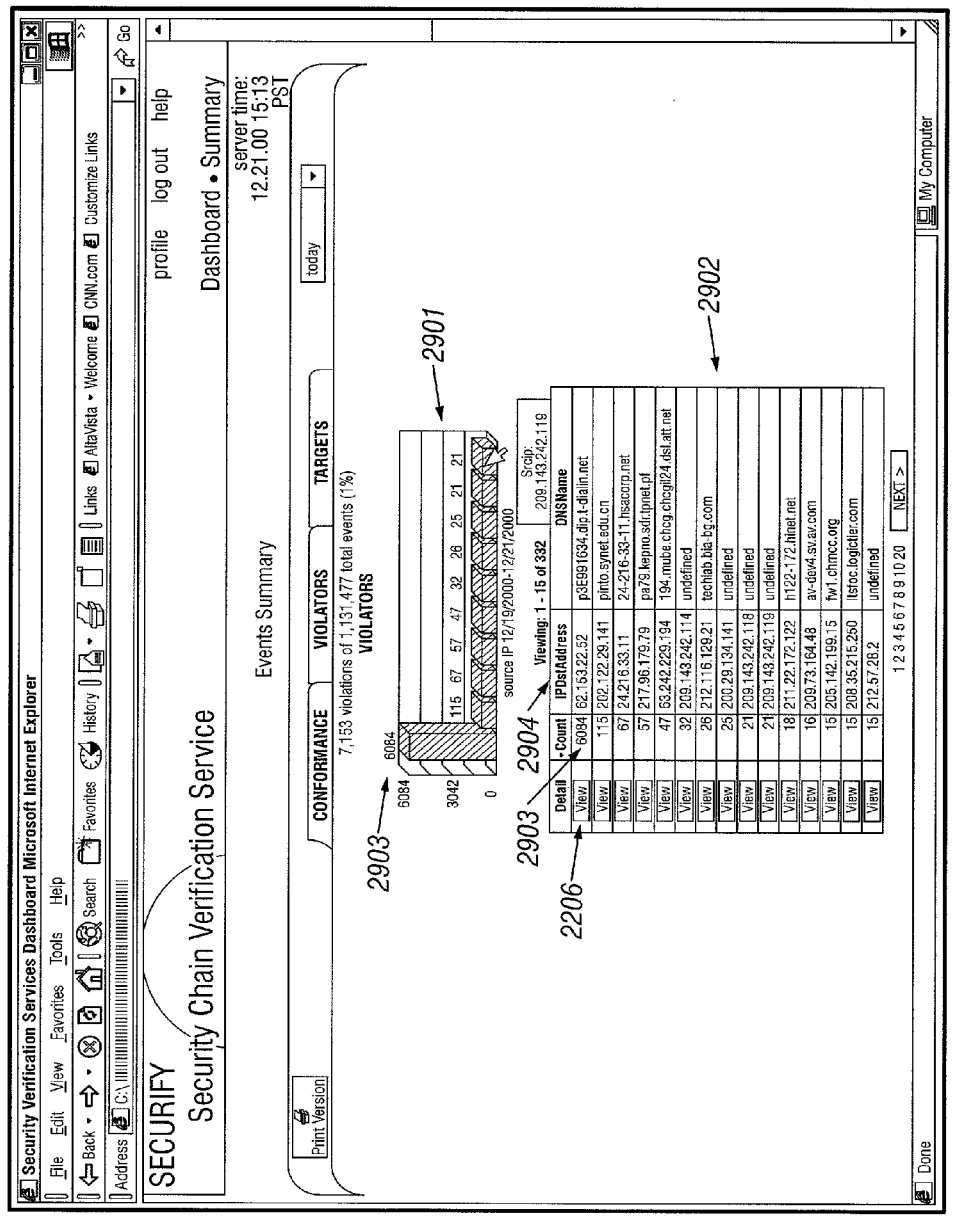
FIG. 29 shows an example of a violators chart and table page according to the invention.
Figure 30:
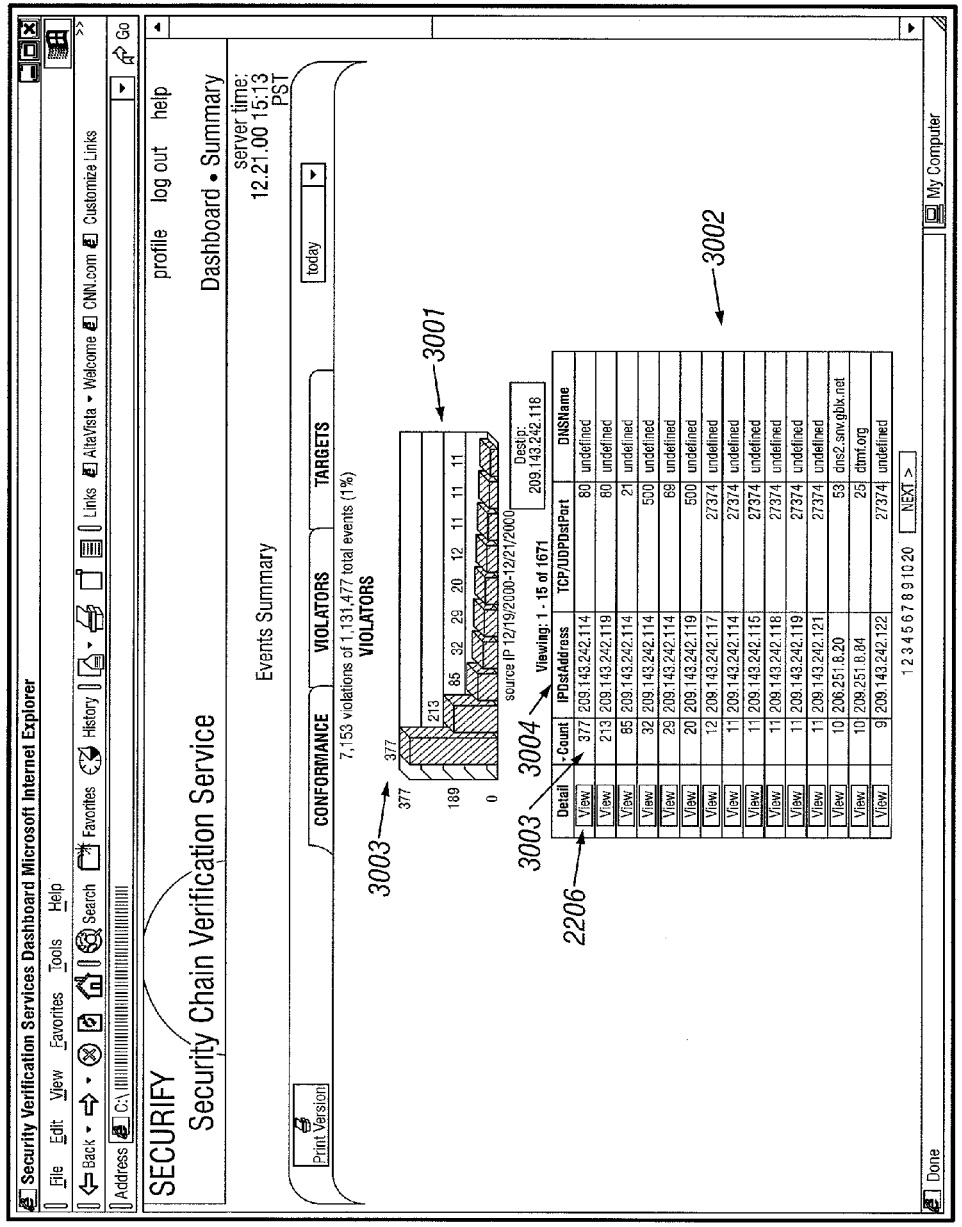
FIG. 30 shows an example of a targets chart and table page according to the invention.

In the example shown in FIG. 22, viewing the summary for a specific time period displays both a chart 2201 of a predetermined number of columns and a table 2202 displaying the following information, when the conformance tab 2203, the violators tab 2204, or the targets tab 2205, respectively, is selected:

A conformance chart/table shown in FIG. 22, displaying the count of violations for each rule/disposition pair.
   An icon 2206 links to a network event details page, such as shown in FIG. 23 that contains details of events that make up this count, i.e. all network events with such rule/disposition pair that occurred in the given time period.
A violators chart 2901 and table 2902 shown in FIG. 29, displaying the count 2903 of the number of violations for each of the top violating ip-addresses 2904.
   An icon 2206 links to a network event details page, such as shown in FIG. 23 that contains details of events that make up this count, i.e. all network events with such originating ip-address that occurred in the given time period.
A targets chart 3001 and table 3002 shown in FIG. 30, displaying the count 3003 of the number of violations for each of the top destination IP-addresses 3004.
   An icon 2206 links to the a event details page, such as shown in FIG. 23 that contains details of events that make up this count, i.e. all network events with such destination IP-address and port that occurred in the given time period.

FIG. 22 shows the events summary report for conformance.

The preferred embodiment of the invention provides a link to network events detail information. In this example, a separate link 2206 builds a network events details page as shown in FIG. 23. FIG. 23 contains a table that may be sorted or reverse sorted by any of the columns displayed 2301 of all violating network events with such a rule/disposition pair that occurred in the chosen time period.

In the preferred embodiment of the invention, the summary page (FIG. 22) contains a specification of the date range of the data being displayed. In particular, if the start of the range falls outside the range of date for acquiring user data then the actual start date of the user data is displayed.

It should be appreciated that in another equally preferred embodiment, user defined and configurable query and reports settings can be stored, for example, in a user's preferences or profile.

The preferred embodiment of the invention comprises trend reports on the dashboard, wherein such reports comprise charts that link to a network events summary page containing details of the summarized traffic. More specifically, the charts, unless otherwise explicitly specified, are bar charts, each of which link to the network events summary page.

Figure 20:
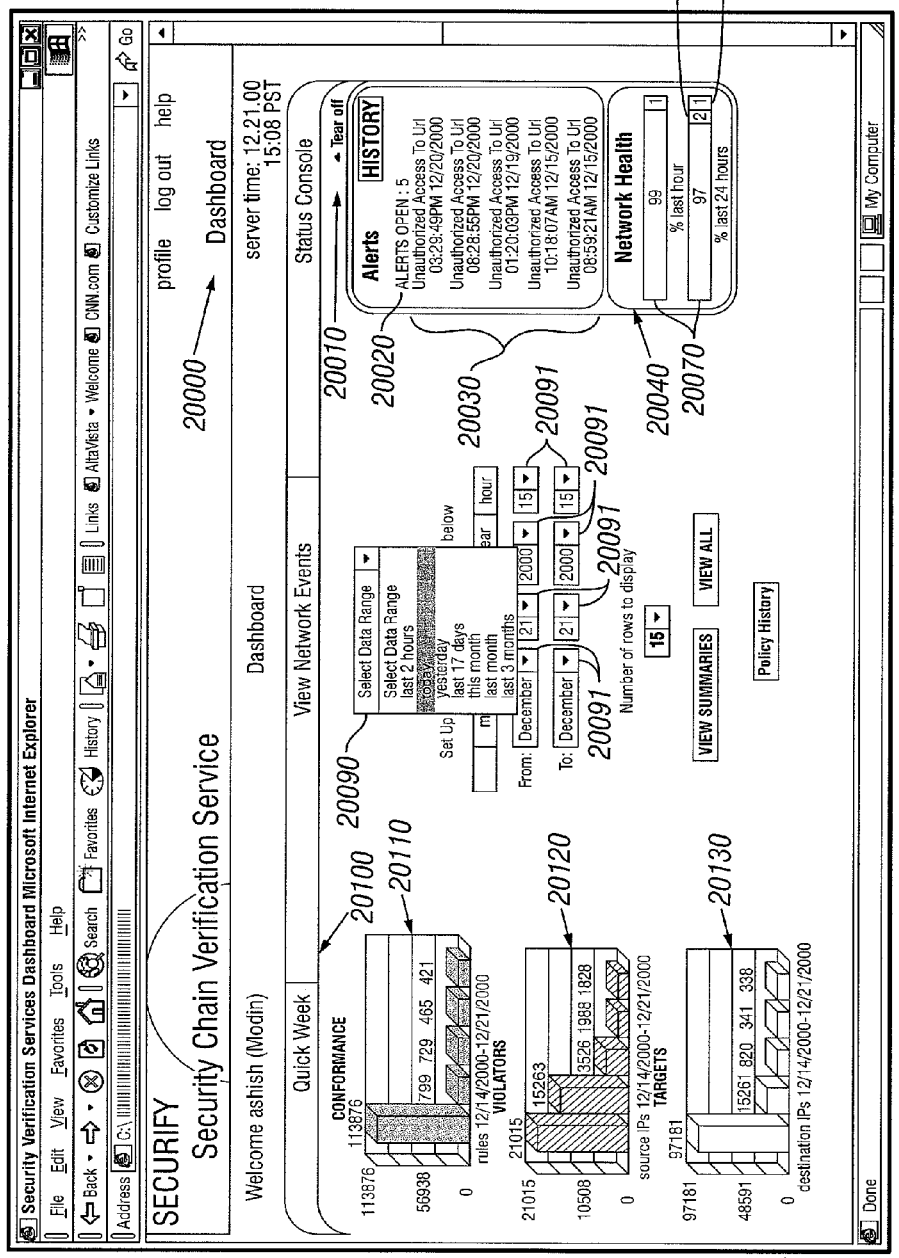
FIG. 20 is an example of a dashboard according to the invention.

Referring to FIG. 20, the preferred embodiment of the invention comprises a section, such as a QuickWeek section 20100 of the end user's main page, such as a login page or home page that contains trend graphs, such as but not limited to the following:

During the past seven days, the five most frequent rule/disposition combinations versus count 20110;
During the past seven days, the five most frequent violator ip-addresses versus count 20120; and
During the past seven days, the five most frequent target ip-addresses versus count 20130.

It should be appreciated that another equally preferred embodiment of the invention comprises an input means for the end user to customize which trends appear in the trend, e.g. QuickWeek section, and to customize the time period being viewed.

The preferred embodiment of the invention comprises trend charts that are embedded into details pages. Each of the trend charts allows the end user to dynamically configure a time range by a means such as a pull down menu. Examples of such embedded trend charts are:

Policy effectiveness;
Number of policy changes over time;
Event Summary (such as for the following):
   Conformance: Graphical view of the data for the specified time period 2201;
   Violators: Graphical view of the data for the specified time period; and
   Targets: Graphical view of the data for the specified time period; and
Network Event Details (such as for the following):
   Conformance Event Details (FIG. 23):Violator count over time for a particular rule/disposition combination 2303;
   Violators Event Details: Conformance count over time for a particular violator; and
   Target Event Details: Conformance count over time for a particular target;
All, e.g. in chronological order:Conformance count over time for a particular time period.

The preferred embodiment of the invention provides event detail reports, such as for but not limited to network event details, protocol event details, and alert details, described below.

The preferred embodiment of the invention provides a network event details page containing listed fields in columns that vary according to the violation type, such as, for example, All, Conformance (FIG. 23), Violator, and Target that had been selected at the summary level. For each type, except All, rather than repeat the field or column(s) which reiterate the violation, it will be displayed in the heading of the events detail page. For example, after choosing to view event details for a particular target, the DstIP is not repeated in every row. Each of the columns may be used to sort or reverse sort the report by clicking on that column's heading name. Following is a list of types of data provided in a network event details page:
  Monitoring Point;
  Disposition Name;
  Rule Name;
  Disposition Code;
  Severity;
  Src IP;
  Src Port;
  Dst IP;
  Dst Port;
  IPProtocol;
  Event Time: event times can be stored throughout the system in UTC; and
  Application Data:
    ICMP—ICMP action code;
    HTTP—URL;
    FTP—Filename;
    SSL—Ciphersuite, Issuer and Subject's certificate CommonName, Certificate Status;
    SSH—Authentication handshake status; and
  Application Status Code
    HTTP-StatusCode.

Figure 24:
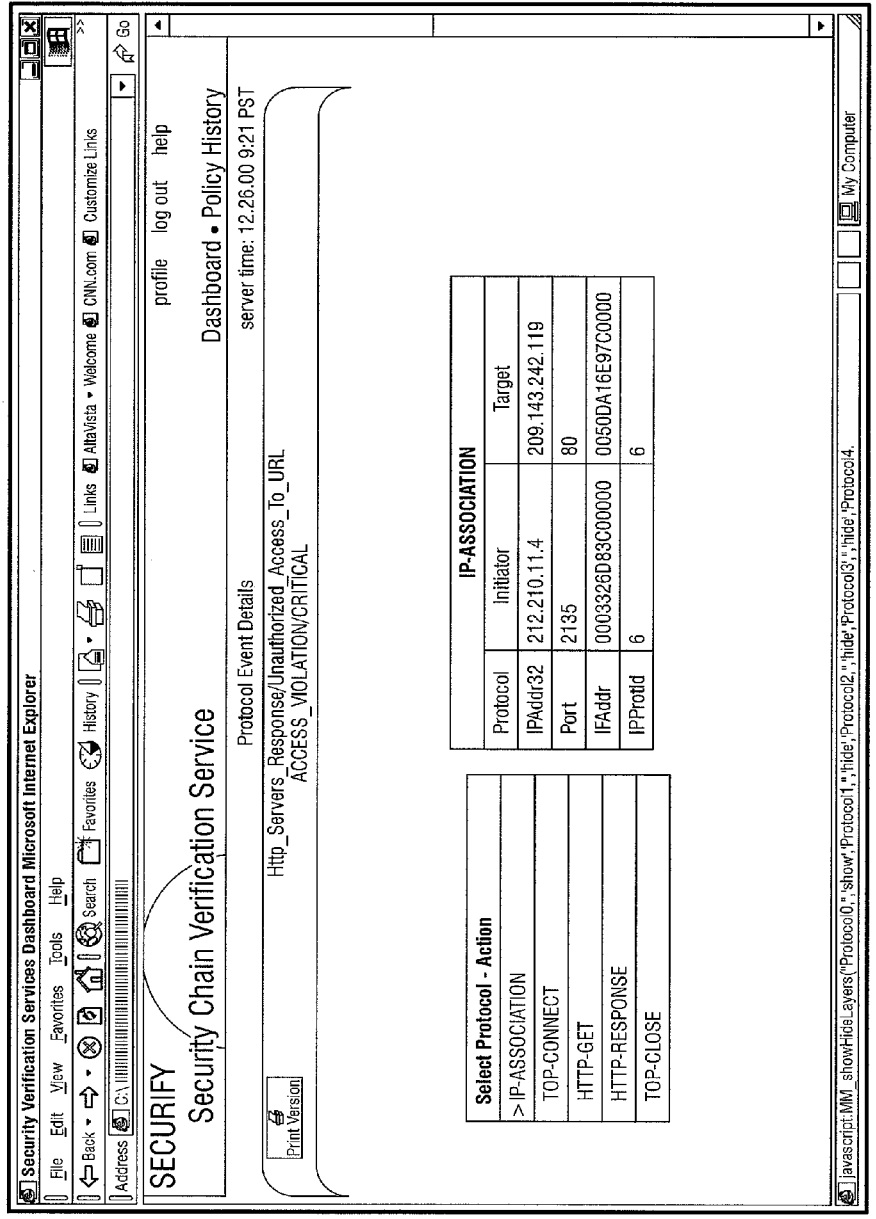
FIG. 24 shows an example of a protocol event details page according to the invention.
Figure 25:
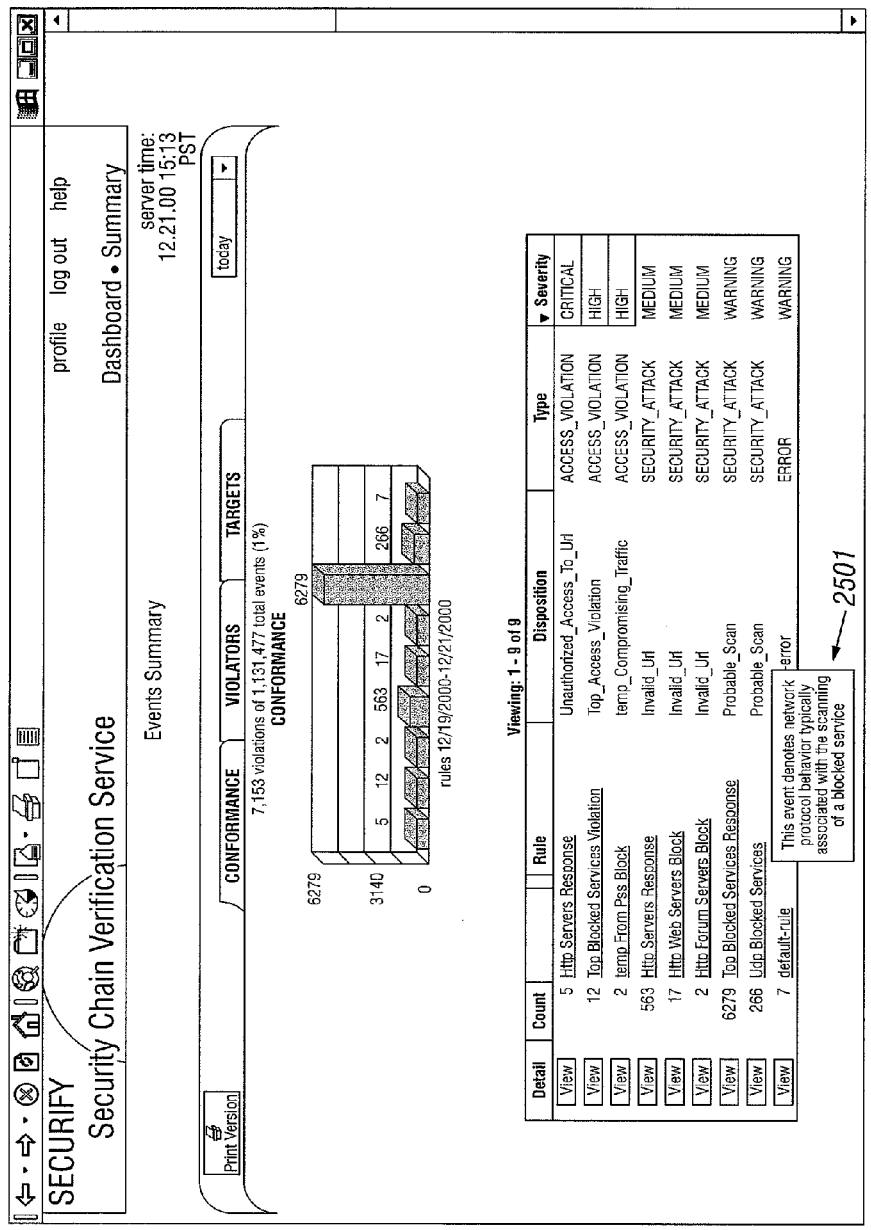
FIG. 25 shows an example of an events summary page containing a pop up description according to the invention.
Figure 26:
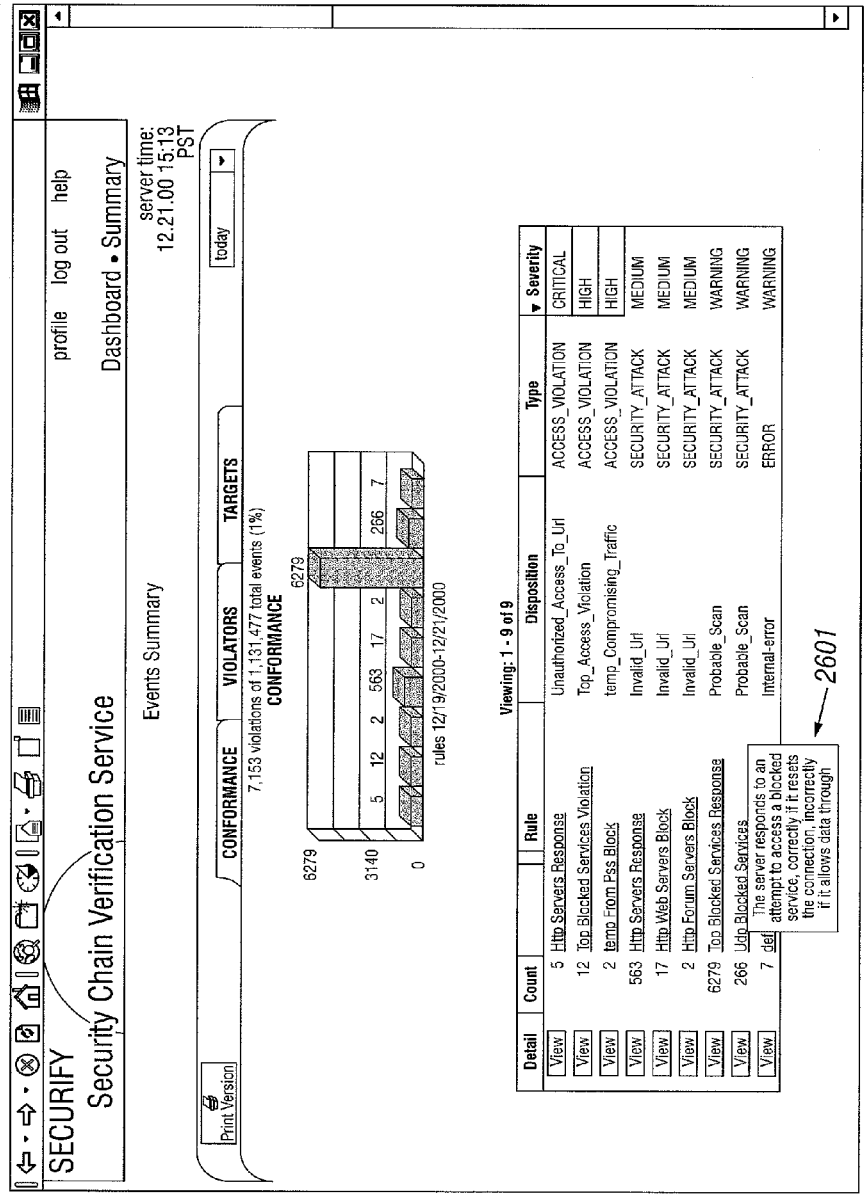
FIG. 26 shows an example of an events summary page containing a pop up description according to the invention.

The preferred embodiment of the invention provides a protocol event details page as depicted in FIG. 24 and that is created in the context of a particular network event instance. This data is retrieved on an as-needed basis from a database. The content of this page reflects the data available in a protocol event view of the QueryTool and is specific to the protocol or protocols being displayed. Such data includes, but is not limited to:
  Data from such attributes as IP address, interface address, protocol ID, service port, URL, file pathname, user name, password metrics, public key certificate, encrypted session parameters and status codes; and
  Protocol-specific actions such as HTTP methods, TCP protocol messages, ICMP message codes, FTP control commands, and authentication steps.

The preferred embodiment of the invention provides an alert event details page as depicted in FIG. 28 containing, but not limited to the following:
  details of the network event that caused the alert;
  rule and disposition name that triggered alert;
  log comment from the disposition;
  time at which the alert was generated;
  initiator ip address of the corresponding non-conformant traffic;
  target ip address of the corresponding non-conformant traffic;
  an icon that links to the network event details page describing the non-conformant network event; and
  checkbox to clear the alert.

The preferred embodiment of the invention provides a policy update page containing, but not limited to a table displaying each time a new policy is installed on the security policy management system discussed herein. This table contains, but is not limited to:
  Date of the policy installation;
  Description of policy; and
  A link to the English description that represents the newly installed policy.

It should be appreciated that in the preferred embodiment of the invention alerts are generated whenever a disposition with a CRITICAL severity is assigned to a network event, each alert generating an email containing, but not limited to the following information:
  time the alert occurred;
  rule and disposition name that triggered alert;
  log description, if any, from the corresponding disposition;
  initiator ip address of the corresponding non-conformant traffic;
  target ip address of the corresponding non-conformant traffic; and
  link to the network event detail describing the non-conformant network event.

The preferred embodiment of the invention provides a customer page that allows the user to configure a list of email addresses within a customer's organization that shall receive alert email.

Another equally preferred embodiment provides means for accessing ad-hoc queries for the end user, such as, but not limited to, filtering results by any one or all of the following:
  Protocol of the rule name;
  Policy rule name;
  A regular expression within the rule name;
  Disposition name of the violation;
  A regular expression within the disposition name;
  Source ip-address;
  A regular expression with source ip-address;
  Target (Destination) ip-address;
  A regular expression within target (destination) ip-address;
  Target (destination) port; and
  A regular expression within target (destination) port.

Figure 31:
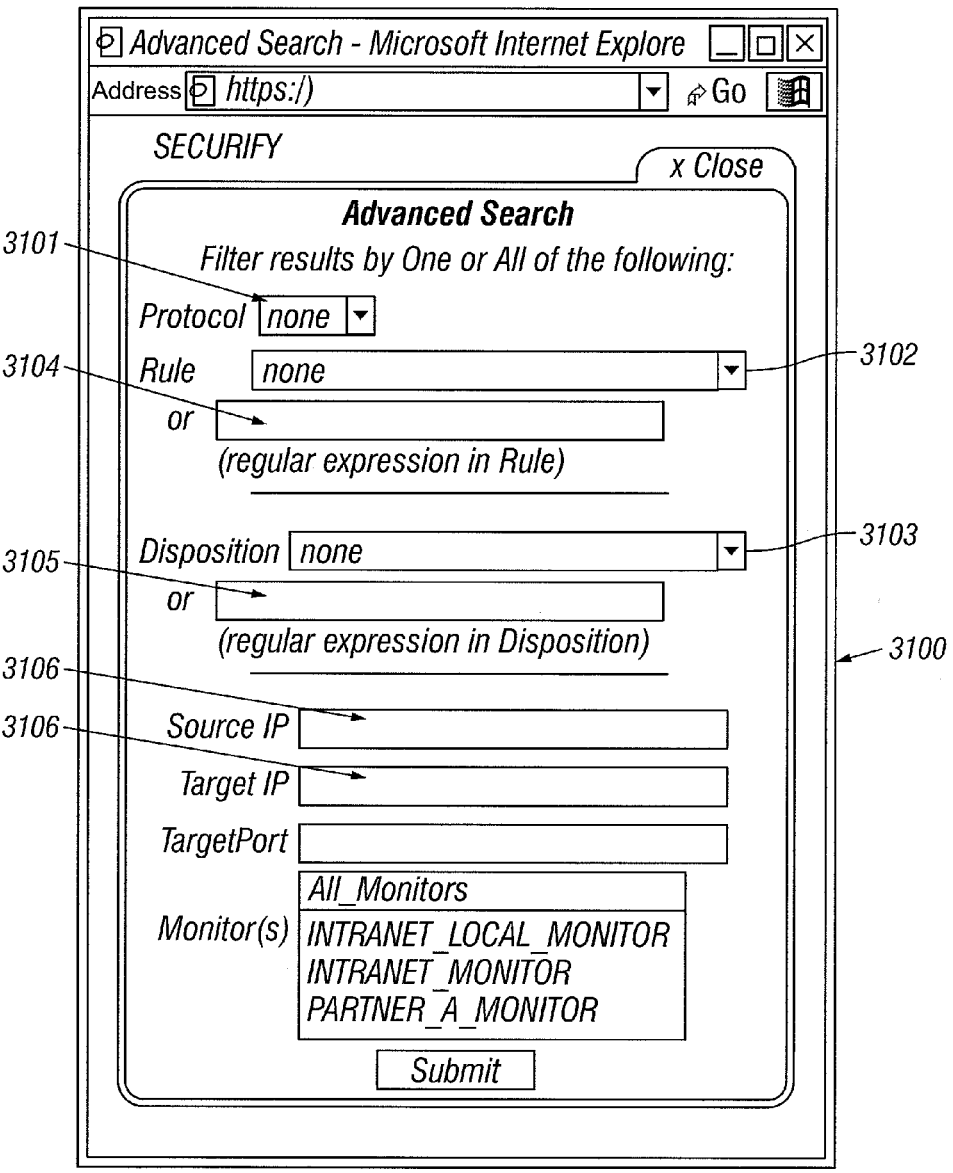
FIG. 31 shows an example of an advanced search dialog box according to the invention.

An example of a means for accessing ad-hoc queries is an advanced search feature, such as for example, an advanced search dialog box 3100, as depicted in FIG. 31. In the preferred embodiment of the invention, the advanced search dialog box 3100 comprises list boxes for such categories, such as protocol 3101, rule 3102, and disposition 3103, and text boxes for descriptions, such as regular expression in a rule 3104 or disposition 3105 and IP-addresses 3106.

Figure 32:
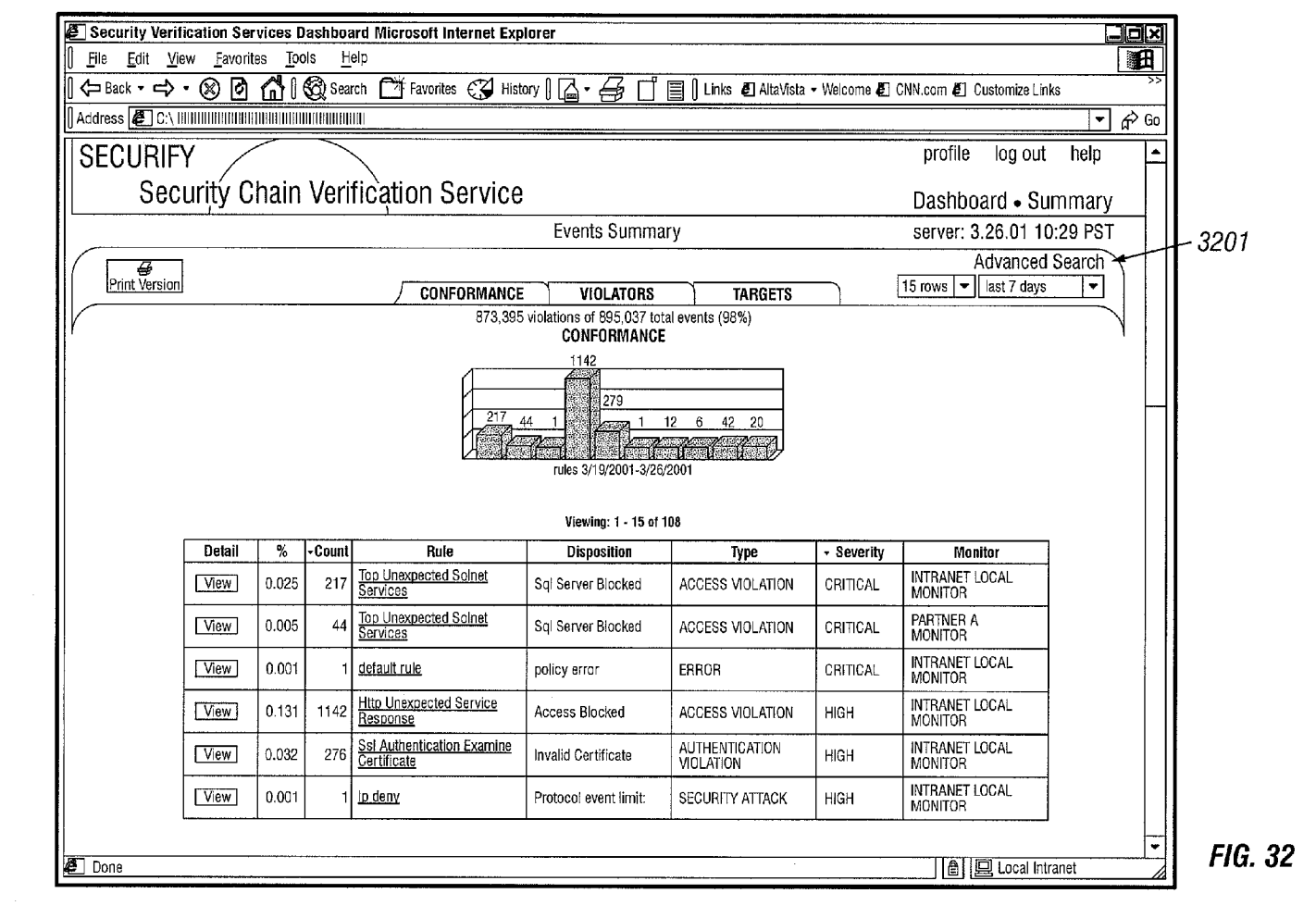

In the preferred embodiment of the invention, an end user can open the advanced search dialog box 3100 from an Advanced Search link 3201 on the dashboard, as depicted in FIG. 32, or from any event summary or event details page.

The preferred embodiment of the invention provides informational aids. For example, the following information about a user's policy is available via a variety of features, such as but not limited to links, tool tips, and the like:
  Customer specific policy interpretation, such as provided by English language representation;
  Rule and disposition descriptions as defined by the user in the user's policy, resolved DNS names for ip-addresses, and TCP and UDP service names; and
  A copyright page containing copyrights and trademarks as required by licensing agreements with vendors.

The preferred embodiment provides links to descriptions of rules, dispositions, IP-addresses, and the like, displayed, for example in a pop up window whenever the user's cursor is over the respective field, as depicted in FIG. 22 2207, FIG. 23-2302, FIG. 25-2501, FIG. 26-2601, and FIG. 27-2701, respectively.

The preferred embodiment of the invention provides links on each page that include, but are not limited to:
  Context sensitive help per-page.

In the preferred embodiment of the invention, each details page contains a button linking to a printer friendly version of the page.

In the preferred embodiment of the invention, regardless of the time zone the user's or the policy monitoring systems runs on, such as, for example Universal Time Coordinates (UTC). Any time being displayed to the user, such as, for example, on a website or in contents of emails, is converted to the user's time zone and as such is explicitly displayed.

Although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. An apparatus for translating packet data into a serialized stream of network event data, comprising:
   means for accepting said packet data live or from a first file containing said packet data;
   means for intepreting both sides of each network connection of one or more network connections in said packet data, wherein said means for interpreting comprises means for determining a relative time and a concurrency of each of a plurality of network events together with its comprised protocol events in said packet data and using said relative time and concurrency for making one or more policy decisions about said network event before it terminates;
   means for extracting security-sensitive information from said packet data, wherein said means for extracting omits passwords, documents, and other sensitive data; and
   means for generating output from said extracted security-sensitive information into said serialized stream of network event data in encoded format, wherein, said encoded format comprises a transaction identifier corresponding to said each said network connection, wherein each transaction identifier is used in a post-process to identify a plurality of actions corresponding to a plurality of protocol events on said network connections, each action including one or more elements of said security-sensitive information, and wherein said output is stored in a second file for subsequent post-processing by an interpreting processor or is fed continuously to said interpreting processor.

2. The apparatus of claim 1, wherein said encoded format is network event encoded format.

3. The apparatus of claim 1, wherein said generated output is suitable for processing by, but not limited to means for logging, means for debugging, and a policy engine.

4. The apparatus of claim 1, further comprising:
   means, for using a "stopped collecting" state where said packets may be ignored except to use information from transport protocol headers to determine a connection state associated with a connection and freeing resources when said connection terminates, thereby increasing efficiency in said translating packet data.

5. The apparatus of claim 4, wherein said means for using headers and freeing resources is implemented as a hardware filter to stop additional packets of data from arriving.

6. The apparatus of claim 1, further comprising:
   means for using time received of said packet data as a point of reference and using corresponding time intervals for aligning results, said results stored in a database.

7. The apparatus of claim 1, wherein when said accepting packet data is from said file, further comprising means for processing said packet data relative to time and time intervals of when said packet was originally received into the file.

8. The apparatus of claim 1, said means for generating output further comprising:
   an interface for communicating with a policy engine, said interface comprising calls for connecting and for starting and finishing a plurality of transactions, and event specific calls.

9. The apparatus of claim 8, wherein said plurality of transactions are active at the same time.

10. The apparatus of claim 1, further comprising:
    means for decoding encoded versions of network events.

11. The apparatus of claim 1, wherein said encoded format comprises:
    a header;
    embedded agent descriptors indicating location of source of said packet data;
    type map used in detecting update types not supported by old software, thereby; and
    encoded transactions.

12. The apparatus of claim 1, wherein different protocol layers of said network event data are combined to facilitate understanding of events in said packet data.

13. A method for translating packet data into a serialized stream of network event data, comprising:
    accepting said packet data live or from a first file containing said packet data;
    interpreting both sides of each network connection of one or more network connections in said packet data wherein said means for interpreting comprises means for determining a relative time and a concurrency of each of a plurality of network events together with its comprised protocol events in said packet data and using said relative time and concurrency for making one or more policy decisions about said network event before it terminates;
    extracting security-sensitive information from said packet data, wherein said means for extracting omits passwords, documents, and other sensitive data; and
    generating output from said extracted security-sensitive information into said serialized stream of network event data in encoded format, wherein said encoded format comprises a transaction identifier corresponding to said each said network connection, wherein each transaction identifier is used in a post-process to identify a plurality of actions corresponding to a plurality of protocol events on said network connections each action including one or more elements of said security-sensitive information, and wherein said output is stored in a second file for subsequent post-processing by an interpreting processor or is fed continuously to said interpreting processor.

14. The method of claim 13, wherein said encoded format is network event encoded format.

15. The method of claim 13, wherein said generated output is suitable for processing by, but not limited to logging, debugging, and a policy engine.

16. The method of claim 13, further comprising:
    providing a "stopped collecting" state whereby said packets may be ignored except to use information from transport protocol headers to determine a connection state associated with a connection and free resources when said connection terminates, thereby increasing efficiency in said translating packet data.

17. The method of claim 16, wherein using headers and freeing resources is implemented as a hardware filter to stop additional packets of data from arriving.

18. The method of claim 13, further comprising:
    using time received of said packet data as a point of reference and using corresponding time intervals for aligning results, said results stored in a database.

19. The method of claim 13, wherein when said accepting packet data is from said file, further comprising processing said packet data relative to time and, time intervals of when said packet was originally received into the file.

20. The method of claim 13, said generating output further comprising:
   providing an interface for communicating with a policy engine, said interface comprising calls for connecting and for starting and finishing a plurality of transactions, and event specific calls.

21. The method of claim 20, wherein said plurality of transactions are active at the same time.

22. The method of claim 13, further comprising:
   decoding encoded versions of network events.

23. The method of claim 13, wherein said encoded format comprises:
   a header;
   embedded agent descriptors indicating location of source of said packet data;
   type map used in detecting update types not supported by old software, thereby; and
   encoded transactions.

24. The method of claim 13, wherein different protocol layers of said network event data are combined to facilitate understanding of events in said packet data.

* * * * *